US012222713B2

(12) United States Patent
Amaro, Jr. et al.

(10) Patent No.: US 12,222,713 B2
(45) Date of Patent: Feb. 11, 2025

(54) METHODS AND APPARATUS TO PERFORM PROCESS ANALYSES IN A DISTRIBUTED CONTROL SYSTEM

(71) Applicant: FISHER-ROSEMOUNT SYSTEMS, INC., Round Rock, TX (US)

(72) Inventors: Anthony Amaro, Jr., Princeton, TX (US); John M. Caldwell, Austin, TX (US); Mark Nixon, Thorndale, TX (US); Cheyenne Hernandez, Cedar Park, TX (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 364 days.

(21) Appl. No.: 17/886,420

(22) Filed: Aug. 11, 2022

(65) Prior Publication Data
US 2024/0053741 A1  Feb. 15, 2024

(51) Int. Cl.
G05B 23/02 (2006.01)
G05B 19/418 (2006.01)

(52) U.S. Cl.
CPC ..... *G05B 23/0294* (2013.01); *G05B 19/4186* (2013.01); *G05B 2219/23265* (2013.01)

(58) Field of Classification Search
CPC ............ G05B 23/0294; G05B 19/4186; G05B 19/41875; G05B 2219/23265; G05B 2219/32194
See application file for complete search history.

(56) References Cited

U.S. PATENT DOCUMENTS

| 11,055,639 | B1 | 7/2021 | Cay et al. |
| 2017/0102694 | A1* | 4/2017 | Enver .............. G05B 19/41865 |
| 2018/0299873 | A1* | 10/2018 | Chauvet ................. G06F 9/455 |
| 2019/0259108 | A1* | 8/2019 | Bongartz ............... A01G 31/02 |
| 2020/0057714 | A1 | 2/2020 | Ounce et al. |

(Continued)

OTHER PUBLICATIONS

Emerson Electric Co., "Delta V™ Spectral Process Analytic Technology (PAT)," retrieved via the Internet at [https://www.emerson.com/en-sg/automation/control-and-safety-systems/distributed-control-systems-dcs/deltav-distributed-control-system/deltav-spectral-pat] on Aug. 11, 2022, 7 pages.

(Continued)

*Primary Examiner* — Mong-Shune Chung
(74) *Attorney, Agent, or Firm* — Hanley, Flight & Zimmerman, LLC

(57) ABSTRACT

Methods, apparatus, systems, and articles of manufacture are disclosed. An example system to modify an industrial control system includes: at least one memory; programmable circuitry; and instructions to cause the programmable circuitry to: configure a device driver based on a first command, the first command to configure the device driver to initiate a device-specific communication protocol to collect input data from a publisher device coupled to the device driver; access a second command from a subscriber device, the second command to include a device identifier of the publisher device and to specify at least one of a communication mode, a device calibration configuration, or a fault detection configuration, the second command based on a product quality prediction, the product quality prediction generated using a spectral data model; and provide the second command to the device driver.

20 Claims, 21 Drawing Sheets

(56) References Cited

U.S. PATENT DOCUMENTS

2022/0414555 A1* 12/2022 Miyamoto ........... G05B 13/048

OTHER PUBLICATIONS

Walden et al., "Improve Speed to Market with Closed-Loop Process Control using Spectral PAT," Feb. 3, 2022, retrieved via the Internet at [https://www.emersonautomationexperts.com/2022/control-safety-systems/improve-speed-to-market-with-closed-loop-process-control-using-spectral-pat/] on Aug. 4, 2022, 9 pages.
Control Global, "Integrated models redefining PAT," Mar. 10, 2022, retrieved via the Internet at [https://www.controlglobal.com/articles/2022/integrated-models-redefining-pat/] on Aug. 4, 2022, 6 pages.
Emerson, "DeltaV Distributed Control System, Product Data Sheet—DeltaV™ Spectral PAT," Apr. 2022, retrieved via the Internet at [https://www.emerson.com/documents/automation/product-data-sheet-deltav-spectral-pat-deltav-en-8016568.pdf] on Aug. 4, 2022, 5 pages.
Wikipedia, "Real-time computing," last updated Aug. 2, 2022, retrieved via the Internet at [https://en.wikipedia.org/wiki/Real-time_computing] on Aug. 4, 2022, 8 pages.
International Searching Authority, "International Search Report," issued in connection with International Patent Application No. PCT/US2023/72039, mailed on Dec. 8, 2023, 2 pages.
International Searching Authority, "Written Opinion of the International Searching Authority," issued in connection with International Patent Application No. PCT/US2023/72039, mailed on Dec. 8, 2023, 6 pages.

* cited by examiner

METHODS AND APPARATUS TO PERFORM PROCESS ANALYSES IN A DISTRIBUTED CONTROL SYSTEM

FIELD OF THE DISCLOSURE

This disclosure relates generally to industrial control systems and, more particularly, to methods and apparatus to perform process analyses and process control in a distributed control system.

BACKGROUND

Automation strategies for process industries (e.g., pharmaceutical, food, beverage, oil and gas, refining, etc.) implement complex control strategies to increase production efficiency and enable continuous manufacturing. An increase in integration complexity for process industries, which require quality of goods measurements (such as the manufacturing of pharmaceutical goods), limits implementation of continuous manufacturing to industries with reduced quality of goods specifications.

BRIEF DESCRIPTION OF THE DRAWINGS

In general, the same reference numbers will be used throughout the drawing(s) and accompanying written description to refer to the same or like parts. The figures are not to scale.

Figure 1:
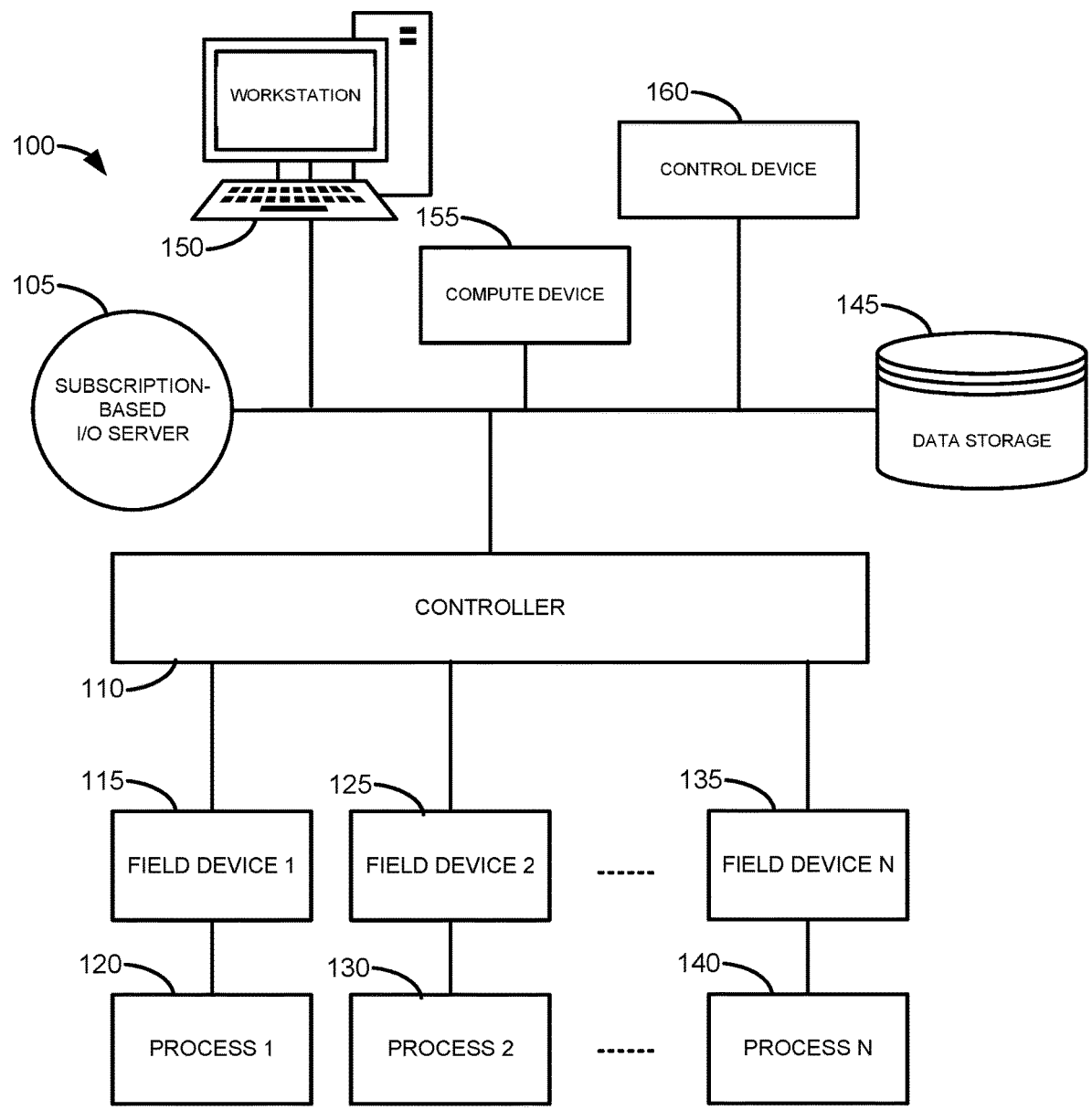
FIG. 1 is a block diagram of an example process control system including a subscription-based input/output server.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

In examples disclosed herein, "substantially real time" and "substantially real-time" refer to performances of actions and/or data deliveries that satisfy a response time value (e.g., within an expected time frame). As used herein, "substantially real time" and "substantially real-time" refer to "soft real time" and "soft real-time," respectively, in that a component such as hardware and/or software in a system is to receive data and/or expects a responsive action within a duration that does not exceed an expected response time. Such an example response time may be specified by a user via user input and/or may be stored in a configuration file and/or product specification file as a response time parameter set to a response time value. In this manner, a system may configure one or more of its components to provide responses and/or implement actions within the specified response time (e.g., in "substantially real time," "substantially real-time," "soft real time," and "soft real-time"). Thus, unless otherwise specified, "substantially real time," "substantially real-time," "soft real-time," and "soft real time" refer to execution of a response, performance of an action, providing of data, and/or receiving of data within the specified response time relative to, for example, a determination to perform an action, a request to perform an action, a request to generate data, availability of data, and/or any other trigger event. In examples disclosed herein specified response times may vary across applications and/or processes. For example, applications or processes in some industries may require relatively fast response times, such as taking action within 10-milliseconds, 50-milliseconds, one second, or any other suitable time frame. Yet other example applications or processes may employ relatively slower response times, such as minutes, hours, or any other suitable time frame. In some examples, a response time of an action corresponds to the time it takes to initiate a change in a process (e.g., send a command to open a valve to add a particular ingredient, send a command to start a heating element to heat a column, send a command to shut off a heating element to cool a tank, etc.). In other examples, a response time of an action corresponds to the time it takes to achieve a desired change based on a collected measure in the process (e.g., achieve a desired concentration of multiple ingredients, achieve a desired temperature of a component, etc.).

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

Automations in process industries (e.g., pharmaceutical, food, beverage, oil and gas, refining, etc.) use industrial process control systems capable of implementing complex control strategies. Examples disclosed herein can be used to implement process control systems to increase production efficiency and enable continuous manufacturing. An automation control strategy is a control strategy to automate a process of manufacture. An automation control strategy to manufacture goods may be implemented using a batch automation control strategy. A batch automation control strategy is a strategy employed during manufacturing of a good or material to monitor a quality of the produced good or material at different points in the manufacturing process. In batch automation control strategies, the monitoring may be performed by autonomously collecting sensor data during manufacturing. Typically, batch automation control strategies require an operator at a workstation to review measurements, generated using sensor data, to determine a quality of a batch of goods. Prior implementations of automation control strategies are inefficient in applications that require quality of goods measurements to be collected by instruments throughout the manufacturing process, such as pharmaceutical and chemical manufacturers.

Process industries that require quality of good measurements throughout a manufacturing process implement process analytical technology (PAT) devices to determine a quality of a product during manufacturing. PAT involves a method of manufacture that may be used to achieve quality targets of a good throughout the manufacturing of the good. An actual quality of the good can be measured relative to such quality targets by measuring product factors (e.g., mass, chemical composition, specific gravity, etc.) throughout the manufacturing process. Control strategies can utilize PAT to determine a quality of a product in substantially real-time based on at least one of a chemometric measurement and/or a spectral measurement. For example, a pharmaceutical manufacture may use a spectrometer to collect light absorption measurements of raw materials to determine whether production operations on the raw material are achieving a quality target for the raw material. Control strategies, which implement PAT, may efficiently and continuously manufacture goods based on a substantially real-time determination of a quality of a good throughout the process of manufacturing. Implementations of continuous manufacturing that utilize PAT are often limited by the ability of a PAT control strategy to timely and accurately measure and analyze qualities of goods and control or influence adjustments of manufacturing parameters based on those measurements and analyses.

Examples disclosed herein may be used in continuous manufacturing of products to meet increased quality of good specifications. For example, examples disclosed herein may be used to implement technologies capable of measuring product factors (e.g., mass, chemical composition, specific gravity, etc.) throughout the manufacturing process. In some examples, examples disclosed herein may be used in continuous manufacturing to automate processes to determine modifications to the manufacturing process based on measured product factors.

Examples disclosed herein include methods and apparatus to perform process analyses to implement automation control strategies which utilize PAT devices in distributed control systems. In some disclosed examples, a quality of a good is determined using measurements published to a subscription-based input/output (I/O) server by an instrument interface. An automation control strategy can predict a future quality of a good based on a data model and approximately real-time measurements. The data model used to generate a quality-of-good prediction may be a parameterized data model determined based on historical product quality measurements. Approximately real-time measurements may be accessed by devices that are subscribed to the subscription-based I/O server. An automation control strategy may utilize the quality-of-good prediction to autonomously modify production operations to correct for variations over time.

FIG. 1 is a block diagram of an example process control system 100 including an example subscription-based I/O server 105. In the example of FIG. 1, the process control system 100 includes the subscription-based I/O server 105, an example controller 110, a first example field device 115, a first example process 120, a second example field device 125, a second example process 130, a third example field device 135, a third example process 140, an example data storage 145, an example workstation 150, an example compute device 155, and an example control device 160. In the example of FIG. 1, the components of the process control system 100 are communicatively coupled as shown. Such communicatively coupling may be through any suitable communication protocols, communication standards, etc. using wired and/or wireless communication media. For example, some components may be in wired communication with one another, while other components may be communicatively coupled wirelessly. The example process control system 100 utilizes the field devices 115, 125, and 135 to monitor the processes 120, 130, and 140. The example process control system 100 is configured to determine a quality of a product using measurements published to the subscription-based I/O server 105.

In the example of FIG. 1, the subscription-based I/O server 105 is communicatively coupled to the controller 110, the data storage 145, the workstation 150, the compute device 155, and the control device 160. Information (e.g., measurement data, commands) may be published to the example subscription-based I/O server 105 by the controller 110, the field devices 115, 125, and 135 and/or the compute device 155. In examples disclosed herein, devices capable of publishing data to the subscription-based I/O server 105 may be referred to as a publisher device type. Data (e.g., measurement data) may be accessed from the example subscription-based I/O server 105 by the workstation 150, the compute device 155, and/or the control device 160. In examples disclosed herein, devices capable of accessing data on the subscription-based I/O server 105 may be referred to as a subscriber device type. Commands to manage or calibrate one or more of the example field devices 115, 125, and/or 135 may be published to the subscription-based I/O server 105 by the compute device 155, which may be referred to as a primary subscriber device type. As used herein, a primary subscriber device type may access data published to the subscription-based I/O server 105 as well as publish commands to the subscription-based I/O server 105. The example subscription-based I/O server 105 may provide access to data stored in the data storage 145 in response to assigning a device requesting access as a device type that is capable of accessing measurement data. Such a device type to access measurement data may be established as a publisher device type, a subscriber device type, or a primary subscriber device type. Alternatively, the example subscription-based I/O server 105 may include a plurality of alternative classifications of devices based on publish and/or access operations which may be performed by the device.

The example subscription-based I/O server 105 determines whether a device is a publisher device type, a subscriber device type, or a primary subscriber device type based on configuration information in the subscription-based I/O server 105. For example, the subscription-based I/O server 105 may access a configuration file in the data storage 145 to determine which devices are allowed to publish data, access data, and/or publish commands. In such an example, the configuration file may include a list of devices and an indication of whether devices are a publisher device type, a subscriber device type, or a primary subscriber device type. The example subscription-based I/O server 105 may use a rule to determine if a device is a publisher device type, a subscriber device type, or a primary subscriber type. For example, the subscription-based I/O server 105 may include a rule which allows a device to access data responsive to receiving a valid digital signature from the device. In such an example, the subscription-based I/O server 105 may be configured to configure any device as a subscriber device responsive to verifying a valid digital signature, such that a device type is assigned responsive to verifying a digital signature from the device. The example subscription-based I/O server 105 may determine a device type based on a predetermined security requirement for each of the device types, such as requiring a valid digital signature to access data published to the subscription-based I/O server 105. For example, the subscription-based I/O server 105 may require a device to provide a valid digital signature confirming the device is a subscriber device type before allowing the device to access data published to the subscription-based I/O server 105.

The example controller 110 is communicatively coupled between the subscription-based I/O server 105 and the field devices 115, 125, and 135. The example controller 110 is configured as a publisher device, such that the controller 110 publishes measurements to the subscription-based I/O server 105. For example, the subscription-based I/O server 105 may send one or more calibration or management commands to the controller 110 to configure the controller 110 as a publisher device type. The management command from the example subscription-based I/O server 105 may configure the controller 110 to publish measurements from the first field device 115 at periodic intervals such as every second, every five seconds, every 30 seconds, every fraction of a second, etc. In some examples, the subscription-based I/O server 105 may send a calibration command to the controller 110 to configure the controller 110 to calibrate the first field device 115. In examples disclosed herein, calibration or management commands include a device identifier which indicates which of the field devices 115, 125, or 135 is to be modified by the command. Additionally, management commands specify an operation of a communication mode, a device calibration configuration, a fault detection configuration, etc. For example, the controller 110 may determine to which of the field devices 115, 125, or 135 to send a management command based on a device identifier included in the management command. In some examples, the controller 110 may remove the device identifier from the management command before sending the management command. A fault detection configuration may be configured to cause one of the field devices 115, 125, or 135 to publish a data indication as a part of device-specific metadata in response to a device error.

The example controller 110 is configured to use one or more communication protocols (e.g., OPCUA, Tec5, VIAVI, etc.) to collect measurements from the field devices 115, 125, and 135. For example, the controller 110 may be configured to use a Tec5 protocol library to communicate with the first field device 115 and a VIAVI protocol library to communicate with the second field device 125. The example controller 110 may be configured to interface with the field devices 115, 125, and 135 based on the product being manufactured.

The example field devices 115, 125, and 135 are communicatively coupled to the controller 110 to monitor and/or implement one or more aspects of the processes 120, 130, and 140. In the example of FIG. 1, the field devices 115, 125, and 135 are shown as corresponding to respective ones of the processes 120, 130, or 140. Alternatively, ones of the example field devices 115, 125, and/or 135 may correspond to multiple ones of the processes 120, 130, or 140. The example field devices 115, 125, and 135 are configured to measure critical parameters of a product throughout the manufacturing process. The example field devices 115, 125, and 135 may be instruments used to measure data values related to chromatography, spectroscopy, particle size, heat flow calorimetry, and/or any other desired property of a good. The example field devices 115, 125, and 135 may be modified and/or calibrated by commands issued by the controller 110. For example, the controller 110 may send a command to calibrate the first field device 115 to a calibration value specific to the next product to be manufactured. In such examples, the calibration command may include data specific to the type of measurement or type of data produced by the first field device 115. The example field devices 115, 125, and 135 provide data values to the controller 110, which may be used by the process control system 100 to determine a quality of a product and/or predict a future quality of the product.

The example processes 120, 130, and 140 are illustrative representations of processes performed by a manufacturer to produce a good. The example process control system 100 may modify one or more aspects of the processes 120, 130, and 140 based on determining a quality of a product is outside of a specific range of values. The example processes 120, 130, and 140 are monitored by the field devices 115, 125, and 135, such that the process control system 100 may determine a substantially real-time quality of a product and/or predict a future quality of the product being manufactured.

The example data storage 145 is coupled to the subscription-based I/O server 105. The example data storage 145 may be configured to store quality-of-product values, quality-of-product predictions, measurement data, configuration information, etc. The example data storage 145 may be configured as shared memory in which devices communicatively coupled to the subscription-based I/O server 105 may store data. The example data storage 145 may store previously predicted product quality values, such that predicted product quality values may be compared to a quality-of-product value.

The example workstation 150 is coupled to the subscription-based I/O server 105. In the example of FIG. 1, the workstation 150 is configured as a subscriber device, such that the workstation 150 may access data published to the subscription-based I/O server 105. The example workstation 150 may be used to execute a client application, a human machine interface, a process monitor, a process diagnostics generator, a historical collector, an internet of things (IoT) interface, a third-party chemometric tool, etc. The example workstation 150 is configured to display measurements collected by the field devices 115, 125, and 135.

The example compute device 155 is communicatively coupled to the subscription-based I/O server 105. The example compute device 155 is configured to send commands to the controller 110 using the subscription-based I/O server 105. In some examples, the compute device 155 may include the subscription-based I/O server 105 and the controller 110, such that the compute device 155 may send commands to the field devices 115, 125, and 135.

The example control device 160 is communicatively coupled to the subscription-based I/O server 105. The example control device 160 is configured as a primary subscriber device, such that the control device 160 may publish commands and access data using the subscription-based I/O server 105. The example control device 160 is configured to determine, based on measurements collected by the field devices 115, 125, and 135, a quality of a product being manufactured. The example control device 160 is configured to use a parametric data model to generate a quality-of-product prediction for the product being produced. For example, the control device 160 may use a parametric data model stored in the data storage 145 and measurements from the field devices 115, 125, and 135 to predict a quality of the product at a later time. The example control device 160 may be communicatively coupled to the subscription-based I/O server 105. In some examples, the control device 160 may access the data model and/or measurements using an online medium, such as accessing data at a public or private internet protocol address, corresponding to the data storage 145 using internet communication protocols.

Different aspects of the example process control system 100 are configurable based on user input and/or one or more configuration files. For example, timing(s) of the process control system 100 is/are configurable based on user input and/or a configuration file that specifies one or more response time values (e.g., response time value(s) set in response time parameter(s)) for implementing "substantially real time" or "soft real time" timings of the system. In some examples, different aspects of the process control system 100 may be configured differently to operate based on different response times. Such configurable values may be updated from time to time in the example process control system 100 and stored as configuration information. In operation, the example subscription-based I/O server 105 configures itself based on system configuration information stored in the data storage 145. The example subscription-based I/O server 105 sends commands to the controller 110 and/or the compute device 155 to initialize the field devices 115, 125, and 135 to measure at least one of the processes 120, 130, or 140 based on the system configuration. For example, the subscription-based I/O server 105 may issue commands included in a system configuration to initialize communication protocols specific to the field devices 115, 125, and 135. The example compute device 155 may access communication protocol libraries in the data storage 145 based on the communication protocols for the field devices 115, 125, and 135. The example subscription-based I/O server 105 may indicate a data model in the data storage 145 for use by the control device 160 to predict quality of a product or products corresponding to the processes 120, 130, and 140.

In operation, the example controller 110 publishes measurement data, generated by the field devices 115, 125, and 135, to the subscription-based I/O server 105. The example controller 110 may be configured to publish measurement data in substantially real-time to the subscription-based I/O server 105. The example subscription-based I/O server 105 allows subscriber devices to access the measurement data as data is published to the subscription-based I/O server 105 by the controller 110 and/or the compute device 155. The example control device 160 determines a quality of a product at a first time based on current measurement data. The example control device 160 uses the data model to predict a quality of the product at a second time. The example control device 160 may publish one or more management commands to the subscription-based I/O server 105 based on a quality of the product prediction at the second time (e.g., a future time or a time at which measurement data has not been collected). The example control device 160 may publish one or more calibration commands to the subscription-based I/O server 105 based on the quality of the product prediction at the second time to increase measurement data accuracy.

The example field devices 115, 125, and 135 monitor the processes 120, 130, and 140 to generate measurement data that may be used to determine a product quality throughout the manufacturing process. The example control device 160 uses a data model to predict subsequent product quality values based on substantially real-time measurements of the processes 120, 130, and 140. The example process control system 100 is capable of both batch and continuous manufacturing. During such manufacturing, the subscription-based I/O server 105 enables the control device 160 to determine product quality values based on substantially real-time measurements from PAT devices (e.g., the field devices 115, 125, and 135).

Figure 2A:
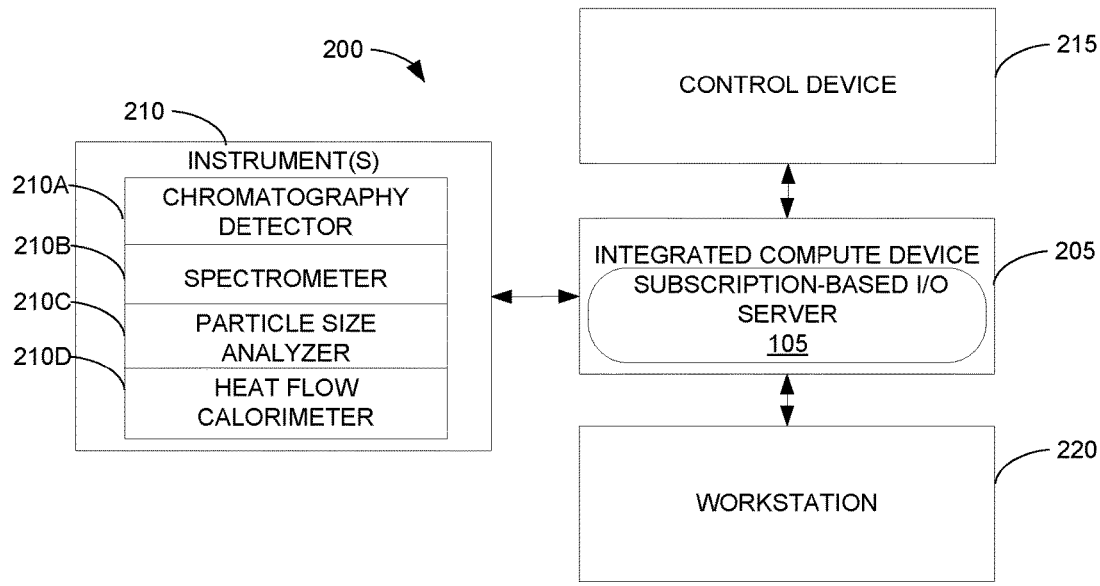
FIG. 2A is a block diagram of a first example process control system configuration including the subscription-based input/output server of FIG. 1 and an integrated compute device.

FIG. 2A is a block diagram of a first example process control system configuration 200 including the subscription-based I/O server 105 of FIG. 1 and an example integrated compute device 205. In the example of FIG. 2A, the first process control system configuration 200 includes the subscription-based I/O server 105, the integrated compute device 205, example instruments 210, an example control device 215, and an example workstation 220. The first example process control system configuration 200 is a distributed process control system, such that components of the first process control system configuration 200 may be distributed across a network and/or one or more geographical locations and/or network locations. The first example process control system configuration 200 is configured to use the integrated compute device 205 to provide data measurements from the instruments 210 to the control device 215 and the workstation 220. The first example process control system configuration 200 is configured to distribute the operations of determining a product quality value to a location of the control device 215. As such the control device 215 may be hosted by an off-premise entity such as a third-party service provider.

In the example of FIG. 2A, the integrated compute device 205 is coupled to the instruments 210, the control device 215, and the workstation 220. The example integrated compute device 205 includes the subscription-based I/O server 105. The example integrated compute device 205 is configured similar to the control device 155 of FIG. 1. The example integrated compute device 205 is configured to interface with the instruments 210, the control device 215, and the workstation 220 using the subscription-based I/O server 105. The example integrated compute device 205 is configured to integrate PAT connectivity and provide data to the control device 215 and the workstation 220 using the subscription-based I/O server 105.

In the illustrated example, PAT integration using the integrated compute device 205 includes components implemented as containers within the integrated compute device 205. For example, PAT devices are integrated into the first process control system configuration 200 by using the subscription-based I/O server 105 of the integrated compute device 205 as a dedicated device network. A container is a package of one or more software's including operations necessary for run-time execution in a computing environment such as a virtualized operating system, processing core, etc. By using the example integrated compute device 205 as a dedicated device network, measurements from the instruments 210 can be published through the subscription-based I/O server 105 by the integrated compute device 205. The example integrated compute device 205 may be configured to collect measurement data from the instruments 210 using a data exchange protocol, such as OPC-UA, Tec5, VIAVI, etc.

The example integrated compute device 205 is configured to be controlled by the control device 215 to manage and operation PAT devices, such as the instruments 210. For example, the integrated compute device 205 manages the instruments 210 based on one or more management commands published by the control device 215 to the subscription-based I/O server 105. In such an example, the integrated compute device 205 accesses a device indication in the management command to determine which of the instruments 210 corresponds to the management command. The example integrated compute device 205 may be configured to transmit management command data to a specific device using a device-specific data exchange corresponding to the device-specific driver capable of allowing the integrated compute device 205 to communicate to the specific device. The example integrated compute device 205 allows management and/or calibration commands to be device-specific commands. The example integrated compute device 205 transmits commands to the instruments 210 using a device-specific data exchange.

The example instruments 210 are coupled to the example integrated compute device 205. The example instruments 210 are PAT devices capable of measuring data to determine a product quality value. Examples of PAT devices include devices capable of measuring chromatography, spectroscopy, particle size, and/or heat flow calorimetry. In the example of FIG. 2A, the instruments 210 include an example chromatography detector 210A, an example spectrometer 210B, an example particle size analyzer 210C, and an example heat flow calorimeter 210D. Alternatively, the example instruments 210 may include a combination and/or plurality of PAT devices based on product quality specifications of a product being manufactured.

The example instruments 210 are configured to communicate with the integrated compute device 205 to publish substantially real-time data measurements to the subscription-based I/O server 105. The example instruments 210 include one or more PAT devices configured to provide data, as input data, to a device driver to be published to the subscription based I/O server 105. Example types of data that can be published to the example subscription-based I/O server 105 include sensor data and/or device-specific metadata. Example sensor data includes at least one of a spectral value, an absorption value, a particle size value, or a heat value. Example device-specific metadata includes at least one of a device status or a device identification value. For example, the integrated compute device 205 publishes device identification values in association with corresponding sensor data to the subscription-based I/O server 105 so that subscriber devices (e.g., the workstation 150 of FIG. 1, the control device 160 of FIG. 1, etc.) may determine which of the instruments 210 measured which sensor data. The example instruments 210 may indicate a device fault or other device-specific data to the subscriber devices by including a device identification value in the device-specific metadata.

The example instruments 210 are configured to receive management and/or calibration commands from the integrated compute device 205. For example, the integrated compute device 205 may send a calibration command to configure the chromatography detector 210A by replacing first device calibration settings with second device calibration settings. In such an example, the first device calibration settings may be specific to measuring a first process, whereas the second device calibration settings may be specific to measuring a second process. In this manner, the example instruments 210 can be re-configured at different times so that different product quality specifications or process operation conditions may be monitored by the first process control system configuration 200 for different types of processes.

The example chromatography detector 210A may be a PAT device configured to measure a spectral value, such as a high-performance liquid chromatography sensor, an ultra-high performance liquid chromatography sensor, an Ion exchange chromatography sensor, a reversed phase chromatography sensor, a hydrophilic chromatography sensor, a ligand exchange chromatography sensor, an ion exclusion chromatography sensor, an ion chromatography sensor, a hydrophobic interaction chromatography sensor, and/or an affinity chromatography sensor. The example spectrometer 210B may be a PAT device configured to measure a spectral value, such as a mid-infrared spectroscopy sensor, a Raman spectroscopy sensor, an ultraviolet spectroscopy sensor, a visible spectroscopy sensor, a near-infrared spectroscopy sensor, a radiofrequency sensor, a microwave sensor, an infrared sensor, and/or a Fourier transform infrared spectroscopy sensor. The example particle size analyzer 210C may be a PAT device configured to measure a particle size value, such as a laser diffraction sensor, a dynamic light scattering sensor, a sedimentation sensor, a sieve rest analyzer, a In Situ video microscope, a focus beam reflectance measurement sensor. The example heat flow calorimeter 210D may be a PAT device configured to measure a heat flow value, such as a reaction calorimeter.

The example control device 215 is coupled to the integrated compute device 205 through the subscription-based I/O server 105, such that data published to the subscription-based I/O server 105 by the control device 215 may be accessed by the integrated compute device 205. In the example of FIG. 2A, the control device 215 is a primary subscriber device configured to access measurement data and/or publish commands. The example control device 215 is configured to access measurement data, which has been published to the subscription-based I/O server 105. The example control device 215 determines a product quality value based on measurement data.

The example control device 215 is configured to predict a product quality prediction value based on a data model. Example data models may be generated based on historical data of previous product quality values. For example, previous product quality values may be used to determine a parametric data model, which predicts a future product quality value based on product quality values being published to the subscription-based I/O server 105. Some example data models may be specific to the product quality specifications corresponding to the product being manufactured. The example control device 215 is configured to generate diagnostic information based at least one product quality prediction. Such diagnostic information may be used by diagnostic tools to control processes of manufacture.

The example control device 215 is configured to modify production operations based on the product quality prediction. The example control device 215 may select a management command or a calibration command to publish to the subscription-based I/O server 105 based on the product quality prediction. For example, the control device 215 may select a management command based on the product quality prediction being below a threshold value specified as a part of the product quality specifications. The example control device 215 may modify processes of production (e.g., the processes 120, 130, and 140 of FIG. 1) based on product quality predictions. The example control device 215 increases production efficiency by selecting commands to ensure future product quality values meet the product quality specifications for the product being produced.

The example control device 215 may verify a product quality prediction by comparing the product quality prediction to a future product quality value. The example control device 215 may be configured to update the data model used to predict the future product quality value based on an accuracy of the product quality prediction. For example, the control device 215 may increase the accuracy of a data model by modifying parametric values of the data model to reflect comparisons of previous product quality predictions to actual product quality values determined using measurement data. As such, the control device 215 may increase the accuracy of product quality predictions by the modifying of the parametric values of the data model based on comparing the previous product quality predictions to the actual product quality values determined using the measurement data.

The example workstation 220 is coupled to the integrated compute device 205 through the subscription-based I/O server 105, such that data published to the subscription-based I/O server 105 by the integrated compute device 205 may be accessed by the workstation 220. In the example of FIG. 2A, the workstation 220 is a subscriber device configured to access measurement data published to the subscription-based I/O server 105. The example workstation 220 is configured to provide measurement data to one or more of a human machine interface, a process monitor, a process diagnostics generator, a historical collector, an edge interface, an internet of things interface, and/or a third-party application. The first example process control system configuration 200 may include one or more of the workstation 220. The example workstation 220 enables the first process control system configuration 200 to support continuous and batch manufacturing.

Figure 2B:
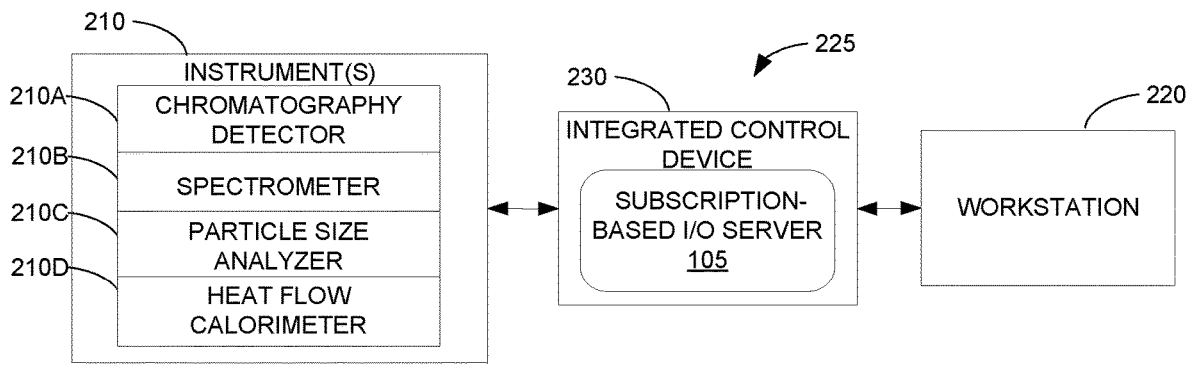
FIG. 2B is a block diagram of a second example process control system configuration including the subscription-based input/output server of FIGS. 1 and 2A and an integrated control device.

FIG. 2B is a block diagram of a second example process control system configuration 225 including the example subscription-based I/O server 105 of FIGS. 1 and 2A and an example integrated control device 230. In the example of FIG. 2B, the second process control system configuration 225 includes the subscription-based I/O server 105, the instruments 210, the workstation 220 of FIG. 2A, and the integrated control device 230. The second example process control system configuration 225 is a distributed control system, such that the workstation 220 and the integrated control device 230 are communicatively coupled to the subscription-based I/O server 105. The second example process control system configuration 225 is configured to include the functionality of the integrated compute device 205 of FIG. 2A and the control device 215 of FIG. 2A in the integrated control device 230.

In the example of FIG. 2B, the integrated control device 230 is communicatively coupled to the instruments 210 and the workstation 220. The example integrated control device 230 is configured to configure and/or control the instruments 210. For example, the integrated control device 230 can program the instruments 210 to operate based on corresponding calibration configurations to collect measurement data and to publish the collected measurement data to the integrated control device 230. In turn, the example integrated control device 230 can publish the measurement data to the subscription-based I/O server 105. The example integrated control device 230 is configured to generate a product quality prediction in substantially the same way as described above in connection with the control device 215 of FIG. 2A. The example integrated control device 230 may include functionality substantially similar or identical to that of the integrated compute device 205 and/or the control device 215 described above in connection with FIG. 2A. In some examples, the integrated compute device 205 and the control device 215 may be implemented as one or more containers in the integrated control device 230. For example, the integrated control device 230 may include a first container in a first network at a first network location (e.g., a first logical network and/or a network at a first geographic location) to implement functionality of the integrated compute device 205 and a second container in a second network at a second network location (e.g., a second logical network and/or a network at a second geographical location) to implement the functionality of the control device 215. In such examples, the subscription-based I/O server 105 may be hosted on a local network, and the first and second networks may be communicatively coupled via the local network so that the first and second containers form the integrated control device 230. In some examples, the integrated control device 230 may be located in a first network communicatively coupled to a second network in which the workstation 220 is located.

The example integrated control device 230 is configured to exchange data (e.g., management commands, calibration commands, sensor data, device-specific metadata, etc.) through a dedicated device network. In examples disclosed herein, a dedicated device network is configured to communicate information between the instruments 210 and the integrated control device 230 using one or more device-specific communication protocols (e.g., OPCUA, VIAVI, Tec5, etc.). Thus, a dedicated device network may use two different device-specific communication protocols corresponding to two different ones of the example instruments 210. Alternatively, the dedicated device network may use a single device-specific communication protocol if only a single one of the instruments 210 is in operation or if all of the instruments 210 are compatible with that single device-specific communication protocol. An example dedicated device network may be implemented wholly on a local network or across a combination of one or more local networks and/or a wide area network (e.g., the Internet, a cellular network, etc.). For example, the instruments 210 may operate on a first local network that is connected via the Internet to a second local network in which the integrated control device 230 operates. In some examples, a dedicated device network may be implemented using a device-specific communications protocol drivers (DSCPD) 305 described below in connection with FIG. 3. The second example process control system configuration 225 may distribute the operations of the integrated control device 230 across a local network, such that containers used to implement functionality of the integrated control device 230 in a distributed fashion may be located at a plurality of network locations. The example workstation 220 may access the subscription-based I/O server 105 using online network access. Such network-based access to the subscription-based I/O server 105 allows the workstation 220 to be at a logical network and/or geographic location separate from a logical network and/or geographic location of the integrated control device 230.

Figure 2C:
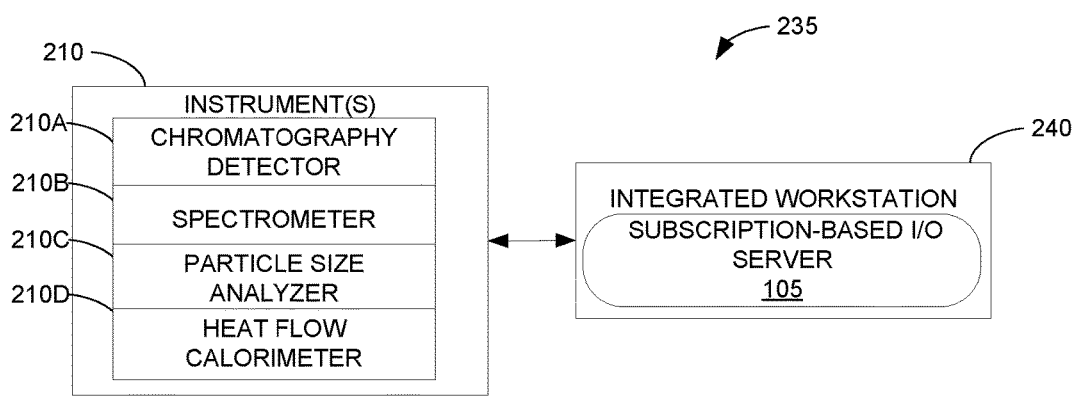
FIG. 2C is a block diagram of a third example process control system configuration including the subscription-based input/output server of FIGS. 1, 2A, and 2B and an integrated workstation.

FIG. 2C is an example block diagram of a third example process control system configuration 235 including the example subscription-based I/O server 105 of FIGS. 1, 2A, and 2B and an example integrated workstation 240. In the example of FIG. 2C, the third process control system configuration 235 includes the instruments 210 of FIGS. 2A and 2B communicatively coupled to the integrated workstation 240. The third example process control system configuration 235 may be a distributed process control system, and the instruments 210 may be in communication with the integrated workstation 240 using a dedicated device network. For example, the instruments 210, at a first geographical location, may be coupled to the integrated workstation 240, at a second geographical location, using a dedicated device network. In such an example, the dedicated device network is configured to enable device-specific data exchanges using a local network and/or a wide area network.

The example integrated workstation 240 includes the subscription-based I/O server 105 and implements substantially similar or identical functionality of the integrated compute device 205 of FIG. 2A, the control device 215 of FIG. 2A, and the workstation 220 of FIGS. 2A and 2B. In some examples, the integrated compute device 205, the control device 215, and the workstation 220 are implemented in the integrated workstation 240 using one or more containers at one or more networks (e.g., one or more logical networks, one or more networks at different geographic locations, etc.). For example, the integrated workstation 240 may include a first container, at a first geographic location, to host functionality of the integrated compute device 205, a second container, at a second geographic location, to host functionality of the control device 215, and a third container, at a third geographic location, to host functionality of the workstation 220. In such an example, the first, second, and third containers may be communicatively coupled to the subscription-based I/O server 105 on a local network. For example, the first, second, and third geographic locations may be in the same manufacturing facility. The example integrated workstation 240 of FIG. 2C substantially reduces or eliminates the need to maintain separate instances of the integrated compute device 205, the control device 215, and/or the workstation 220 shown in FIG. 2A.

Figure 3:
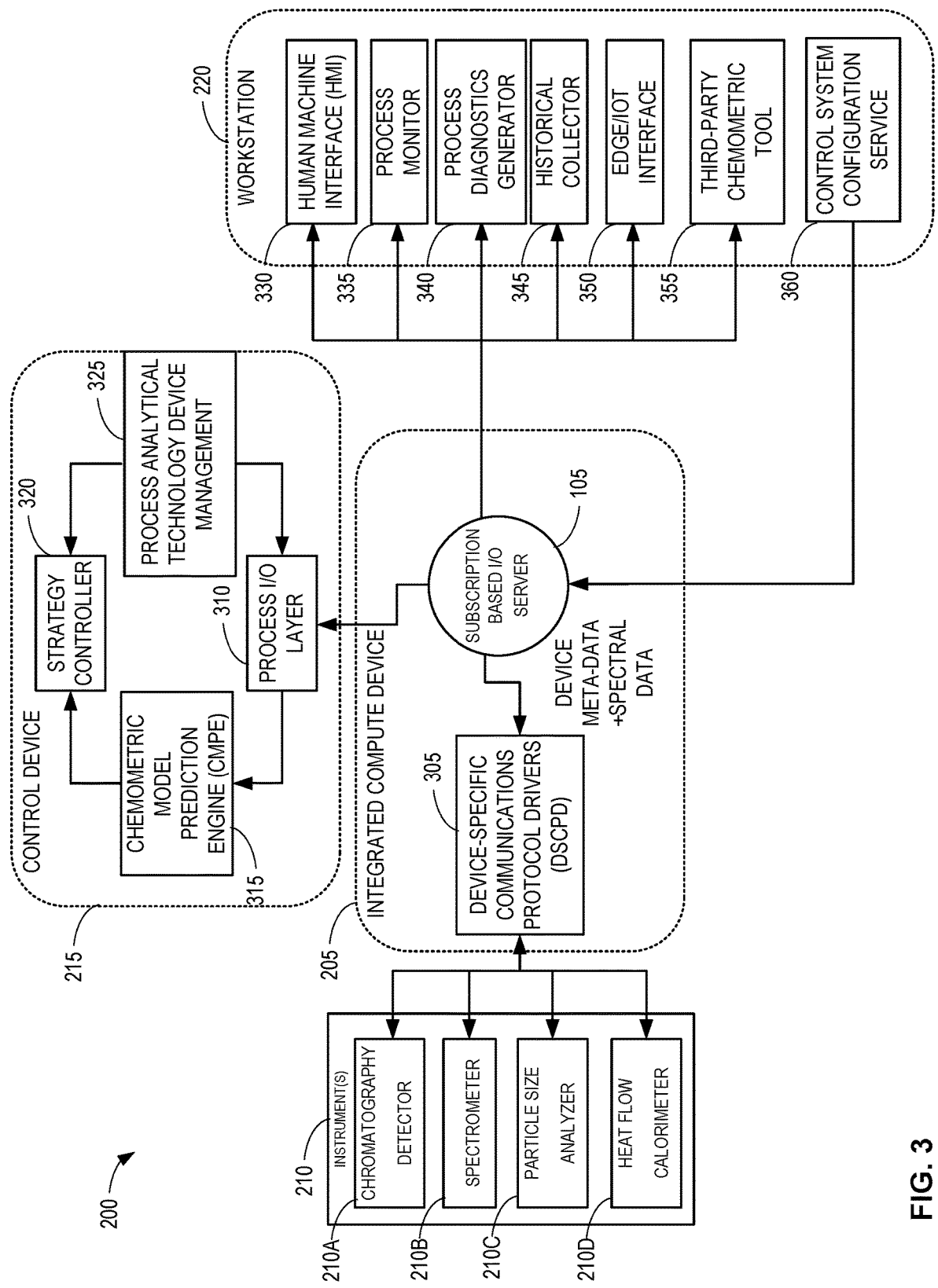
FIG. 3 is a more detailed block diagram of the first example process control system configuration of FIG. 2A.
Figure 4:
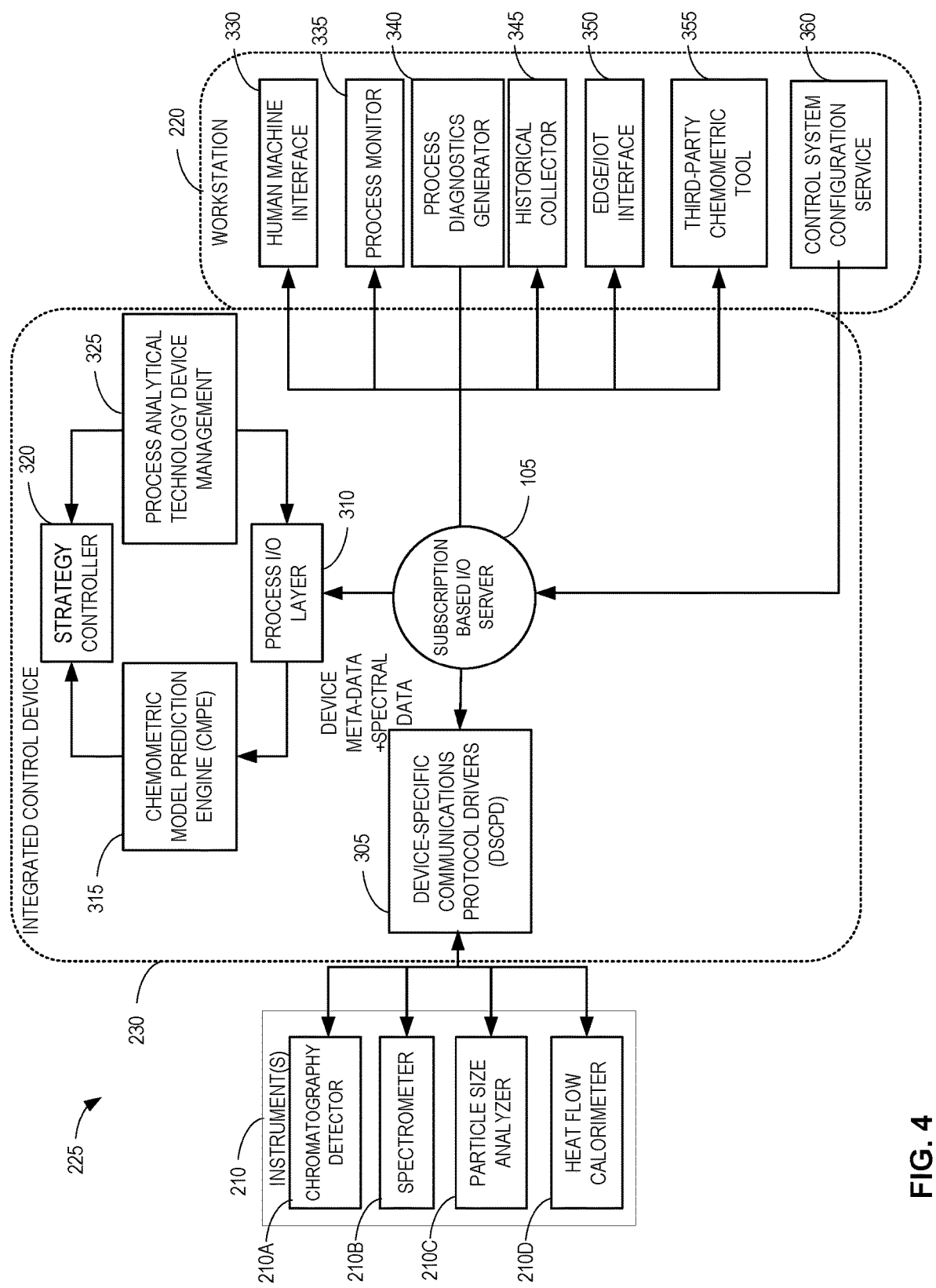
FIG. 4 is a more detailed block diagram of the second example process control system configuration of FIG. 2B.
Figure 5:
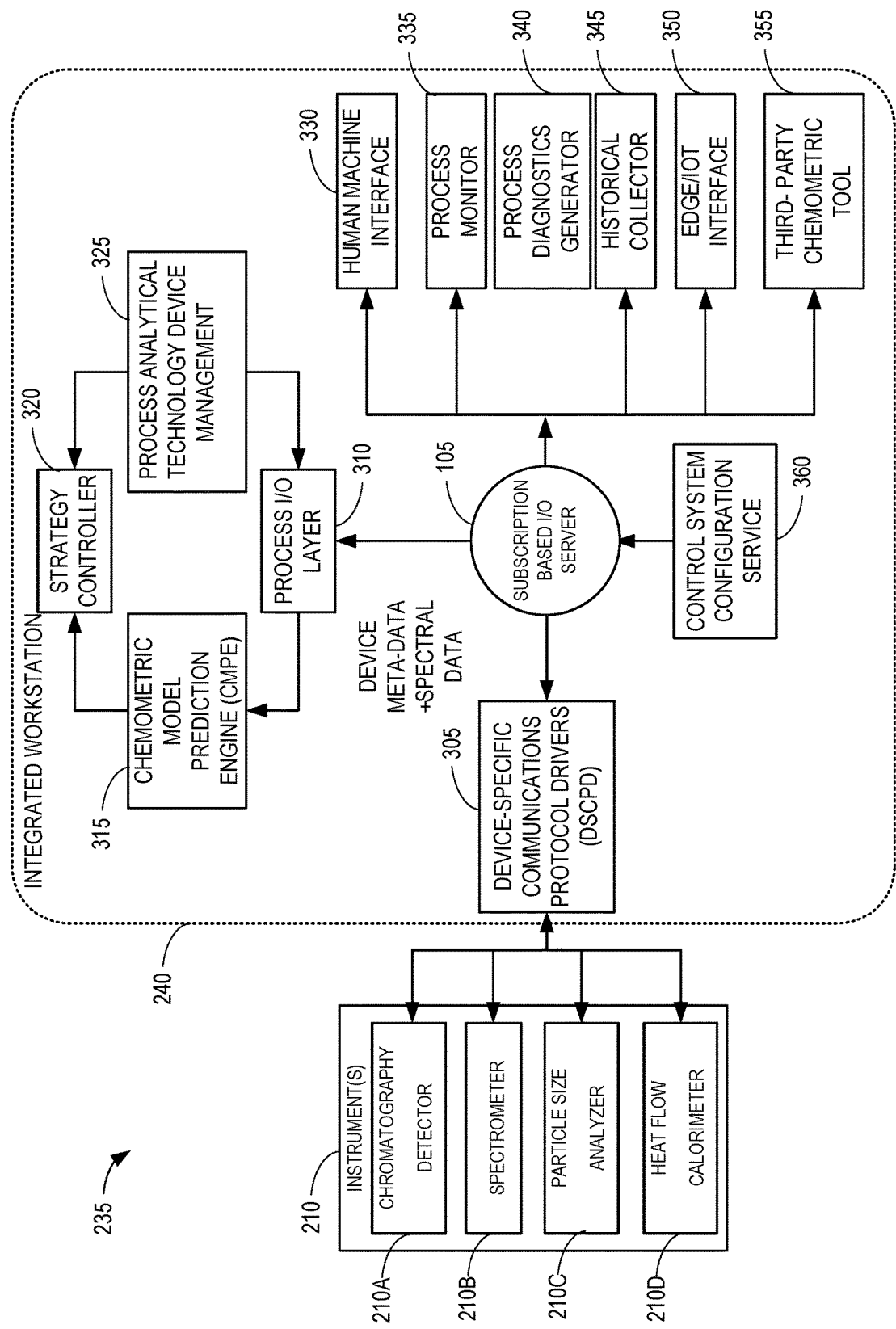
FIG. 5 is a more detailed block diagram of the third example process control system configuration of FIG. 2C.

In the examples of FIGS. 3-5, the subscription-based I/O server 105 implements examples disclosed herein to enable use of PAT to support continuous manufacturing in manufacturing environments that require monitoring of product quality values throughout manufacturing processes. In the examples of FIGS. 6-11, instead of using the subscription-based I/O server 105, a data server and/or an instrument proxy server is used to implement examples disclosed herein to enable use of PAT for continuous manufacturing.

FIG. 3 is a more detailed block diagram of the first example process control system configuration 200 of FIG. 2A. In the example of FIG. 3, the first example process control system configuration 200 includes the integrated compute device 205 of FIG. 2A, the instruments 210 of FIGS. 2A-2C, the control device 215 of FIG. 2A, and the workstation 220 of FIGS. 2A and 2B.

In the example of FIG. 3, the integrated compute device 205 is communicatively coupled to the instruments 210, the control device 215, and the workstation 220. The example integrated compute device 205 includes the subscription-based I/O server 105 of FIGS. 1 and 2A-2C and example device-specific communications protocol drivers (DSCPD) 305.

The example DSCPD 305 is configured to send commands from the subscription-based I/O server 105 to the instruments 210. The example DSCPD 305 is configured to utilize device-specific communication protocols to send calibration and management commands to the instruments 210 using communication protocol(s) corresponding to one or more of the instruments 210. The example DSCPD 305 may determine which of the instruments 210 to send a command based on a device indication in the command from the subscription-based I/O server 105. The example DSCPD 305 may modify the command based on a device-specific communications protocol. For example, the chromatography detector 210A may receive commands as transactions utilizing a Tec5 communication protocol. In such an example, the DSCPD 305 may utilize a Tec5 library to communicate a command, published by the control device 215 to the subscription base I/O server 105, as a transaction between the DSCPD 305 and the chromatography detector 210A. In addition, the example DSCPD 305 generates device-specific communications based on commands published by the control device 215 to the subscription-based I/O server 105. For example, when a command specifies configuration information for a particular one of the instruments 210, the DSCPD 305 generates a device-specific communication using a communication protocol corresponding to that one of the instruments 210 and uses the device-specific communication to send the configuration information to that one of the instruments 210. The example DSCPD 305 may include a plurality of drivers for one or more communication protocols to communicate between the integrated compute device 205 and the instruments 210.

The example DSCPD 305 is configured to publish sensor data and device-specific metadata to the subscription-based I/O server 105. The example DSCPD 305 may utilize a plurality of communication protocols to receive sensor data from one or more of the instruments 210. For example, the DSCPD 305 may utilize a VIAVI communications library to receive sensor data from the spectrometer 210B and a OPCUA communications library to receive sensor data from the particle size analyzer 210C. The example DSCPD 305 may be configured to combine sensor data with device-specific metadata to generate measurement data from one or more of the instruments 210 to be published by the DSCPD 305 to the subscription-based I/O server 105. The example DSCPD 305 may be configured to utilize the device-specific communications protocol to receive device-specific metadata, such as device status or a device identification value.

For example, the DSCPD 305 may receive a fault indication from the heat flow calorimeter 210D. Alternatively, the example DSCPD 305 may utilize one or more commands of a device-specific communication protocol to determine device-specific metadata by sending the one or more commands to one or more of the instruments 210. In turn, the one or more instruments 210 provide device-specific metadata to the DSCPD 305 in response to the one or more commands. The example DSCPD 305 publishes a combination of sensor data and/or device-specific metadata to the subscription-based I/O server 105. In addition, the example DSCPD 305 publishes measurement data as substantially input data from the instruments 210 to the subscription-based I/O server 105 to enable the control device 215 to implement PAT control strategies based on the published measurement data.

In the example of FIG. 3, the control device 215 includes an example process I/O layer 310, an example chemometric model prediction engine (CMPE) 315, an example strategy controller 320, and example process analytical technology device management circuitry 325. The example control device 215 is configured to be a primary subscriber to the subscription-based I/O server 105. By being a primary subscriber, the example control device 215 may access data published to the subscription-based I/O server 105 and publish commands to the subscription-based I/O server 105.

The example process I/O layer 310 is communicatively coupled to the subscription-based I/O server 105, the CMPE 315, and the PAT device management circuitry 325. The example process I/O layer 310 is configured as a primary subscriber. As a primary subscriber, the process I/O layer 310 may publish commands to the subscription-based I/O server 105 and access data published to the subscription-based I/O server 105. The example process I/O layer 310 may be configured to access data published to the subscription-based I/O server 105 and provide the accessed data to the CMPE 315. The example process I/O layer 310 may provide data to the CMPE 315 at substantially real-time or approximately real-time for use in determining predictions of product quality.

The example process I/O layer 310 is configured to publish commands from the PAT device management circuitry 325 to the subscription-based I/O server 105. The example process I/O layer 310 may be configured to publish management commands and/or calibration commands to the subscription-based I/O server 105 based on a transaction from the PAT device management circuitry 325. For example, the process I/O layer 310 may publish commands to the subscription-based I/O server 105 in substantially real-time.

The example CMPE 315 is communicatively coupled to the process I/O layer 310 and the strategy controller 320. The example CMPE 315 is configured to determine a product quality prediction using data from the process I/O layer 310 and a data model. For example, the CMPE 315 may provide sensor data to a parametric data model to generate a product quality prediction and/or an actual product quality. An example data model useable by the CMPE 315 may be generated utilizing previous product quality predictions. The example data model may be produced by preprocessing historical product quality predictions. For example, the data model may be produced by comparing an actual product quality to a product quality prediction. Results from such comparisons can be used to modify parametric values to increase an accuracy of the data model. Preprocessing historical product quality predictions reduces the integration complexity of the data model. For example, the data model may be trained using a comparison of a product quality prediction determined at a first time to an actual product quality determined at a second time. In some examples, the CMPE 315 may use model processing to determine a product quality prediction based on sensor data from the process I/O layer 310.

The example strategy controller 320 is communicatively coupled between the CMPE 315 and the PAT device management circuitry 325. The example strategy controller 320 is configured to implement a process-specific control strategy and to receive a product quality prediction from the CMPE 315. The example strategy controller 320 is configured to adapt the manufacturing process, which is being monitored by the first process control system configuration 200, based on the control strategy. For example, the strategy controller 320 may modify one or more of the processes 120, 130, and/or 140 of FIG. 1 based on the product quality prediction generated by the CMPE 315. In such an example, the strategy controller 320 may modify the process(es) 120, 130, and/or 140 after detecting that a product quality prediction is below a product quality threshold (e.g., a threshold defined in a product quality specification). The example strategy controller 320 may be configured to modify manufacturing based on a continuous or batch control strategy. The example strategy controller 320 may communicate with the PAT device management circuitry 325 to publish commands to the subscription-based I/O server 105 based on a product quality prediction from the CMPE 315. In some examples, the strategy controller 320 may communicate with the PAT device management circuitry 325 to modify the process(es) 120, 130, and/or 140 based on the state of the instruments 210. For example, the strategy controller 320 may drive the first process 120 to change the state of the first process 120 from a non-optimal state or degraded state to an optimal state, such that measurement data from the first field device 115 indicates a product quality corresponding to an optimal state. In such examples, modifications to the process(es) 120, 130, and/or 140 to modify a state of operation may be validated by comparing measurement data collected during the non-optimal state to measurement data being collected following the modifications by the strategy controller 320.

The example PAT device management circuitry 325 is communicatively coupled between the process I/O layer 310 and the strategy controller 320. The example PAT device management circuitry 325 is configured to provide a device status of the instruments 210 to the strategy controller 320. The example PAT device management circuitry 325 is configured to communicate commands to the process I/O layer 310 so that the process I/O layer 310 can publish such commands to the subscription-based I/O server 105. The example PAT device management circuitry 325 is configured based on PAT devices such as the instruments 210. For example, the PAT device management circuitry 325 may be configured to monitor the status of the instruments 210 for a device-specific status indication which may require the strategy controller 320 to modify the control strategy to ensure an acceptable product quality value is achieved. In such examples, the instruments 210 may generate a hardware and/or software interrupt as the device-specific status indication to alert the strategy controller 320 of a sensor value outside a range of acceptable values, such that the strategy controller 320 may modify the control strategy to ensure an acceptable product quality.

The example PAT device management circuitry 325 may be configured to select a calibration command and/or a management command based on the product quality prediction generated by the CMPE 315. For example, the PAT device management circuitry 325 may select a command to validate product quality predictions. In some examples, the PAT device management circuitry 325 may select a management command specific to a product quality prediction to enable fault detection on one or more of the instruments 210A-210D. Through such fault detection monitoring, a product quality prediction can be validated when no fault in an instrument 210A-210D is detected. In such examples, the PAT device management circuitry 325 may select a management command to modify a rate at which an instrument 210A-210D publish sensor values per a duration of time. Such management commands may be selected to validate the product quality prediction across a plurality of values. Such a modification of an instrument 210A-210D may be included in or referred to as a management command which modifies a device mode. The example PAT device management circuitry 325 may select a command to modify the device mode (e.g., rate of sampling, communication protocol, etc.), device calibration (e.g., initialize calibration, set offset values, functions applied to measured values, etc.), fault detection (e.g., enabling interrupts, setting threshold values, etc.), etc.

The example workstation 220 is coupled to the subscription-based I/O server 105 of the integrated compute device 205. In the example of FIG. 3, the workstation 220 includes an example human machine interface (HMI) 330, an example process monitor 335, an example process diagnostics generator 340, an example historical collector 345, an example edge/IoT interface 350, an example third-party chemometric tool 355, and an example control system configuration service 360. Alternatively, the subscription-based I/O server 105 may be communicatively coupled to multiple workstations including one or more of the components shown in the example workstation 220 of FIG. 3.

In example FIG. 3, the HMI 330, the process monitor 335, the process diagnostics generator 340, the historical collector 345, the edge/IoT interface 350, and the third-party chemometric tool 355 are configured as subscriber devices that may access data published to the subscription-based I/O server 105. The example HMI 330 is configured to provide a visual representation of data published to the subscription-based I/O server 105 utilizing a user interface (e.g., a graphical user interface (GUI)). The example process monitor 335 is configured to monitor each of the processes 120, 130, and/or 140 in accordance with device-specific metadata. For example, the device-specific metadata may configure the process monitor 335 to separate or parse sensor data based on different measured aspects of a process monitored by the instruments 210.

The example process diagnostic generator 340 is configured to monitor device-specific metadata to generate diagnostic data (e.g., fault detection, device calibration, device mode, etc.). The example historical collector 345 is configured to store sensor data during a manufacturing process. The sensor data collected during a manufacturing process may be used to implement a batch process control strategy of the manufacturing process. The batch process control strategy may use a duration of sensor data to separate the manufacturing process into separate batches. The example historical collector 345 may be coupled to a data storage (e.g., the data storage 145 of FIG. 1) to store sensor data and/or device-specific metadata.

The example edge/IoT interface 350 is configured to provide data published to the subscription-based I/O server 105 to one or more of an edge device, an IoT device, and/or a service provider. The example workstation 220 may include one or more of the edge/IoT interfaces 350 to provide data to one or more devices and/or services. The example third-party chemometric tool 355 is configured to implement a third-party application using data published to the subscription-based I/O server 105. For example, the third-party chemometric tool 355 may be an application specific to or customized for a product being manufactured. The example third-party chemometric tool 355 allows a manufacturer (e.g., a customer of the subscription-based I/O server 105) to customize how measurements are collected and/or processed. For example, a customer may verify a product quality data using a custom application and/or provide product quality data to an end user of the product being manufactured.

The example control system configuration service 360 is configured to provide a configuration file to the subscription-based I/O server 105. The configuration file provided by the example control system configuration service 360 may include calibration commands and/or management commands to initialize the DSCPD 305. An example configuration file may include data to establish devices as subscriber devices, primary subscriber devices, and/or publisher devices. For example, the control system configuration service 360 may provide data to establish the control device 215 as a primary subscriber device and/or one or more of the components of the workstation 220 as subscriber devices. The example control system configuration service 360 may store the configuration file in the data storage 145 of FIG. 1. An example configuration file may be generated based on the product being manufactured. In some examples, the subscription-based I/O server 105 is configured based on the commands in the configuration file.

FIG. 4 is a more detailed block diagram of the second example process control system configuration 225 of FIG. 2B. In the example of FIG. 4, the second process control system configuration 225 includes the instruments 210 of FIGS. 2A-2C and 3, the integrated control device 230 of FIG. 2B, and the workstation 220 of FIGS. 2A-2C and 3. The second example process control system configuration 225 is configured to be a distributed control system. For example, the integrated control device 230 may be located in a first network at a first network location (e.g., at a first logical network and/or at a first geographic location) and the workstation 220 is located in a second network at second network location (e.g., at a second network and/or at a second geographic location). The example integrated control device 230 may be communicatively coupled to the workstation 220 through a network to which the subscription-based I/O server 105 of FIGS. 1, 2A-2C, and 3 is connected.

In the example of FIG. 4, the integrated control device 230 includes the subscription-based I/O server 105, the DSCPD 305 of FIG. 3, the process I/O layer 310 of FIG. 3, the CMPE 315 of FIG. 3, the strategy controller 320 of FIG. 3, and the PAT device management circuitry 325 of FIG. 3. The example integrated control device 230 is configured to include functionality substantially similar or identical to the functionality of the integrated compute device 205 and the control device 215 described above in connection with FIGS. 2A and 3. In example FIG. 4, the subscription-based I/O server 105 may communicate with the DSCPD 305 and the process I/O layer 310 via a network.

FIG. 5 is a more detailed block diagram of the third example process control system configuration 235 of FIG. 2C. In the example of FIG. 5, the third process control system configuration 235 includes the instruments 210 of FIGS. 2A-2C, 3, and 4 and the integrated workstation 240 of FIG. 2C. The example integrated workstation 240 may be communicatively coupled to the instruments 210 using a device-specific communications network (e.g., a wired and/or wireless communication network).

In the example of FIG. 5, the integrated workstation 240 includes the subscription-based I/O server 105, the DSCPD 305 of FIGS. 3 and 4, the process I/O layer 310 of FIGS. 3 and 4, the CMPE 315 of FIGS. 3 and 4, the strategy controller 320 of FIGS. 3 and 4, and the PAT device management circuitry 325 of FIGS. 3 and 4. The example integrated workstation 240 is configured to include functionality substantially similar or identical to the functionality described above for the integrated compute device 205 of FIGS. 2A and 3, the control device 215 of FIGS. 2A and 3, and the workstation 220 of FIGS. 2A, 2B, 3, and 4. The example subscription-based I/O server 105 may communicate with the DSCPD 305 and the process I/O layer 310 via a network. In addition, the example subscription-based I/O server 105 may be coupled to components of the workstation 240 via a network.

In the examples of FIGS. 3-5, the subscription-based I/O server 105 implements examples disclosed herein to enable PAT to support continuous manufacturing in manufacturing environments that require product quality values to be monitored throughout a manufacturing process. In the examples of FIGS. 6-11, instead of using the subscription-based I/O server 105, the examples of FIGS. 6-11 use a data server and/or an instrument proxy server. Example implementations of a data server and/or instrument proxy server are disclosed herein to support PAT for continuous manufacturing in a manufacturing environment that requires product quality values to be monitored throughout the manufacturing process.

Figure 6:
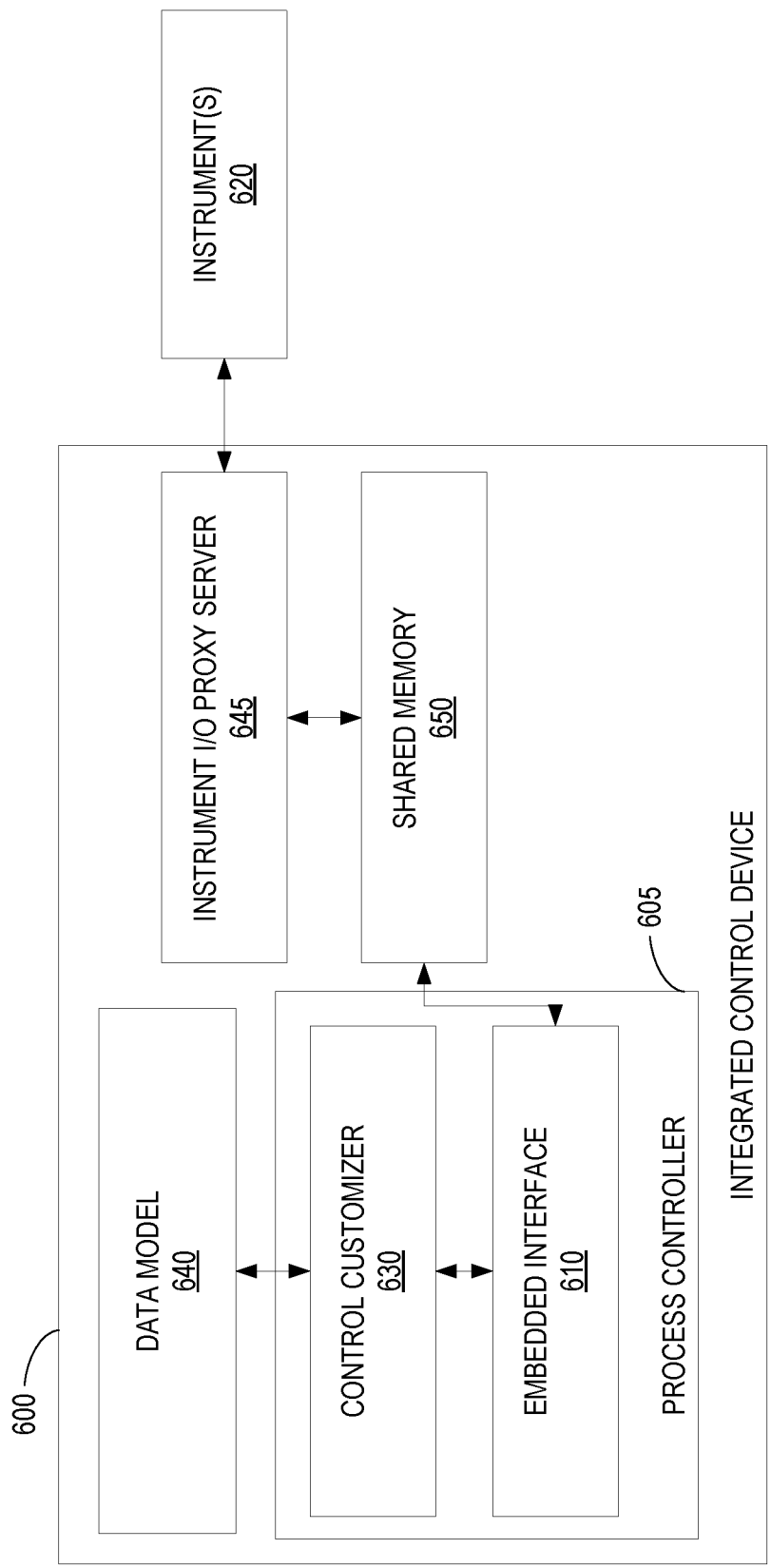
FIG. 6 is a block diagram of an example configuration of the integrated control device of FIG. 2B including an embedded interface configured to communicate with one or more example instrument(s).

FIG. 6 is a detailed block diagram of an example integrated control device 600 which is an alternative implementation of the integrated control device 230 of FIGS. 2B and 4. The example integrated control device 600 includes an example process controller 605, an example embedded interface 610, an example control customizer 630, an example data model 640, an example instrument I/O proxy server 645, and an example shared memory 650. In the example integrated control device 600, the instrument I/O proxy server 645 and the shared memory 650 implement functionality substantially similar or identical to the functionality of the subscription-based I/O server 105 described above in connection with FIGS. 1, 2A-2C, and 3-5 to implement a PAT control strategy in connection with example instruments 620. The example instruments 620 may be substantially similar or identical to the instruments 210 described, above, in connection with FIG. 2A.

To communicate with the instruments 620, the example integrated control device 600 includes the embedded interface 610. For example, the embedded interface 610 may use the instrument I/O proxy server 645 to publish commands to the instruments 620.

The example integrated control device configuration 600 is configured to issue commands stored in the shared memory 650 to the instruments 620. The example integrated control device configuration 600 is configured to allow the instruments 620 to publish measurement data to the instrument I/O proxy server 645 so that the instrument I/O proxy server 645 can store the measurement data in the shared memory 650. For example, the instrument I/O proxy server 645 may store sensor data at a first memory location and device-specific metadata to a second memory location. In such an example, the first and second memory locations may be configured as part of a buffer at which the embedded interface 610 may access data In the example shared memory 650, the process controller 605 may access and/or store current and/or previous sensor and metadata.

In the example of FIG. 6, the process controller 605 is an example configuration of the control device 215 of FIGS. 2A and 3. The example process controller 605 is coupled to the data model 640 and the shared memory 650. The example process controller 605 includes the embedded interface 610 and the control customizer 630. The example process controller 605 is configured to access the data model 640 for use by the strategy controller 320 to determine a product quality prediction. The example process controller 605 is configured to access data stored in the shared memory 650 For example, the process controller 605 may access the shared memory 650 to obtain current and/or historical sensor and metadata published to the instrument I/O proxy server 645. In some examples, the example process controller 605 may access sensor data stored in the shared memory 650 without access to the instrument I/O proxy server 645.

The example embedded interface 610 is communicatively coupled between the control customizer 630 and the shared memory 650. The example embedded interface 610 is configured to include functionality substantially similar or identical to the functionality of the DSCPD 305 described above in connection with FIGS. 3-5. The example embedded interface 610 is configured to publish commands to the instruments 620 by storing commands in the shared memory 650. The example embedded interface 610 may select a command to be published in a substantially similar manner as described above in connection with the PAT device management circuitry 325 of FIGS. 3-5. For example, the embedded interface 610 may select the command based on a product quality value and/or a product quality prediction.

The example embedded interface 610 is configured to convert sensor data and/or device metadata of a data type specific to the communication protocol utilized by one or more of the instruments 620 to a shared data type of a communication protocol utilized to provide subscriber devices access to measurement data. After converting the sensor data and/or device metadata, the embedded interface 610 stores the converted sensor data and/or device metadata as measurement data. For example, the embedded interface 610 may a convert sensor data and/or device metadata from a Tec5 specific data type to a DeltaV data type before storing the converted data to a memory location in the shared memory 650 corresponding to publication of measurement data. Subsequently, subscriber devices configured for DeltaV may access the converted data published using the DeltaV data type. In such an example, the embedded interface 610 may publish converted data to the subscription-based I/O server 105 by writing the converted data to the shared memory 650. The example embedded interface 610 reduces integration complexity of the integrated control device configuration 600 by converting data types of device-specific communication protocol to a data type of a predetermined communication protocol.

The example instruments 620 include PAT devices (e.g., the instruments 210A-210D of FIGS. 2A-2C and 3-5) configured to monitor processes of manufacture (e.g., the processes 120, 130, and 140 of FIG. 1). The example instruments 620 are coupled to instrument I/O proxy server 645 using one or more communication protocols and the instrument I/O proxy server 645 includes device-specific drivers to support such one or more communication protocols. The example instruments 620 are configured to publish measurement data to the shared memory 650 using the instrument I/O proxy server 645. The example instruments 620 may be a physical or virtual device that is configured to provide scalar and/or spectral data of processes of manufacture. The example instruments 620 are configured to include a plurality of PAT devices associated with individual addresses used to individually address one or more commands intended for corresponding ones of the instruments 620. In examples disclosed herein, an individual address may be referred to as a device identification value. For example, a particular PAT device, such as an instrument 620, may be a destination of a write command when the embedded interface 610 selects a device-specific command including a device identification value corresponding to that PAT device. The PAT devices (e.g., the example instruments 620) may be configured to publish data using a plurality of communication protocols. For example, published sensor data stored in the shared memory 650 may be of one or more communication protocol-specific data types.

The example control customizer 630 is communicatively coupled between the embedded interface 610 and the data model 640. In examples disclosed herein, by configuring the control customizer 630 based on a product being manufactured, the control customizer 630 executes operations of a process-specific application. The example control customizer 630 determines a product quality based on a product quality specification corresponding to the product being manufactured. The example control customizer 630 may be referred to as a third-party application. For example, the control customizer 630 may be implemented using custom function libraries (e.g., an application programming interface, a software development kit, etc.) developed and/or provided by third parties. The example control customizer 630 is configured to access data stored in the shared memory 650 using the embedded interface 610. For example, the embedded interface 610 may convert data from the shared memory 650 in substantially real-time on an as-needed basis when a data access request is received and provide the converted data as measurement data to the control customizer 630. The example embedded interface 610 may reduce the duration between sensor data being collected and determining a product quality by providing sensor data to the control customizer 630 in substantially real-time. The integration complexity of the example control customizer 630 is reduced by using the embedded interface 610 to convert sensor data and providing the converted data as measurement data to the control customizer 630.

The example data model 640 accessible by the control customizer 630. The example data model 640 may include parametric data and may be used by the control customizer 630 to determine a product quality prediction based on sensor data. For example, the control customizer 630 may be configured by the data model 640 to determine a product quality prediction based on current sensor data. The example data model 640 is a spectral data model configured to represent spectral analysis using one or more parametric values. The example control customizer 630 may be configured to modify a manufacturing process when an analysis of sensor data and the data model 640 reveals that a product quality prediction does not satisfy a product quality specification. In this manner, modifications to the processes cause subsequent product quality values to satisfy the product quality specification. The example data model 640 may be configured to provide an indication to the control customizer 630 to select a command which may correct a product quality prediction. The example data model 640 enables the control customizer 630 to determine a product quality prediction that may be used by the control customizer 630 to initiate a modification to the manufacturing process to correct for a product quality prediction which fails in satisfying the product quality specifications. The example data model 640 may be generated using historical sensor data and/or historical product quality values. The example data model 640 may be trained based on a comparison of one or more product quality predictions to one or more subsequent product quality values.

The example shared memory 650 is communicatively coupled between the instrument I/O proxy server 645 and the embedded interface 610. The example shared memory 650 is configured to store data from the instruments 620 and commands from the embedded interface 610. The example shared memory 650 may store measurement data in a shared data type. By using the shared data type to store the measurement data, the devices subscribed to the subscription-based I/O server 105 may access the measurement data from the instruments 620 using a shared communication protocol. For example, data stored in the shared memory 650 using communication protocol-specific data types is converted to the shared data type by the embedded interface 610 prior to the data being accessible by subscriber devices.

The example shared memory 650 is configured to decrease latency and overhead between the embedded interface 610 and the instruments 620 by making data from the instruments 620 available on a substantially constant basis. The example shared memory 650 may include security operations to ensure the integrity of measurements and/or prevent malicious data from modifying the operations of the integrated control device configuration 600. For example, the shared memory 650 may include a buffer region wherein data from the instruments 620 may be authenticated and/or encrypted using on-the-fly operations. In the illustrated example, the embedded interface 610 is a primary subscriber to the instrument I/O proxy server 645. Such as the example shared memory 650 is configured to receive commands from the embedded interface 610. Access to a device-specific network between the example instrument I/O proxy server 645 and the example instruments 620 is separated from the process controller 605 by the shared memory 650. The example shared memory 650 enables subscriber devices to access historical measurement data and/or product quality values using the instrument I/O proxy server 645.

Figure 7:
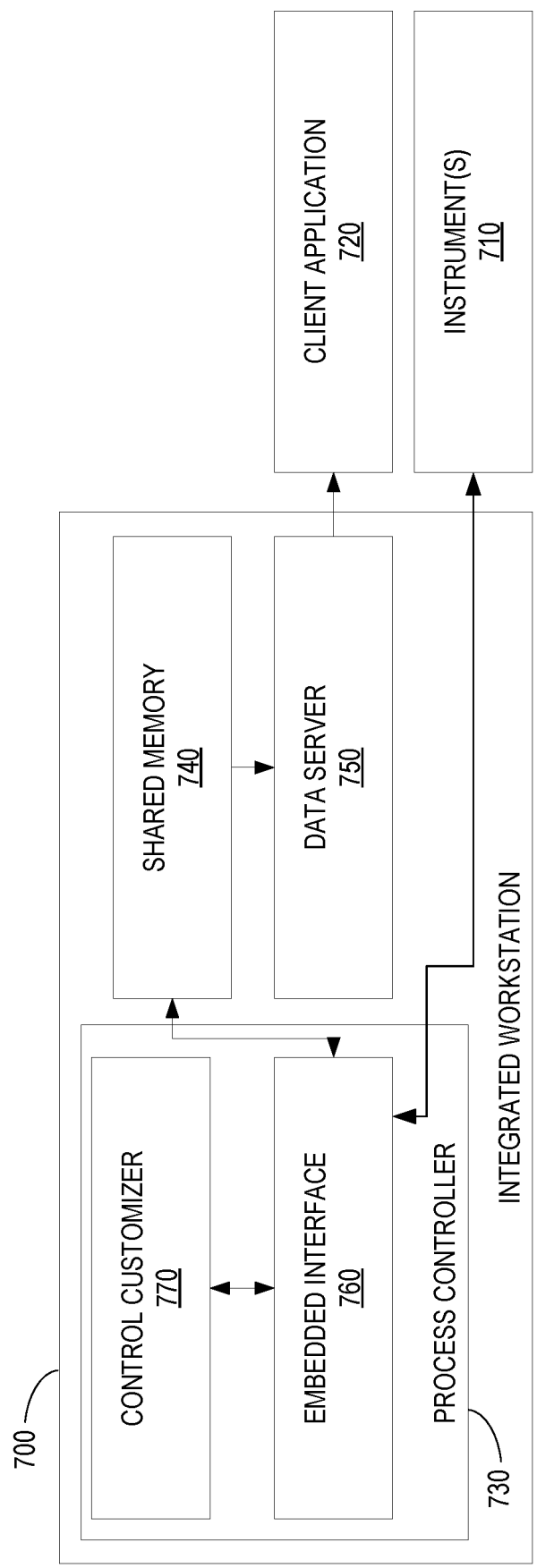
FIG. 7 is a block diagram of a first example workstation configuration of the integrated workstation of FIG. 2C to interface with one or more example instrument(s) and an example client application.

FIG. 7 is a detailed block diagram of a first example integrated workstation 700 which is an alternative implementation of the integrated workstation 240 of FIG. 2C configured to interface with example instrument(s) 710 and an example client application 720. The first example integrated workstation 700 is communicatively coupled to the instruments 710 and the client application 720. The first example integrated workstation 700 includes an example process controller 730, an example shared memory 740, an example data server 750, an example embedded interface 760, and an example control customizer 770. In the first example integrated workstation 700, the shared memory 740, the data server 750, and the embedded interface 760 implement functionality substantially similar or identical to the functionality of the subscription-based I/O server 105 described, above in connection with FIGS. 1, 2A-2C, and 3-5 to implement a PAT control strategy in connection with example instruments 710. The example instruments 710 may be substantially similar or identical to the instruments 210 described above in connection with FIG. 2A.

To communicate with the example instruments 710, the first example integrated workstation 700 includes the embedded interface 760. For example, the embedded interface 760 may use device-specific communications to publish commands to the instruments 710.

In the example of FIG. 7, the process controller 730 includes the example embedded interface 760 and the example control customizer 770. The example process controller 730 is communicatively coupled between the instruments 710 and the shared memory 740. The example process controller 730 is configured to determine a product quality based on sensor data from the instruments 710. The example process controller 730 may be configured to modify the manufacturing process in response to determining that a product quality fails to satisfy a product quality specification.

The example embedded interface 760 is communicatively coupled to the instruments 710, the shared memory 740, and the control customizer 770. The example embedded interface 760 is configured similar to DSCPD 305 of FIG. 3-5 and the embedded interface 610 of FIG. 6. The example embedded interface 760 is configured to communicate with the instruments 710 using device-specific communications protocols. The example embedded interface 760 is configured to publish data to the data server 750 by storing the data to the shared memory 740. The example embedded interface 760 is configured to transmit commands to the instruments 710 using a device-specific communication.

The example control customizer 770 is communicatively coupled to the embedded interface 760 and the embedded interface 760 may be configured to write data to the shared memory 740 and/or the control customizer 770. The example control customizer 770 is configured similar to the control customizer 630 of FIG. 6. The example control customizer 770 is configured to use sensor data from the embedded interface 760 to determine a product quality value. The example control customizer 770 may be configured to store product quality values to the shared memory 740 using the embedded interface 760. The example control customizer 770 may be configured based on the product being manufactured.

The example shared memory 740 is communicatively coupled to the data server 750 and the embedded interface 760. The example shared memory 740 is configured similar to the shared memory 650 of FIG. 6. The example shared memory 740 is configured to receive data from the embedded interface 760 and allow access to published data by the data server 750.

The example data server 750 is communicatively coupled between the client application 720 and the shared memory 740. In the illustrated example, the client application 720 is a subscriber device, and the data server 750 is configured to provide data from the shared memory 740 to the client application 720. The example data server 750 is configured similar to the subscription-based I/O server 105 of FIGS. 1, 2A-2C, and 3-6, such that the data server 750 may provide subscriber devices access to published data. For example, the data server 750 allows access to published data stored in the shared memory 740. In addition, the data server 750 prevents commands from being published to the instruments 710.

The example instruments 710 are communicatively coupled to the embedded interface 760. The example instruments 710 are configured similar to the instruments 210 of FIGS. 2A-2C and 3-6, such that measurement data from the instruments 710 are published to the data server 750 by the embedded interface 760. The example client application 720 is a subscriber device and is communicatively coupled to the data server 750. The example client application 720 is configured similar to the third-party chemometric tool 355 of FIGS. 3-5. The example client application 720 may be specific to the product being produced and include one or more of the components of the workstation 220 of FIGS. 2A, 2B, 3, and 4.

Figure 8:
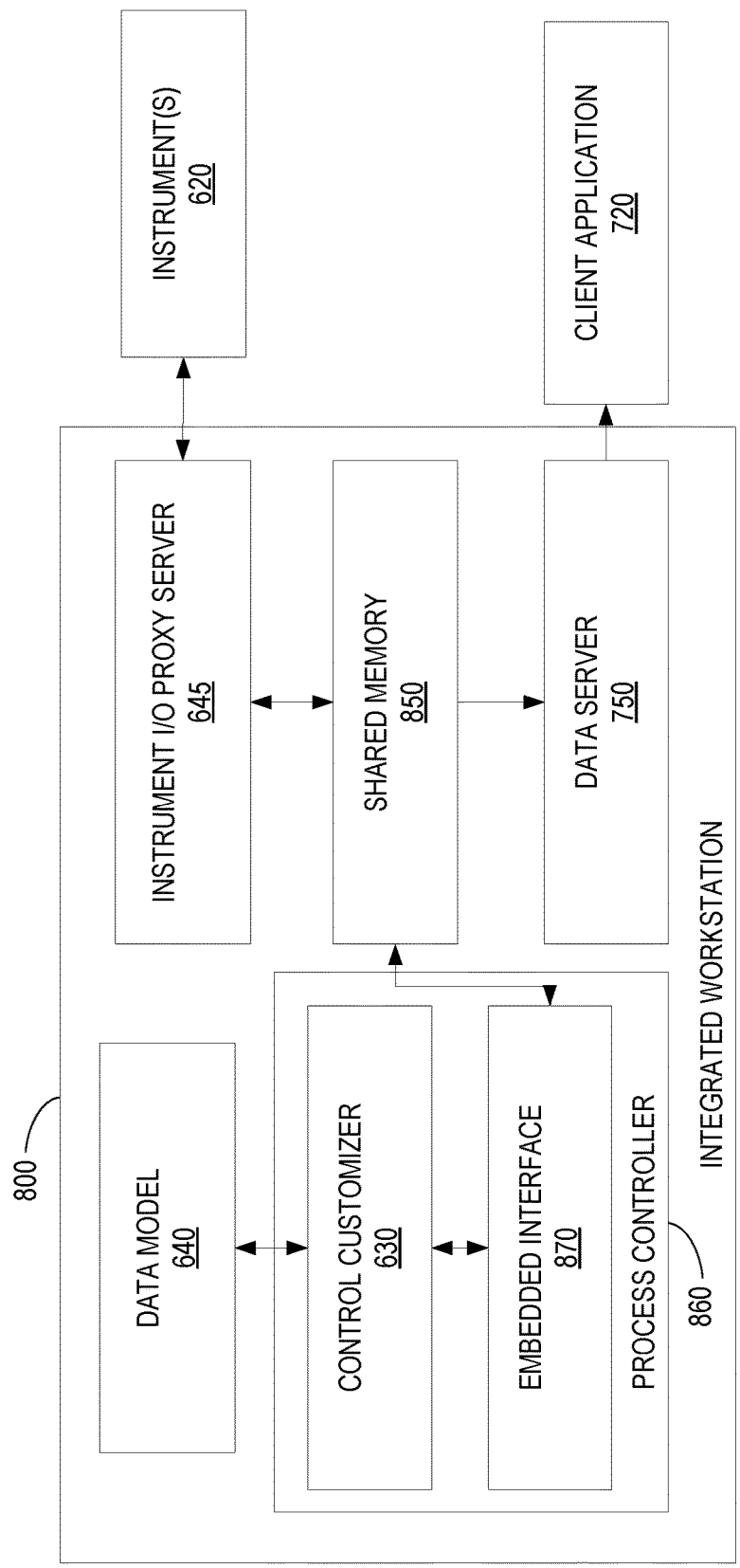
FIG. 8 is a block diagram of a second example workstation configuration of the integrated workstation of FIG. 2C to interface with one or more example instrument(s) and an example client application using an example instrument server and an example data server.

FIG. 8 is a detailed block diagram of a second example integrated workstation 800 which is an alternative implementation of the integrated workstation 240 of FIG. 2C. The second example integrated workstation 800 is configured to interface with the instrument(s) 620 of FIG. 6 and the client application 720 of FIG. 7 using the instrument I/O proxy server 645 of FIG. 6 and the data server 750 of FIG. 7. The second example integrated workstation 800 includes the control customizer 630 of FIG. 6, the data model 640 of FIG. 6, the instrument I/O proxy server 645, the data server 750 of FIG. 7, an example shared memory 850, an example process controller 860, and an example embedded interface 870. In the second example integrated workstation 800, the instrument I/O proxy server 645, the data server 750, and the shared memory 850 implement functionality substantially similar or identical to the functionality of the subscription-based I/O server 105 described above in connection with FIGS. 1, 2A-2C, and 3-5 to implement a PAT control strategy in connection with example instruments 620.

To communicate with the instruments 620, the second example integrated workstation 800 includes the embedded interface 870. For example, the embedded interface 870 may use the instrument I/O proxy server 645 to publish commands to the instruments 620.

The example process controller 860 is communicatively coupled between the data model 640 and the shared memory 850. The example process controller 860 includes the control customizer 630 of FIG. 6 and the example embedded interface 870. The example process controller 860 is configured as a primary subscriber device, such that it may write and/or access data stored in the shared memory 850. The example process controller 860 may be configured to modify the manufacturing process based on determining a product quality value fails to satisfy the product quality specifications for a product being manufactured.

The example embedded interface 870 is communicatively coupled between the control customizer 630 and the shared memory 850. The example embedded interface 870 is configured to access instrument data published and stored in the shared memory 850 by the instrument I/O proxy server 645. The example embedded interface 870 is configured to convert instrument data from a communication protocol-specific data type to a shared data type and that the data server 750 may utilize a communication protocol to allow the client application 720 to access the instrument data. The example embedded interface 870 is configured to provide instrument data to the control customizer 630 and the control customizer 630 may utilize the data model 640 to determine a product quality value and/or a product quality prediction based on the instrument data. The example embedded interface 870 is configured to publish data to the data server 750 by storing data in a region of the shared memory 850. The example instrument I/O proxy server 645, the data server 750, and the shared memory 850 perform operations substantially similar or identical to operations of the subscription-based I/O server 105 of FIGS. 1, 2A-2C, and 3-5.

Figure 9:
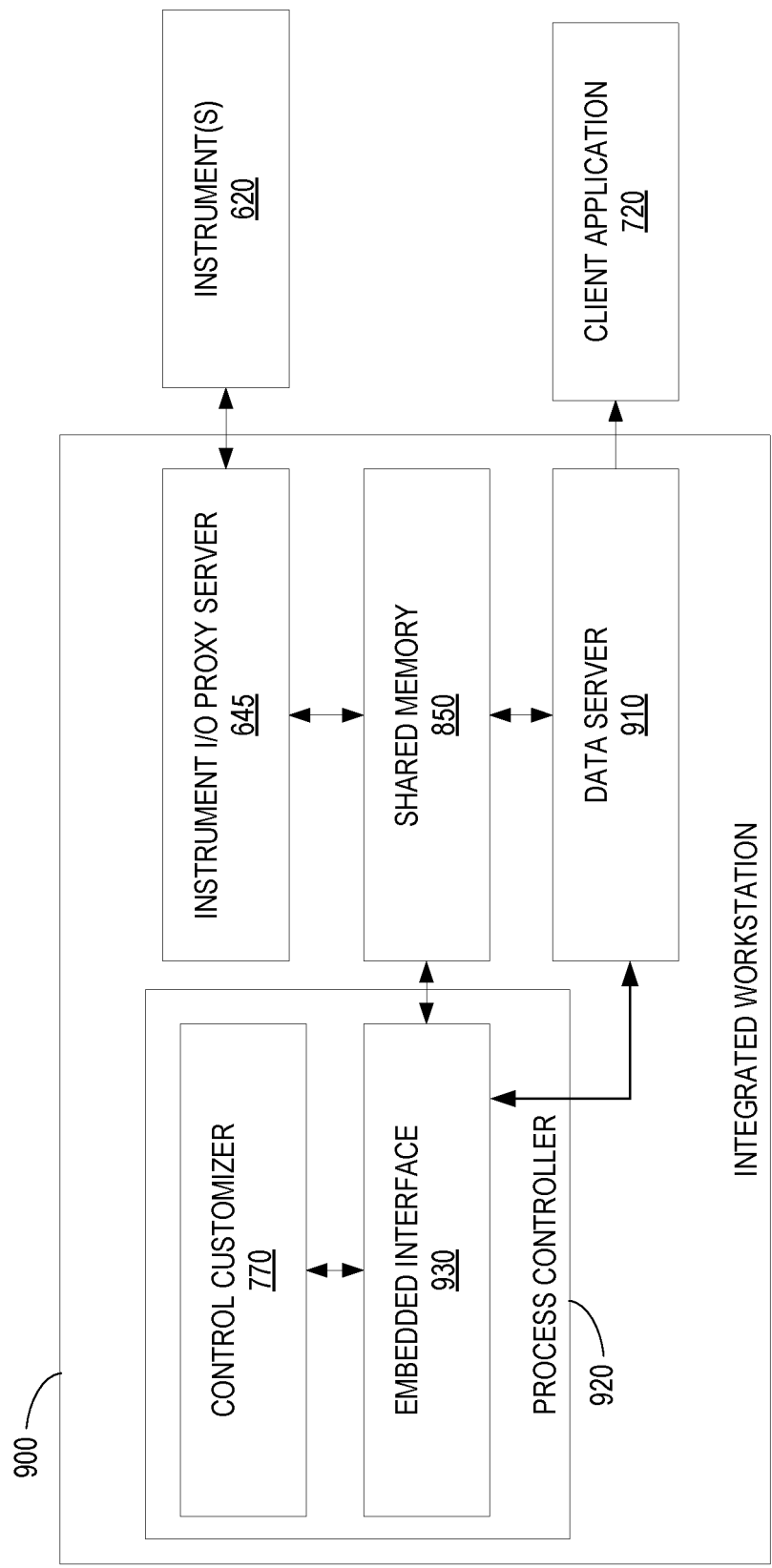
FIG. 9 is a block diagram of a third example workstation configuration of the integrated workstation of FIG. 2C to interface with the one or more instrument(s) and the client application of FIG. 8 based on an example control customizer.

FIG. 9 is a detailed block diagram of a third example integrated workstation 900 which is an alternative implementation of the integrated workstation 240 of FIG. 2C. The third example integrated workstation 900 is configured to interface with the instrument(s) 620 of FIGS. 6 and 8 and the client application 720 of FIG. 7 using the instrument I/O proxy server 645 of FIGS. 6 and 8 and the data server 750 of FIGS. 7 and 8. The third example integrated workstation 900 includes the instrument I/O proxy server 645, the control customizer 770 of FIG. 7, the shared memory 850 of FIG. 8, an example data server 910, and an example process controller 920. In the third example integrated workstation 900, the instrument I/O proxy server 645, shared memory 850, and the data server 910 implement functionality substantially similar or identical to the functionality of the subscription-based I/O server 105 described above in connection with FIGS. 1, 2A-2C, and 3-5 to implement a PAT control strategy in connection with example instruments 620.

To communicate with the instruments 620, the third example integrated workstation 900 includes the embedded interface 930. For example, the embedded interface 930 may use the instrument I/O proxy server 645 to publish commands to the instruments 620.

In the example of FIG. 9, the data server 910 is communicatively coupled to the client application 720, the shared memory 850, and the process controller 920. The example data server 910 is configured to allow the client application 720 to access data stored in the shared memory 850. The example data server 910 is communicatively coupled to one or more subscriber devices and is configured to provide the subscriber devices access to measurement data. The example data server 910 may be configured to receive measurement data from the process controller 920. For example, the process controller 920 may provide a data indication to the data server 910 that measurement data is stored in the shared memory 850. In such an example, the data indication to the data server 910 may include a memory address at which measurement data is stored in the shared memory 850 or may include one or more portions of the measurement data to be published to the data server 910. The example data server 910 may monitor and/or control access to the shared memory 850 by subscriber devices, such as the client application 720. The example data server 910 may determine a memory location of measurement data and/or measurement data in the shared memory 850 based on an indication from the process controller 920.

In the example of FIG. 9, the process controller 920 is communicatively coupled to the shared memory 850 and the data server 910. The example process controller 920 includes the control customizer 770 of FIG. 7 and the example embedded interface 930. The example process controller 920 is configured to access data stored in the shared memory 850 by the instrument I/O proxy server 645 to determine a product quality value and/or generate a quality product prediction corresponding to a future product quality value. The example process controller 920 may be configured to convert measurement data from the instrument I/O proxy server 645 and stored in the shared memory 850 to a shared data type. For example, the shared data type is a data type of a communication protocol configured to allow data exchange between the data server 910, the shared memory 850, and/or the process controller 920.

The example embedded interface 930 is communicatively coupled to the control customizer 770, the shared memory 850, and the data server 910. The example embedded interface 930 is configured to access device-specific measurement data from the instrument I/O proxy server 645, stored in the shared memory 850, in substantially real-time. The example embedded interface 930 may be configured to convert measurement data from a first data type, specific to a first communication protocol used to collect the measurement data from one or more of the components included in the instruments 620, to a second data type, specific to a second communication protocol used to allow the data server 910 to provide access to the measurement data. For example, the embedded interface 930 may convert measurement data of a string data type to a multi-dimensional double array data type, such that DeltaV communications libraries may be implemented to allow subscriber devices to access the measurement data. In such an example, the embedded interface 930 may combine one or more measurements to generate a data structure including a plurality for any given time. The example embedded interface 930 converts measurement data collected using one or more device-specific data types to a shared data structure to enable a shared communication protocol which may not include support for the one or more device-specific data types.

The example embedded interface 930 is configured to provide measurement data to the control customizer 770. Based on the measurement data, the control customizer 770 may implement a control strategy for a manufacturing process. For example, the embedded interface 930 may be configured to receive a product quality value from the control customizer 770 based on measurement data provided to the control customizer 770. The example embedded interface 930 may be configured to select, generate, or determine a management command and/or a calibration command based on at least one of the measurement data, the product quality value, and/or a product quality prediction. The example embedded interface 930 may select a command to modify the instruments 620 and/or one or more of the processes involved in the manufacturing of the product. For example, the embedded interface 930 may select a command to calibrate the instruments 620 in response to receiving metadata indicating a fault or sensor data outside of a set range. In such an example, the embedded interface 930 may publish the command to the instrument I/O proxy server 645 by storing the command in a region of the shared memory 850 corresponding to commands to be published to one or more of the instruments 620. The example embedded interface 930 may select a command to modify the manufacturing process based on a product quality value. The example embedded interface 930 may publish the selected command to the instrument I/O proxy server 645 by storing the command in a region of the shared memory 850. The example instrument I/O proxy server 645, the shared memory 850, and the data server 910 may be used to implement the subscription-based I/O server 105 of FIGS. 1, 2A-2C, and 3-5.

Figure 10:
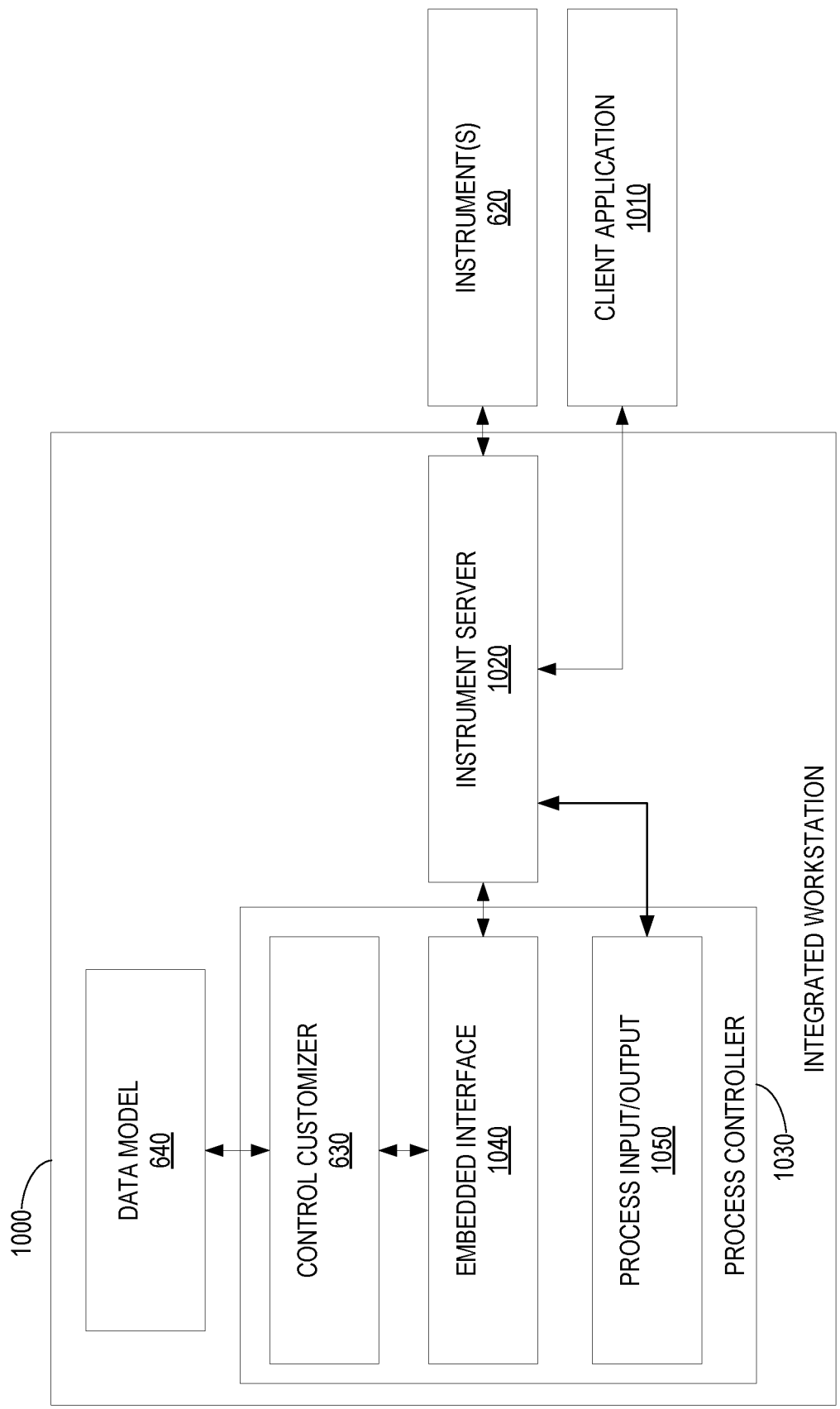
FIG. 10 is a block diagram of a fourth example workstation configuration of the integrated workstation of FIG. 2C to interface with one or more example instrument(s), an example client application, and an example process input/output data.

FIG. 10 is a detailed block diagram of a fourth example integrated workstation 1000 which is an alternative implementation of the integrated workstation 240 of FIG. 2C configured to interface with the instrument(s) 620 of FIGS. 6, 8, and 9 and an example client application 1010. The fourth example integrated workstation 1000 is coupled to the instruments 620 and the client application 1010. The fourth example integrated workstation 1000 includes the control customizer 630 of FIGS. 6 and 8, the data model 640 of FIGS. 6 and 8, an example instrument server 1020, an example process controller 1030, an example embedded interface 1040, and an example process input/output (PIO) circuitry 1050. In the fourth example integrated workstation 1000, the instrument I/O proxy server 1020 implements functionality substantially similar or identical to the functionality of the subscription-based I/O server 105 described above in connection with FIGS. 1, 2A-2C, and 3-5 to implement a PAT control strategy in connection with example instruments 620.

To communicate with the instruments 620, the fourth example integrated workstation 1000 includes the embedded interface 1040. For example, the embedded interface 1040 may use the instrument I/O proxy server 1020 to publish commands to the instruments 620.

The example instrument I/O proxy server 1020 is coupled to the instruments 620, the client application 1010, and the process controller 1030. The example instrument server 1020 is configured to use one or more device-specific communication protocols to exchange data with the instruments 620 across a device-specific network. The example instrument server 1020 is configured to allow subscriber devices and primary subscriber devices to access measurement data collected by the instruments 620. The example instrument server 1020 is configured to allow publisher devices to publish data to the instrument server 1020, such that data published to the instrument server 1020 may be accessed by subscriber devices. The example instrument server 1020 may be configured to send commands to the instruments 620 in response to receiving a command from the process controller 1030. The example instrument server 1020 may monitor and/or control access to published data, such that the instrument server 1020 may prevent malicious devices from accessing and/or publishing data.

The example process controller 1030 is communicatively coupled to the data model 640 and the instrument server 1020. In the example of FIG. 10, the process controller 1030 includes the control customizer 630 of FIGS. 6 and 8, the example embedded interface 1040, and the example PIO circuitry 1050. The example process controller 1030 is configured to allow access to measurement data, from the instruments 620, utilizing a shared data type. In the illustrated example, the instrument server 1020 or the embedded interface 1040 converts measurement data to a shared data type, prior to providing the control customizer 630 and/or the client application 1010 access to the measurement data. The example process controller 1030 is configured to provide device-specific commands to the instrument server 1020 to modify the instruments 620.

The example embedded interface 1040 is communicatively coupled between the control customizer 630 and the instrument server 1020. The example embedded interface 1040 is configured to provide measurement data, from the instruments 620, to the control customizer 630 and/or subscriber devices (e.g., the client application 1010) coupled to the instrument server 1020. The example embedded interface 1040 may be configured to convert and/or combine measurement data to enable access to measurement data in a shared data type of the communication protocol used by subscriber devices. The example embedded interface 1040 may be configured to provide a command to the instrument server 1020 to send to at least one of the instruments 620 based on a product quality value and/or a product quality prediction, determined using measurement data.

The example PIO circuitry 1050 is communicatively coupled to the instrument server 1020. The example PIO circuitry 1050 is configured as a subscriber device, such that the PIO circuitry 1050 may access data published to the instrument server 1020. The example PIO circuitry 1050 may be configured to select, generate, or determine a command to modify the manufacturing process. For example, the PIO circuitry 1050 may modify one or more of the processes 120, 130, and/or 140 of FIG. 1 in response to determining, based on substantially real-time measurements from the instruments 620, that a modification may increase a product quality value. The example PIO circuitry 1050 may be configured to publish commands to the instrument server 1020 to manage and/or calibrate the instruments 620.

Figure 11:
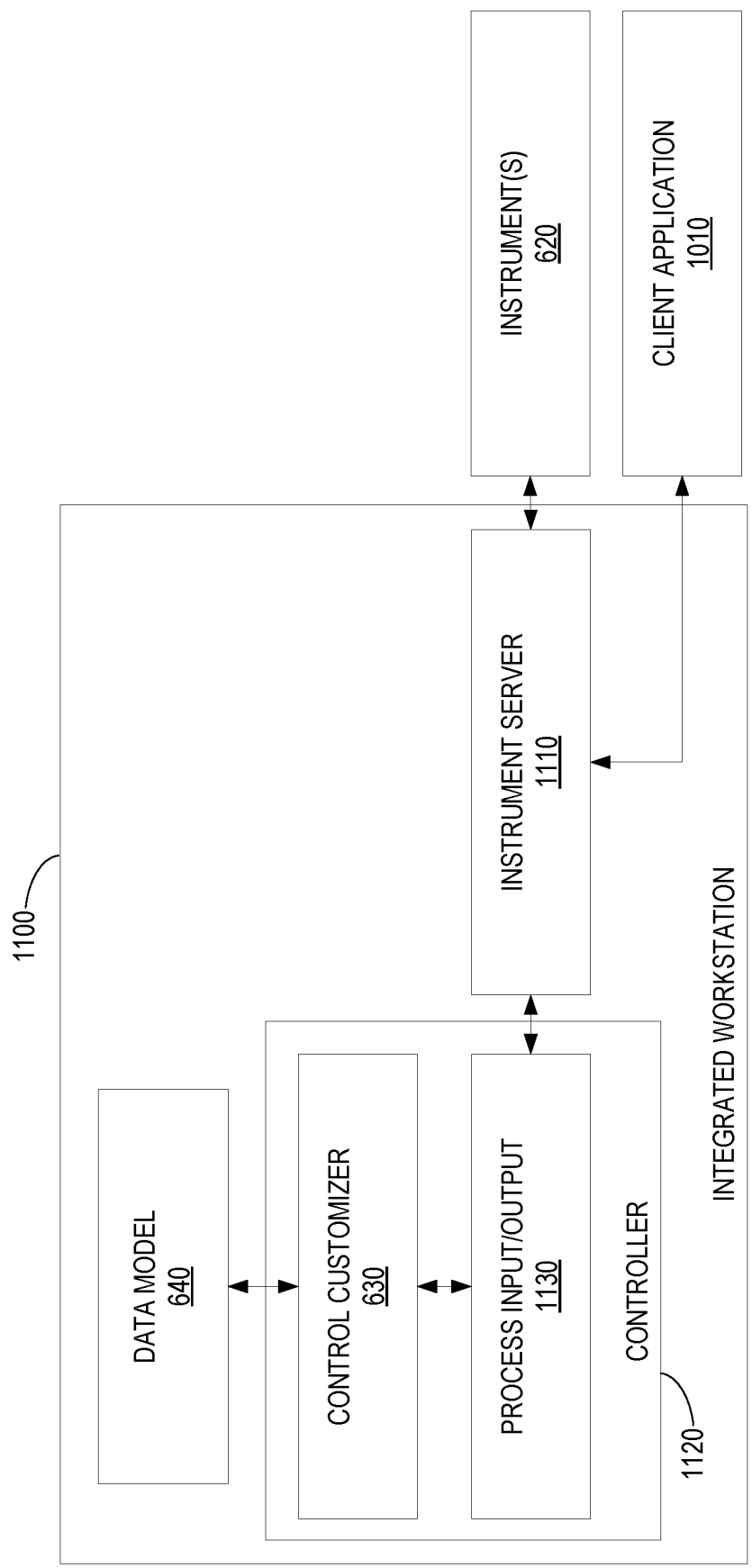
FIG. 11 is a block diagram of a fifth example workstation configuration of the integrated workstation of FIG. 2C to communicate with one or more example instrument(s) and an example client application based on an example process input/output data.

FIG. 11 is a detailed block diagram of a fifth example integrated workstation 1100 which is an alternative implementation of the integrated workstation 240 of FIG. 2C. The fifth example integrated workstation 1100 is configured to interface with example instrument(s) 620 of FIGS. 6 and 8-10 and the client application 1010 of FIG. 10. The fifth example integrated workstation 1100 includes the control customizer 630 of FIGS. 6, 8, and 10, the data model 640, an example instrument I/O proxy server 1110, an example controller 1120, and an example process input/output (PIO) circuitry 1130. In the fifth example integrated workstation 1100, the instrument I/O proxy server 1110 implements functionality substantially similar or identical to the functionality of the subscription-based I/O server 105 described above in connection with FIGS. 1, 2A-2C, and 3-5 to implement a PAT control strategy in connection with example instruments 620.

To communicate with the instruments 620, the fifth example integrated workstation 1100 includes the PIO circuitry 1130. For example, the PIO circuitry 1130 may use the instrument I/O proxy server 1110 to publish commands to the instruments 620.

The example instrument I/O proxy server 1110 is coupled to the instruments 620, the client application 1010, and the controller 1120. The example instrument I/O proxy server 1110 is configured similar to the instrument server 1020 of FIG. 10. The example instrument I/O proxy server 1110 is configured to send commands from the controller 1120 to the instruments 620. The example instrument I/O proxy server 1110 is configured to allow the client application 1010 to access measurement data from the instruments 620.

The example controller 1120 is coupled to the data model 640 and the instrument I/O proxy server 1110. The example controller 1120 includes the control customizer 630 of FIGS. 6, 8, and 10 and the PIO circuitry 1130. The example controller 1120 is configured to access measurement data from the instruments 620 using device-specific communications protocols to access data published to the instrument I/O proxy server 1110 by the instruments 620. The example controller 1120 is configured to publish commands to the instrument I/O proxy server 1110 to manage and/or calibrate the PAT devices such as the instruments 620.

The example PIO circuitry 1130 is coupled between the control customizer 630 and the instrument I/O proxy server 1110. The example PIO circuitry 1130 is configured to provide substantially real-time measurement data to the control customizer 630. The example PIO circuitry 1130 is configured to include the operations of the embedded interface 1040 of FIG. 10 and the operations of the PIO circuitry 1050 of FIG. 10.

Figure 12:
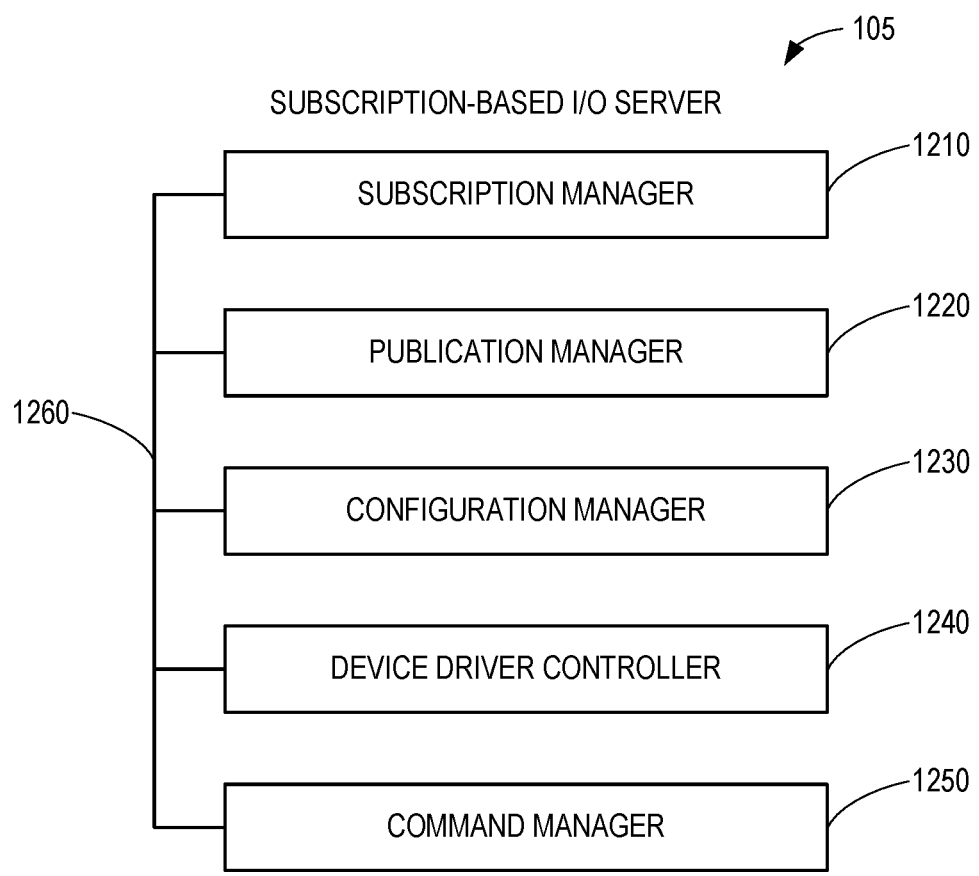
FIG. 12 is a block diagram of the example subscription-based input/output server of FIGS. 1 and 2A-2C.

FIG. 12 is a block diagram of the example subscription-based I/O server 105 of FIGS. 1, 2A-2C, and 3-5 to allow subscriber devices to access measurement data, allow publisher devices to publish measurement data, and allow primary subscriber devices to publish commands. The example subscription-based I/O server 105 of FIG. 12 may be instantiated (e.g., creating an instance of, bring into being for any length of time, materialize, implement, etc.) by processor circuitry such as a central processing unit executing instructions. Additionally or alternatively, the subscription-based I/O server 105 of FIG. 12 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 12 may, thus, be instantiated at the same or different times. Some or all of the circuitry may be instantiated, for example, in one or more threads executing concurrently on hardware and/or in series on hardware. Moreover, in some examples, some or all of the circuitry of FIG. 12 may be implemented by one or more virtual machines and/or containers executing on the microprocessor.

In the example of FIG. 12, the subscription-based I/O server 105 includes example subscription manager circuitry 1210, example publication manager circuitry 1220, example configuration manager circuitry 1230, example device driver controller circuitry 1240, and example command manager circuitry 1250. The example subscription-based I/O server 105 is configured to provide measurement data from instruments (e.g., the instruments 210 of FIGS. 2A-2C and 3-5) to primary subscriber devices and subscriber devices in substantially real-time. The measurement data may be used to determine a product quality to determine whether a product being manufactured complies with product quality specifications for the product.

The example subscription-based I/O server 105 of the illustrated example includes an example subscription manager 1210, an example publication manager 1220, an example configuration manager 1230, an example device driver controller 1240, an example command manager 1250, and an example BUS 1260. The example subscription-based I/O server 105 is configured to facilitate data exchange between one or more devices. The example subscription-based I/O server 105 may limit and/or modify operations of a device based on the type of the device. For example, the subscription-based I/O server 105 may determine that an HMI (e.g., the HMI 330 of FIGS. 3-5) may perform the operations corresponding to the subscription manager 1210 in response to the configuration manager 1230 identifying the HMI as a subscriber device.

The example subscription-based I/O server 105 may be configured to determine a device type based on one or more rules (e.g., instructions), which specify a process of determining the device type based on a data exchange. For example, the subscription-based I/O server 105 may include a rule that devices with a valid digital signature or a known device identification value may be assigned as a subscriber device and assigned the operations corresponding to the subscription manager 1210. In such examples, the known device identification values are loaded during a configuration of the subscription-based I/O server 105.

In the example of FIG. 12, the subscription manager 1210 is configured to implement a communication protocol library to allow subscriber devices to access data published to the subscription-based I/O server 105. The example subscription manager 1210 is configured to provide access to measurement data in substantially real-time. For example, the subscription manager 1210 may transmit measurement data to one or more of the subscriber devices based on a publication of measurement data by the publication manager 1220. Alternatively, the example subscription manager 1210 may be configured as the data server 750 of FIGS. 7 and 8 or the data server 910 of FIG. 9. In such examples, the subscription manager 1210 may access data stored in a shared memory location (e.g., the shared memory 650 of FIG. 6, 750 of FIG. 7, or the shared memory 850 of FIGS. 8 9).

The example publication manager 1220 is configured to provide a write address (e.g., a memory address in the shared memory 650 of FIG. 6, 740 of FIG. 7, or 850 of FIG. 8) for measurement data to be published to the subscription-based I/O server 105, such that measurement data, from a publisher device, may be published by writing measurement data to the write address provided by the publication manager 1220. The example publication manager 1220 may be configured to publish data by generating and sending an indication to the subscription manager 1210 that measurement data is ready to be sent to the subscriber devices. The example publication manager 1220 may be configured to provide the published data to the subscription manager 1210 and/or provide a memory address of a memory location at which the published data is located. For example, the publication manager 1220 may indicate, to the subscription manager 1210, that a multi-dimensional array of measurement data including sensor data and/or device specific metadata for one or more measurements has been received.

The example publication manager 1220 is configured to allow publication devices to publish data to the subscription-based I/O server 105. The example publication manager 1220 may be configured to allow primary subscriber devices to publish commands to be sent to PAT devices coupled to the subscription-based I/O server 105. For example, the publication manager 1220 may provide a data indication to the command manager 1250 based on at least one of a calibration command or a management command, published by the process I/O layer 310 of FIGS. 3-5, to the subscription-based I/O server 105.

The example configuration manager 1220 is configured to configure the operations of the subscription-based I/O server 105 based on a configuration file. The example configuration manager 1220 may be configured to execute instructions included in the configuration file to establish a list or set of rules to determine whether a device is a subscriber device, a primary subscriber device, or a publisher device. The example configuration manager 1220 may determine a device type based on one or more rules that specify a process of determining the device type based on a data exchange or device identification information. For example, the configuration manager 1230 may implement a rule that characterizes devices with digital signatures as subscriber devices and provides the devices access to the subscription manager 1210.

The example configuration manager 1230 may be configured to provide instructions to one or more of the components of the subscription-based I/O server 105 to perform operations such as establishing communication protocols, determining a shared data type, calibrating PAT devices as instruments, etc. The example configuration manager 1230 may be configured to access a configuration file at a memory location in shared memory (e.g., the shared memory 650 of FIG. 6, the shared memory 740 of FIG. 7, or the shared memory 850 of FIGS. 8 and 9). The example configuration manager 1230 may modify the configuration file to correspond to a particular manufacturing process. For example, the configuration manager 1230 may initialize the subscription manager 1210 to transmit data of a first shared data type based on configuration settings in a first configuration file associated with the manufacture of pharmaceuticals, or to transmit data of a second shared data type based on configuration settings in a second configuration file associated with the manufacture of high value chemicals. In such examples, the subscription based I/O server 105 may utilize commands corresponding to configuration settings in the first and/or second configuration file(s) to initialize the subscription manager 1210. A configuration file may additionally include parametric values to establish a data model to determine a product quality value corresponding to a process of manufacturing.

The example device driver controller 1240 is configured to be communicatively coupled to PAT devices (e.g., the instruments 210 of FIGS. 2A-2C and 3-5, the instruments 620 of FIGS. 6 and 8-10, the instruments 710 of FIG. 7). The example device driver controller 1240 is configured to implement device-specific communication protocols to exchange data with PAT devices configured to measure processes of manufacture. The example device driver controller 1240 may implement one or more communication protocol libraries (e.g., Tec5, OPCUA, DeltaV, Kaiser, VIAVI, etc.), such that the PAT devices may support different communication protocols.

The example device driver controller 1240 is configured to receive device-specific commands from the command manager 1250 and/or the configuration manager 1230. The example device driver controller 1240 may convert the commands to correspond to the communications protocol of the device identified in the command. The example device driver controller 1240 may be configured to allow an embedded interface (e.g., the embedded interface 610 of FIG. 6, the embedded interface 760 of FIG. 7, the embedded interface 870 of FIG. 8, the embedded interface 930 of FIG. 9, or the embedded interface 1040 of FIG. 10) to access measurement data from the PAT devices to convert and/or combine the measurement data into a shared data type included in the communications protocol utilized by the subscription manager 1210. The embedded interface 610, 760, 870, 930, 1040 may be configured to publish the measurement data to the publication manager 1220 by converting the measurement data to the shared data type.

The example command manager 1250 is configured to receive device-specific commands. The example command manager 1250 may be configured to convert commands published to the subscription-based I/O server 105 to commands corresponding to the communication protocol of the PAT device indicated in the device-specific command.

Figure 13:
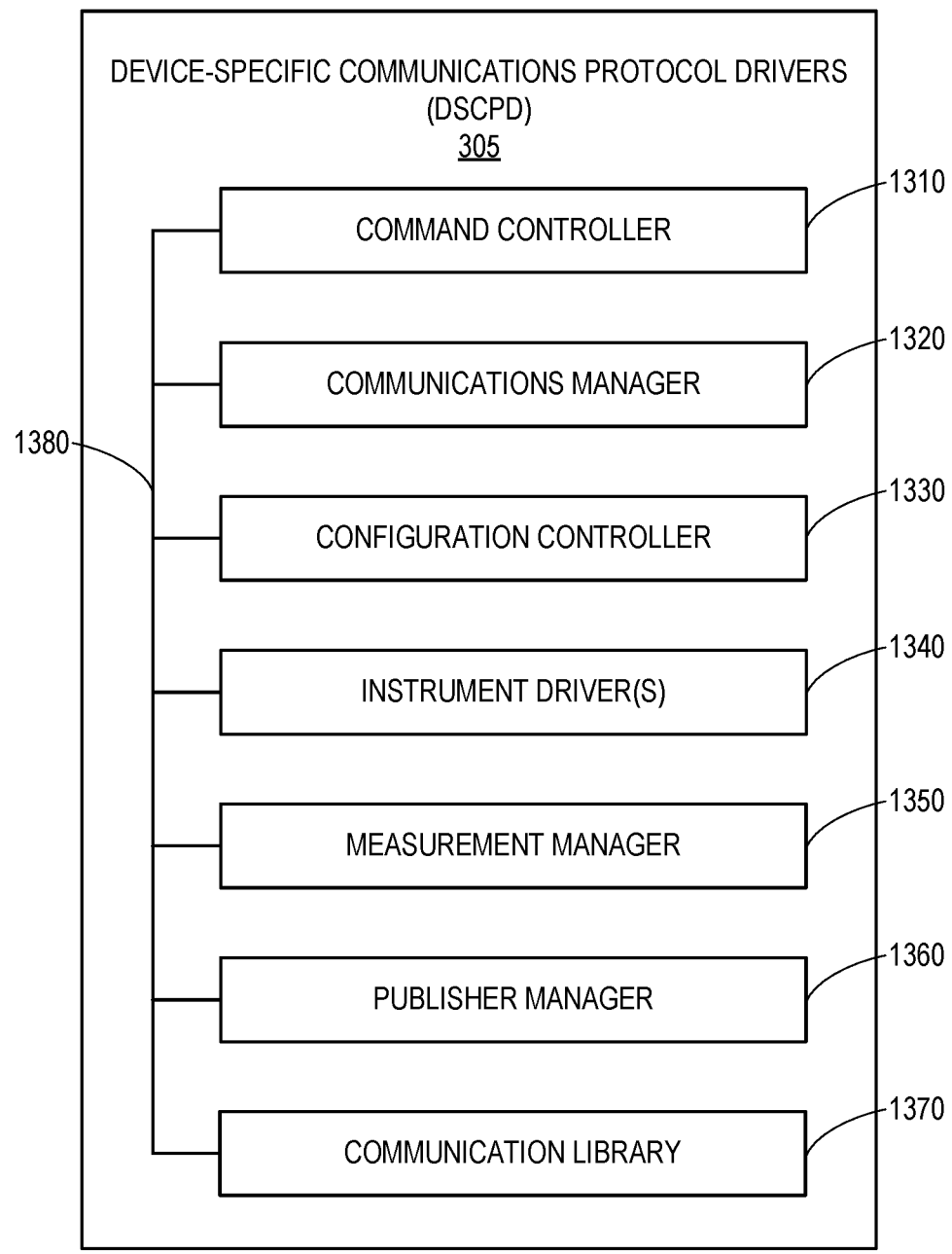
FIG. 13 is a block diagram of an example device-specific communication protocol driver of the example process control system configurations of FIGS. 3-5.

FIG. 13 is a block diagram of the example DSCPD 305 of FIGS. 3-5. The DSCPD 305 of FIG. 13 may be instantiated (e.g., creating an instance of, bring into being for any length of time, materialize, implement, etc.) by processor circuitry such as a central processing unit executing instructions. Additionally or alternatively, the DSCPD 305 of FIG. 12 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 13 may, thus, be instantiated at the same or different times. Some or all of the circuitry may be instantiated, for example, in one or more threads executing concurrently on hardware and/or in series on hardware. Moreover, in some examples, some or all of the circuitry of FIG. 13 may be implemented by one or more virtual machines and/or containers executing on the microprocessor.

In the example of FIG. 13, the DSCPD 305 includes an example command controller 1310, an example communications manager 1320, an example configuration controller 1330, example instrument driver(s) 1340, example measurement manager 1350, example publisher manager 1360, example communications library 1370, and an example BUS 1380. The DSCPD 305 communicatively coupled to the subscription-based I/O server 105 of FIGS. 1, 2A-2C, 3-5, and 12 and the instruments 210 of FIGS. 2A-2C and 3-5. The DSCPD 305 is configured to use device-specific communications to receive sensor data and metadata from the instruments 210. The DSCPD 305 generates measurement data by combining sensor data, metadata, and a device identifier. Additionally, the DSCPD 305 may modify the measurement data to a shared data type of a communication protocol used to communicate with the subscription-based I/O server 105. The DSCPD 305 is configured to publish measurement date to the subscription-based I/O server 105.

The DSCPD 305 receives management commands and/or calibration commands from the subscription-based I/O server 105. The DSCPD 305 modifies the commands based on a communication protocol of the instruments 210 corresponding to the command. The DSCPD 305 issues the commands to one of the instruments 210 using device-specific communications.

The example command controller 1310 receives management commands and/or calibration commands from the subscription-based I/O server 105. For example, the command controller 1310 issues management commands and/or calibration commands one of the instruments 210. The example command controller 1310 determines based on a device identifier, which of the instruments 210 corresponds to a command. The example command controller 1310 may be configured to access the communication library 1370 and/or the instrument driver(s) 1340 to provide commands to one or more of the instruments 210. The subscription-based I/O server 105 transmits commands to the command controller 1310.

The example communications manager 1320 is configured to initiate communications with the instruments 210. For example, the communications manager 1320 may initialize one or more communications protocols using the communications library 1370. The example communications manager 1320 may be configured by the command controller 1310. The example communications manager 1320 generates instructions to initialize communications with the instruments 210.

The example configuration controller 1330 configures the instruments 210 to publish measurement data. For example, the configuration controller 1330 selects instructions to initialize collection of sensor data and/or device specific metadata from the instruments 210. The example configuration controller 1330 selects commands to configure the instruments 210 based on configuration commands. The example configuration controller 1330 may store a configuration based on the configuration commands received by the command controller 1310. The example configuration controller 1330 select commands to establish a reporting frequency, values to be reported, fault detection, etc. The reporting frequency to establish the number of measurements per a duration of time. The values to be reported to establish sensor and/or device-specific meta data to be included in measurement data.

The example instrument driver(s) 1340 is configured to communicate with the instruments 210 using device-specific communications. The example instrument driver(s) 1340 includes one or more divers to support a plurality of communication protocols. For example, the instrument driver(s) 1340 may include pull-up resistors for communication protocols which require an active high communications. The example instrument driver(s) 1340 uses device-specific communications to collect sensor data and/or device-specific metadata from the instruments 210. The example instrument driver 1340 may be configured to provide the data collected from the instruments 210 to the measurement manager 1350 prior to publication to the subscription-based I/O server 105.

The example measurement manager 1350 generates measurement data based on sensor data and/or metadata from the instrument driver(s) 1340. The measurement manager 1350 converts the sensor data and/or the metadata to a data type of a communications protocol used to provide measurement data to the subscription-based I/O server 105. For example, the measurement manager 1350 converts sensor data from a Tec5 specific data type to an array. The example measurement manager 1350 adds a device identifier to the measurement data based which of the instruments 210 correspond to the measurement data. The example measurement manager 1350 may be configured to provide the measurement data to the publisher manager 1360.

The example publisher manager 1360 is configured to publish measurement data from the measurement manager 1350 to the subscription-based I/O server 105. The publisher manager 1360 may be configured to publish sensor data from one or more of the instruments 210 as a single publication. The example publisher manager 1360 transmits a publication indication and/or the measurement data to the subscription based I/O server 105.

The example communications library 1370 stores communication information for one or more communication protocols. The communications information stored in the example communications library 1370 enables components of the DSCPD 305 to construct and/or select device-specific commands. For example, the command controller 1310 accesses the communications library 1370 to select a device-specific command corresponding to a calibration command and/or a management command from the subscription based I/O server 105.

While an example manner of implementing the example subscription-based I/O server 105 of FIGS. 1, 2A-2C, and 3-5 is illustrated in FIG. 12, one or more of the elements, processes, and/or devices illustrated in FIG. 12 may be combined, divided, re-arranged, omitted, eliminated, and/or implemented in any other way. Further, the example DSCPD 305 of FIGS. 3-5, the example process I/O layer 310 of FIGS. 3-5, the example CMPE 315 of FIGS. 3-5, the example strategy controller 320 of FIGS. 3-5, the example PAT device management circuitry 325 of FIGS. 3-5, the example HMI 330 of FIGS. 3-5, the example process monitor 335 of FIGS. 3-5, the example process diagnostics monitor 340 of FIGS. 3-5, the example historical collector 345 of FIGS. 3-5, the example edge/IoT interface 350 of FIGS. 3-5, the example third-party chemometric tool 355 of FIGS. 3-5, the example control system configuration service 360 of FIGS. 3-5, the example embedded interface 610 of FIG. 6, the example control customizer 630 of FIGS. 6, 8, 10, and 11, the example data model 640 of FIGS. 6, 8, 10, and 11, the example instrument I/O proxy server 645 of FIGS. 6, 8, and 9, the example shared memory 650 of FIG. 6, the example shared memory 740 of FIG. 7, the example data server 750 of FIGS. 7 and 8, the example embedded interface 760 of FIG. 7, the example control customizer 770 of FIGS. 7 and 9, the example shared memory 850 of FIGS. 8 and 9, the example embedded interface 870 of FIG. 8, the example data server 910 of FIG. 9, the example embedded interface 930 of FIG. 9, the example instrument server 1020 of FIG. 10, the example embedded interface 1040 of FIG. 10, the example PIO 1050 of FIG. 10, the example instrument server 1110 of FIG. 11, the example PIO 1130 of FIG. 11, the example subscription manager 1210 of FIG. 12, the example publication manager 1220 of FIG. 12, the example configuration manager 1230 of FIG. 12, the example device driver controller 1240 of FIG. 12, the example command manager 1250 of FIG. 12, the example command controller 1310 of FIG. 13, the example communications manager 1320 of FIG. 13, the example configuration controller 1330 of FIG. 13, the example instrument driver(s) 1340 of FIG. 13, the example measurement manager 1350 of FIG. 13, the example publisher manager 1360 of FIG. 13, the example communications library 1370 of FIG. 13 and/or, more generally, the example subscription-based I/O server 105 of FIGS. 1, 2A-2C, and 3-5 may be implemented by hardware alone or by hardware in combination with software and/or firmware. Thus, for example, any of the example DSCPD 305, the example process I/O layer 310, the example CMPE 315, the example strategy controller 320, the example PAT device management circuitry 325, the example HMI 330, the example process monitor 335, the example process diagnostics monitor 334, the example historical collector 345, the example edge/IoT interface 350, the example third-party chemometric tool 355, the example control system configuration service 360, the example embedded interface 610, the example control customizer 630, the example data model 640, the example instrument I/O proxy server 645, the example shared memory 650, the example shared memory 740, the example data server 750, the example embedded interface 760, the example control customizer 770, the example shared memory 850, the example embedded interface 870, the example data server 910, the example embedded interface 930, the example instrument server 1020, the example embedded interface 1040, the example PIO 1050, the example instrument server 1110, the example PIO 1130, the example subscription manager 1210, the example publication manager 1220, the example configuration manager 1230, the example device driver controller 1240, the example command manager 1250 the example command controller 1310, the example communications manager 1320, the example configuration controller 1330, the example instrument driver(s) 1340, the example measurement manager 1350, the example publisher manager 1360, the example communications library 1370, and/or, more generally, the example subscription-based I/O server 105, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example subscription-based I/O server 105 of FIGS. 1, 2A-2C, and 2-5 may include one or more elements, processes, and/or devices in addition to, or instead of, those illustrated in FIG. 12, and/or may include more than one of any or all of the illustrated elements, processes, and devices.

Figure 14:
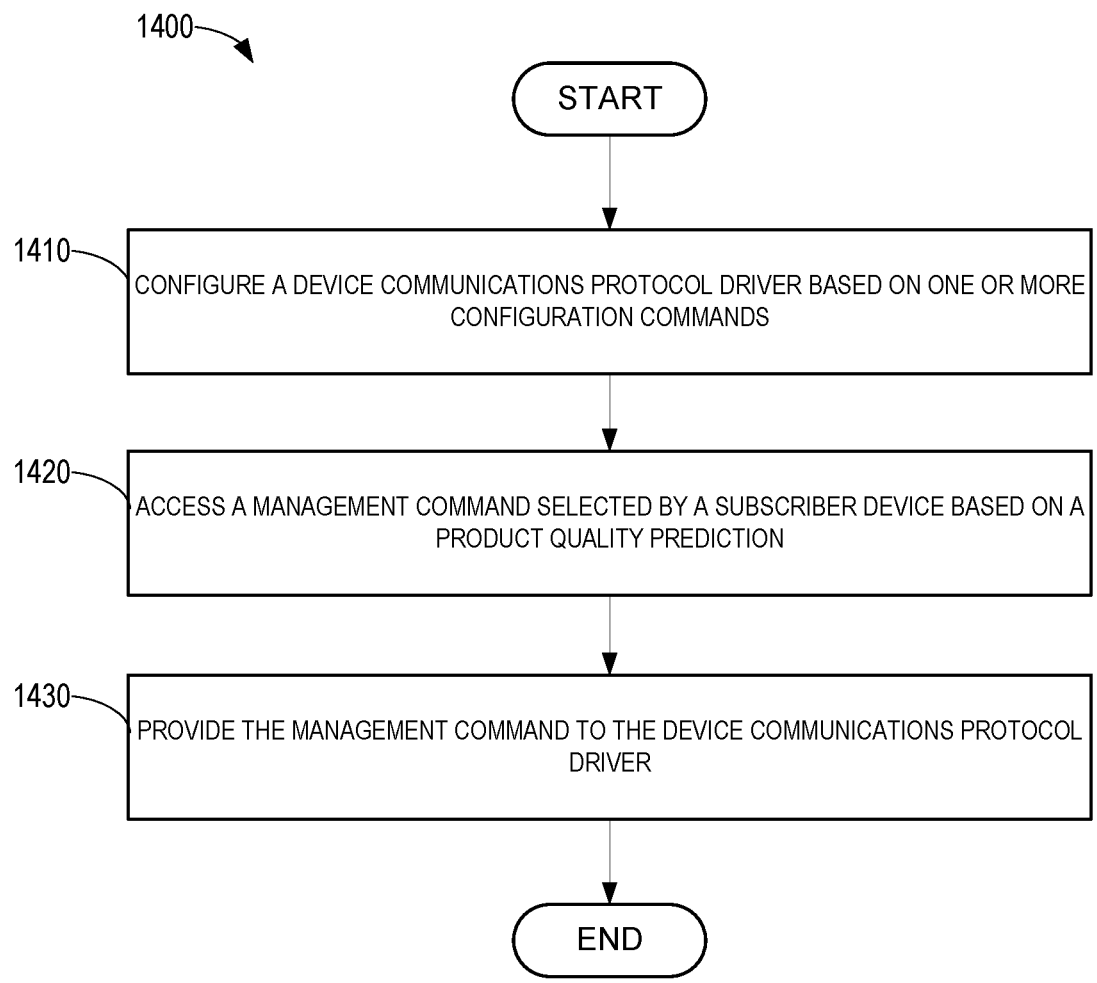
FIG. 14 is a flowchart representative of example machine readable instructions and/or example operations that may be executed by example processor circuitry to implement the subscription-based input/output server of FIGS. 1, 2A-2C, and 12.

A flowchart representative of example hardware logic circuitry, machine readable instructions, hardware implemented state machines, and/or any combination thereof for implementing the example subscription-based I/O server 105 of FIG. 12 is shown in FIGS. 13 and 14. The machine readable instructions may be one or more executable programs or portion(s) of an executable program for execution by processor circuitry, such as the processor circuitry 1812 shown in the example processor platform 1800 discussed below in connection with FIG. 18 and/or the example processor circuitry discussed below in connection with FIGS. 18 and/or 19. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowchart illustrated in FIGS. 13-16, many other methods of implementing the example subscription-based I/O server 105 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example operations of FIGS. 13-16 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium are expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 14 is a flowchart representative of example machine readable instructions and/or example operations that may be executed by example processor circuitry to implement the subscription-based I/O server 105 of FIGS. 1, 2A-2C, 3-5, and 12. An example process 1400 begins when the configuration manager 1230 of FIG. 12 configures the DSCPD 305 of FIGS. 3-5 based on one or more configuration commands from the control system configuration service 360 of FIGS. 3-5. (Block 1410). For example, the subscription-based I/O server 105 may access a configuration file from the control system configuration service 360. In such an example, the configuration file includes one or more commands to configure the DSCPD 305 of FIGS. 3-5 to be coupled to PAT devices (e.g., the instruments 210 of FIGS. 2A-2C and 3-5).

The example publication manager 1220 of FIG. 12 accesses a management command selected by a subscriber device based on a product quality prediction. (Block 1420). For example, the PAT device management circuitry 325 of FIGS. 3-5 may select a management command based on a product quality prediction value. In response, the example process I/O layer 310 of FIGS. 3-5 publishes the management command using a publication indication. The example publication manager 1220 receives the publication indication and accesses the management command based on the publication indication.

The example device driver controller 1240 provides the management command to the DSCPD 305. (Block 1430). For example, the command manager 1250 of FIG. 12 may convert the management command (e.g., the management command accessed by the publication manager 1220 at block 1420) to a device-specific command based on the communication protocol utilized by the PAT device indicated by a device identification value included in the management command.

Although example methods are described with reference to the flowchart illustrated in FIG. 14, many other methods of accessing and/or publishing commands using the subscription-based I/O server 105 may alternatively be used in accordance with this description. For example, the order of execution of the blocks may be changed, and/or some of the blocks described may be changed, eliminated, or combined.

Figure 15:
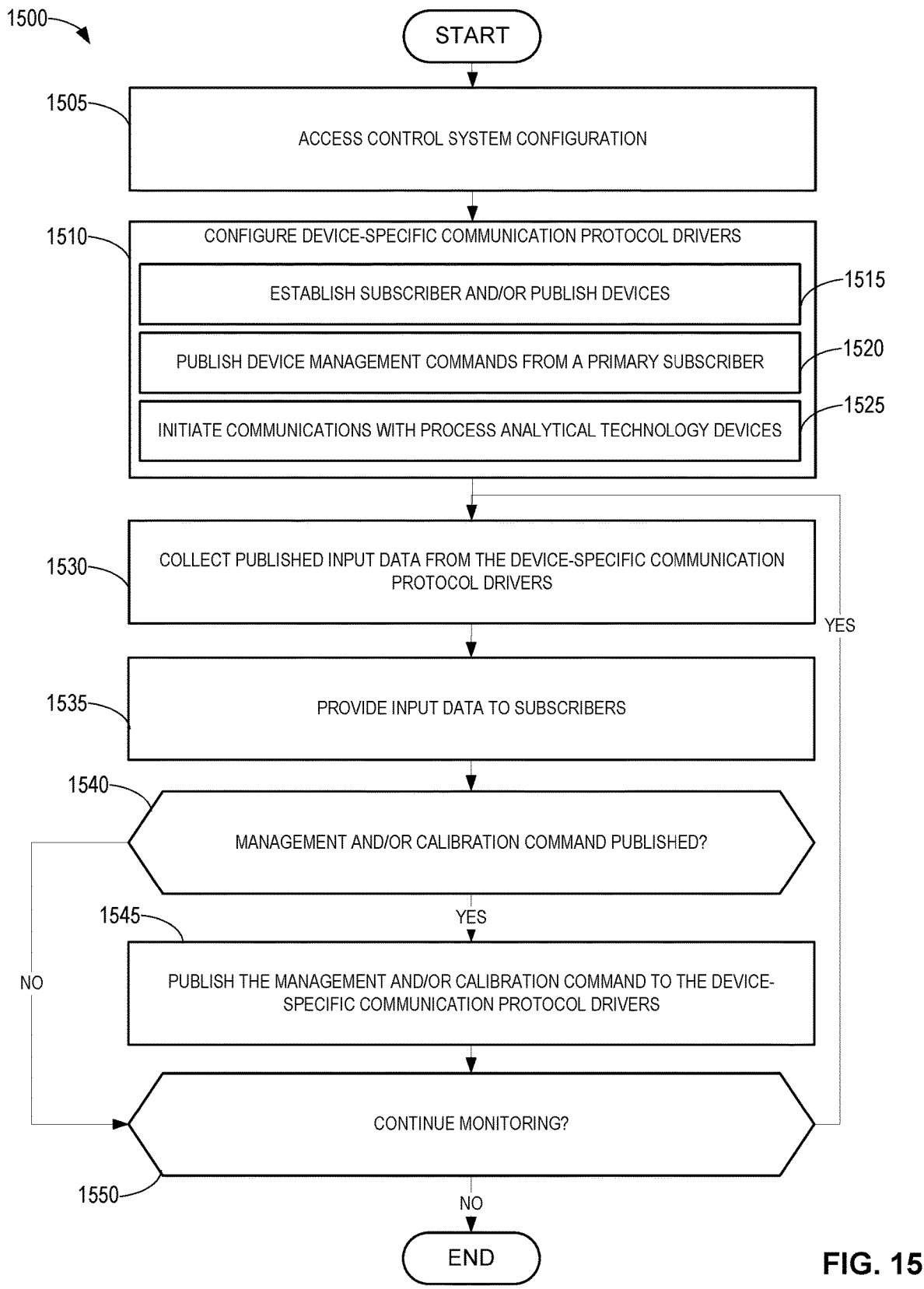
FIG. 15 is a flowchart representative of example machine readable instructions and/or example operations that may be executed by example processor circuitry to implement the subscription-based input/output server of FIGS. 1, 2A-2C, and 12.

FIG. 15 is a flowchart representative of example machine readable instructions and/or example operations that may be executed by example processor circuitry to implement the subscription-based I/O server 105 of FIGS. 1, 2A-2C, 3-5, and 12. The process 1500 begins when the example configuration manager 1230 of FIG. 12 accesses a control system configuration stored on and/or provided by the control system configuration service 360 of FIGS. 3-5. (Block 1505). For example, the control system configuration service 360 may provide the configuration manager 1230 access to a configuration file including calibration and/or management commands to configure the operations of the subscription-based I/O server 105 such as establishing one or more primary subscriber devices, one or more subscriber devices, and/or one or more publisher devices.

The example configuration manager 1230 configures device-specific communication protocol drivers. (Block 1510). For example, the configuration manager 1230 can configure device-specific communication protocol drivers by accessing commands in the control system configuration to provide commands to the device driver controller 1240 of FIG. 12 to configure the DSCPD 305 of FIGS. 3-5. 1510 In some examples, configuring device-specific communication protocol drivers involves the configuration manager 1230 providing a command to the device driver controller 1240 to establish a communication mode, a device calibration configuration, or a fault detection configuration of PAT devices.

In example FIG. 15, block 1510 may be implemented by one or more of blocks 1515, 1520, and 1525 as follows. The example configuration manager 1230 may establish subscriber and/or publisher devices based on the control system configuration file. (Block 1510 1515). For example, the configuration manager 1230 may provide commands to the subscription manager 1210 of FIG. 12 and/or the publication manager 1220 of FIG. 12 to establish a list and/or set of rules to establish devices as a primary subscriber device, a subscriber device, or a publisher device.

The example publication manager 1220 may receive commands from a primary subscriber device (e.g., the process I/O layer 310 of FIGS. 3-5, the embedded interface 610 of FIG. 6, the embedded interface 760 of FIG. 7, the embedded interface 870 of FIG. 8, the embedded interface 930 of FIG. 9, the embedded interface 1040 of FIG. 10, the PIO circuitry 1130 of FIG. 11, etc.) to initiate operations of the DSCPD 305 of FIGS. 3-5. (Block 1520). The example device driver controller 1240 may initiate communications with PAT devices by transmitting commands to the DSCP 305 to establish device-specific communication protocols. (Block 1525). For example, the device driver controller 1240 may transmit device-specific commands to establish a communications protocol for one or more of the PAT devices using a DeltaV communications library. In such an example, a communications protocol is assigned to one or more of the PAT devices based on commands from the configuration file and/or the primary subscriber.

The example publication manager 1220 collects published input data from the DSCPD 305. (Block 1530). For example, the DSCPD 305 may transmit a publication indication to the publication manager 1220 to indicate that measurement data from one or more of the PAT devices is ready to be provided to subscriber devices. The publication manager 1220 may access the measurement data using the device driver controller 1240 based on the publication indication. The device driver controller 1240 provides the measurement data to the subscription manager 1210.

The example subscription manager 1210 provides measurement data to the subscriber devices and primary subscriber devices. (Block 1535). The subscription manager 1210 transmits measurement data from the device driver controller 1240 to devices determined to be subscriber type devices and primary subscriber type devices. For example, the subscription manager 1210 may transmit measurement data to the process I/O layer 310 to determine a product quality value and/or implement the data model 640 of FIGS. 6, 8, 10, and 11 to generate a product quality prediction. The example subscription manager 1210 may be configured to need subscriber type devices to request access to measurement data provided by the device driver controller 1240. In such examples, the subscription manager 1210 may transmit an indication to subscriber devices indicating measurement data being published to the subscription-based I/O server 105. For example, the workstation 220 of FIGS. 2A, 2B, 3, and 4 accesses the measurement data in response to an indication from the subscription manager 1210 of measurement data being published.

The example command manager 1250 monitors the publication manager 1220 to determine if a management and/or calibration command is published by a subscriber device. (Block 1540). For example, the process I/O layer 310 transmits a publication indication to the publication manager 1220 in response to the PAT device management circuitry 325 of FIGS. 3-5 selecting a management command or a calibration command. The publication manager 1220 provides the publication indication to the command manager 1250 to access the management command or the calibration command selected by the PAT device management circuitry 325. The management command and/or a calibration command may be selected in response to the CMPE 315 of FIGS. 3-5 determining a product quality prediction and/or a product quality value that do(es) not satisfy the product quality specifications for the product being manufactured. In such an example, the PAT device management circuitry 325 of FIGS. 3-5 may select a command based on the strategy controller 320 of FIGS. 3-5 and the product quality prediction and/or product quality value. Alternatively, the PAT device management circuitry may select a management command and/or a calibration command to verify a previous product quality prediction and/or confirm a modification to a manufacturing process (e.g., the processes 120, 130, and 140 of FIG. 1).

If the example command manager 1250 determines a management and/or calibration command is published (block 1540: Yes), the process 1500 proceeds to block 1545. The example device driver controller 1240 publishes the management and/or calibration command to the DSCPD 305 to provide PAT devices access to calibration commands using a device-specific communication protocol. (Block 1545). For example, the device driver controller 1240 may provide device-specific commands to the PAT devices and/or the DSCPD 305 in response to the command manager 1250 assigning a management command to one or more PAT devices. In such an example, the management command may be modified to include a device identification value to enable the device driver controller 1240 and/or the DSCPD 305 to determine a PAT device corresponding to the management command. 1550

If the example command manager 1250 determines a management command and/or a calibration command has not been published (block 1540: No), the process 1500 proceeds to block 1550. The example subscription-based I/O server 105 determines whether to continue monitoring the manufacturing process. (Block 1550). For example, the PAT device management circuitry 325 may select a command to indicate an end of the manufacturing process. If the example subscription-based I/O server 105 determines to continue monitoring the manufacturing process (block 1550: Yes), the process 1500 returns to block 1530 to collect measurement data. If the example subscription-based I/O server 105 determines not to continue monitoring the manufacturing process (block 1550: No), the example instructions or process 1500 ends 1550.

Although example methods are described with reference to the flowchart illustrated in FIG. 15, many other methods of accessing and/or publishing commands using the subscription-based I/O server 105 may alternatively be used in accordance with this description. For example, the order of execution of the blocks may be changed, and/or some of the blocks described may be changed, eliminated, or combined.

Figure 16:
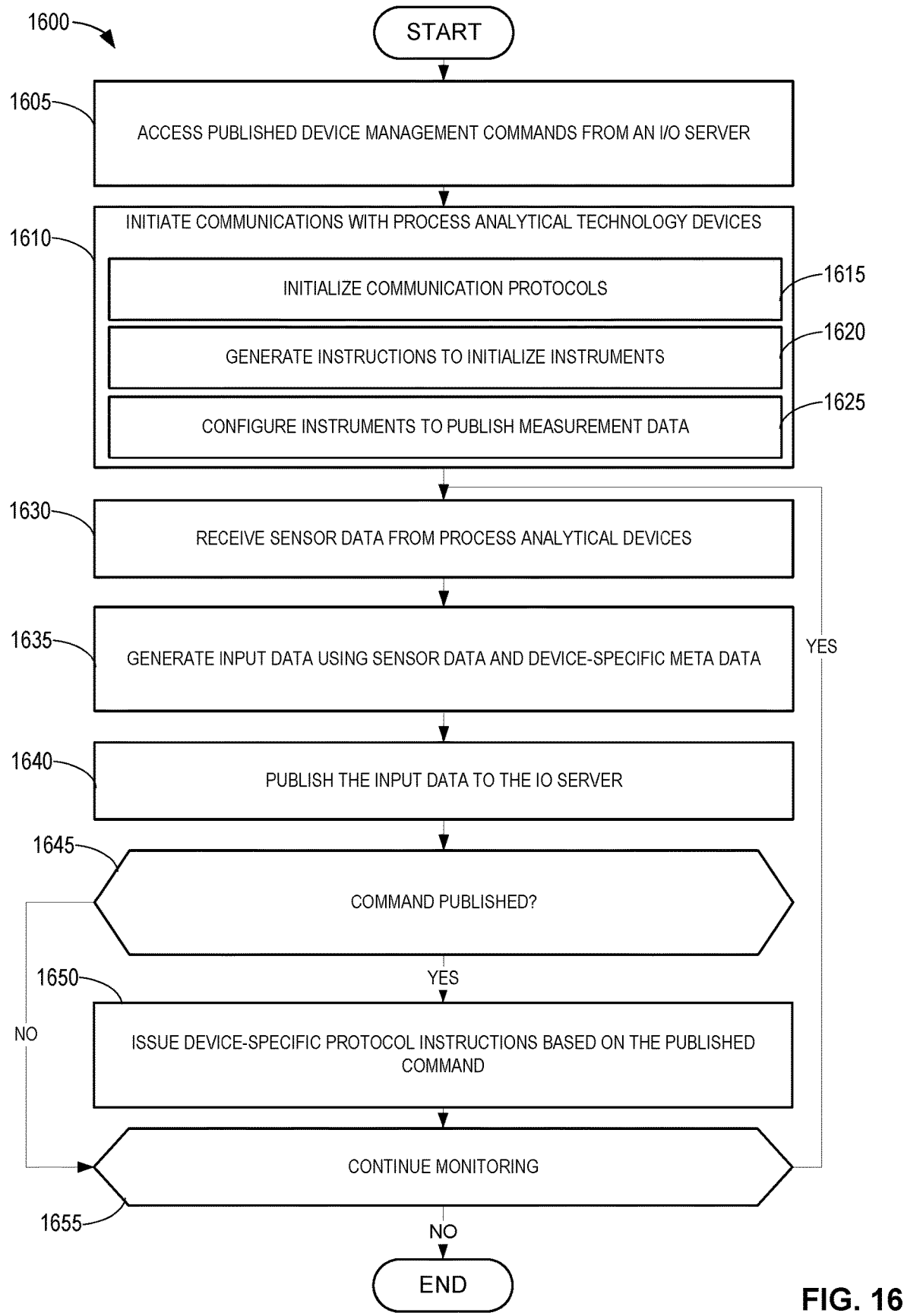
FIG. 16 is a flowchart representative of example machine readable instructions and/or example operations that may be executed by example processor circuitry to implement the data interface of FIGS. 6-10.

FIG. 16 is a flowchart representative of example machine readable instructions and/or example operations that may be executed by example processor circuitry to implement the DSCPD 305 of FIGS. 3-5 and/or the embedded interface 610, 760, 870, 930, 1040 of FIGS. 6-10. The process 1600 begins at block 1605 at which the example command controller 1310 of FIG. 13 accesses published device management commands from the subscription-based I/O server 105 of FIG. 12. For example, the configuration manager 1230 of FIG. 12 may provide management commands to the device driver controller 1240 of FIG. 12 to provide management commands to the command controller 1310. In such an example, the DSCPD 305 may receive management commands using a shared communication protocol or device-specific communication protocol.

The example communications manager 1320 of FIG. 13 initiates communications with the PAT devices by selecting commands from the communications library 1370 of FIG. 13. (Block 1610). In example FIG. 16, block 1610 may be implemented by one or more of blocks 1615, 1620, and 1625 as follows. The example communications manager 1320 may access one or more communication protocol libraries to initialize communications to one or more of the PAT devices utilizing one or more communications protocols. (Block 1615). For example, the DSCPD 305 may determine a communication protocol for each of the PAT devices based on the management commands accessed at block 1605.

The example communications manager 1320 may utilize the one or more communication protocol libraries, corresponding to the PAT devices, to generate instructions to initialize the instruments 210 of FIGS. 2A-2C and 3-5. (Block 1620). For example, the DSCPD 305 may convert the management commands and/or calibration commands to device-specific commands to serve as the instructions to initialize the instruments 210. Alternatively, the embedded interface 610, 760, 870, 930, 1040 of FIGS. 6-10 may generate device-specific commands to serve as the instructions to initialize the instruments 210, and the instrument I/O proxy server 645 of FIGS. 6 and 8 or the instrument server 1020 of FIG. 10 may utilize communication protocol libraries to provide the device-specific commands to the PAT devices. The example configuration controller 1330 of FIG. 13 may configure the instruments 210 of FIGS. 2A-2C and 3-5, which includes a plurality of PAT devices, to publish measurement data to the publication manager 1220 of FIG. 12. (Block 1625). For example, the configuration controller 1330 may configure the PAT devices to provide substantially real-time measurement data, including sensor data and/or device-specific data to the subscription-based I/O server 105.

The example instrument driver(s) 1340 of FIG. 13 receives sensor data from the PAT devices using one or more device-specific communication protocols. (Block 1630). For example, PAT devices (e.g., the instruments 210) may provide sensor data corresponding to a manufacturing process (e.g., the processes 120, 130, and 140 of FIG. 1) to the DSCPD 305. At block 1635, the example measurement manager 1350 of FIG. 13 generates input data using the sensor data from block 1630 and device-specific metadata. The input data may be referred to as measurement data. For example, the measurement manager 1350 converts the sensor data and meta-data corresponding to the PAT device which supplied the sensor data to generate input data of a shared data type. The example measurement manager 1350 may convert the input data to the shared data type to reduce integration complexity of including the instruments 210, which communicate using a plurality of communication protocols, by implementing a shared communication protocol between the subscription-based I/O server 105 and the DSCPD 305 so that a reduced number of communication protocols may be implemented.

The example publisher manager 1360 of FIG. 13 publishes the input data to the subscription-based I/O server 105. (Block 1640). For example, the publisher manager 1360 may publish subsequent input data of the shared data type to the publication manager 1220. In such examples, the shared data type is a data type of the communication protocol utilized to communicate with subscriber devices. The shared data type reduces the integration complexity of the subscription-based I/O server 105 by using measurement data corresponding to the communication protocol utilized to provide measurement data to subscriber devices.

The example command controller 1310 monitors the subscription-based I/O server 105 for an indication that a management command was published by a primary subscriber device. (Block 1645). If example the command controller 1310 determines a management command is published (block 1645: Yes), the process 1600 proceeds to block 1650. The example command controller 1310 issues device-specific protocol instructions based on the published command. (Block 1650). For example, the command controller 1310 may convert the published command to a command of a device-specific communication protocol corresponding to the PAT device indicated by the device identification value included in the published command. In such an example, the DSCPD 305 may utilize the communication library 1370 to issue a write command to the PAT device. 16001655

If the example command controller 1310 determines no command is published (block 1645: No), the process 1600 proceeds to block 1655. The example DSCPD 305 determines based on the published commands whether to continue monitoring the manufacturing process. For example, the DSCPD 305 may determine to continue monitoring if one or more of the published commands indicates the manufacturing process is a continuous manufacturing process, or if none of the published commands is a command to end monitoring. If the example command controller 1310 determines to continue monitoring (block 1645: Yes), the process 1600 returns to block 1630 to receive sensor data from the PAT devices. If example the command controller 1310 determines to end monitoring (block 1645: No), the example instructions or process of FIG. 16 ends.

Although example methods are described with reference to the flowchart illustrated in FIG. 16, many other methods of accessing commands and/or publishing measurement data to the subscription-based I/O server 105 may alternatively be used in accordance with this description. For example, the order of execution of the blocks may be changed, and/or some of the blocks described may be changed, eliminated, or combined.

Figure 17:
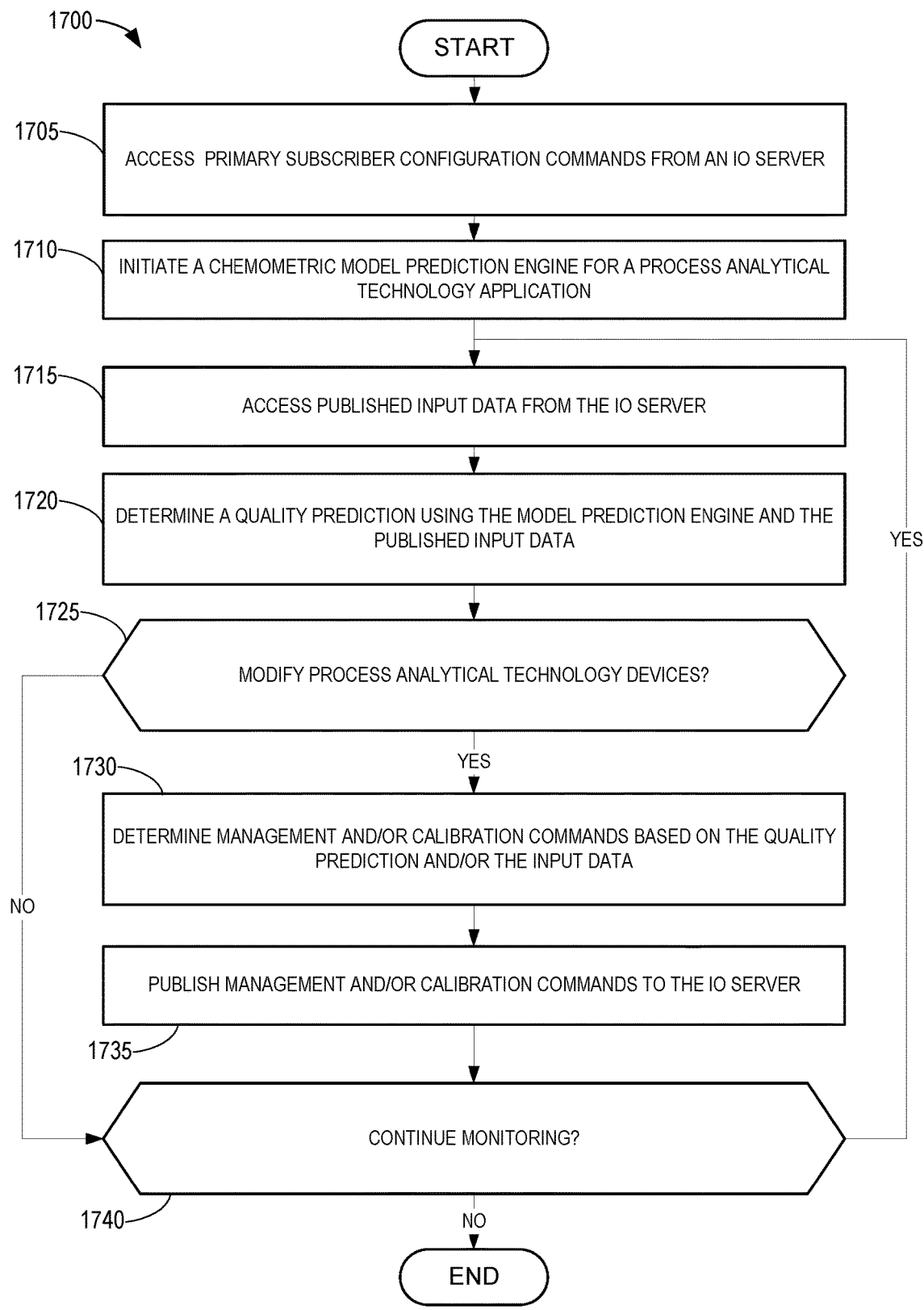
FIG. 17 is a flowchart representative of example machine readable instructions and/or example operations that may be executed by example processor circuitry to implement the control device of FIGS. 1, 2B, and 6.

FIG. 17 is a flowchart representative of example machine readable instructions and/or example operations that may be executed by example processor circuitry to implement the control device 230 of FIGS. 1, 2B, and 4. The process 1700 begins at block 1705 at which the example process I/O layer 310 of FIGS. 3-5 accesses primary subscriber configuration commands from the subscription-based I/O server 105 of FIGS. 1, 2A-2C, 3-5, and 12. (Block 1705). For example, the primary subscriber configuration commands are based on a configuration file from the control system configuration service 360 of FIGS. 3-5 and are used to configure the operations of primary subscriber devices. For example, the process I/O layer 310 may receive a command identifying that the data model 640 of FIGS. 6, 8, and 10-11 is to be used to determine a product quality value and/or a product quality prediction based on a product being manufactured.

The example process I/O layer 310 initiates the CMPE 315 of FIGS. 3-5 for a PAT application. (Block 1710). For example, the CMPE 315 is initiated so that it can access the data model 640 corresponding to the product being manufactured to determine a product quality value and/or a product quality prediction based on substantially real-time sensor data. The example process I/O layer 310 accesses published input data from the subscription-based I/O server 105 to provide measurement data from the PAT devices to the CMPE 315 and the PAT device management circuitry 325. (Block 1715).

The example CMPE 315 determines a product quality prediction using the data model 640 and published input data. (Block 1720). For example, the CMPE 315 may use parametric values of the data model 640 to determine a product quality prediction corresponding to the published sensor data. Additionally, the example CMPE 315 may determine a product quality value corresponding to the sensor data.

The example strategy controller 320 may determine whether to modify one or more of the PAT devices. (Block 1725). For example, the decision on whether to modify the PAT devices may be made by the strategy controller 320 based on a product quality prediction and/or an actual product quality value. If the example strategy controller 320 determines to modify one or more of the PAT devices (block 1725: Yes), the process 1700 proceeds to block 1730. The example PAT device management circuitry 325 determines a management and/or a calibration command based on the product quality prediction and/or the input data. (Block 1730). For example, if device-specific metadata is indicative of a fault detection error, the PAT device management circuitry 325 may select a calibration command to modify a corresponding PAT device to fix what is causing the fault detection error. The example PAT device management circuitry 325 provides the selected command to the process I/O layer 310 to publish the management command and/or the calibration command to the subscription-based I/O server 105. (Block 1735). 17001740

If the example strategy controller 320 and/or the PAT device management circuitry 325 determines not to modify one or more of the PAT devices (block 1725: No), the process proceeds to block 1740. The example strategy controller 320 determines based on a control strategy being implemented, whether to continue monitoring. (Block 1740). For example, the strategy controller 320 may determine to continue monitoring if the manufacturing process is a continuous manufacturing process and/or additional input data from the subscription-based I/O server 105 is available to be processed. If the example strategy controller 320 determines to continue monitoring (block 1740: Yes), the process 1700 returns to block 1715 to access published input data. If the strategy controller 320 determines not to continue monitoring (block 1740: No), the example instructions or process 1700 end.

Although example methods are described with reference to the flowchart illustrated in FIG. 17, many other methods of accessing measurement and/or determining a product quality value may alternatively be used in accordance with this description. For example, the order of execution of the blocks may be changed, and/or some of the blocks described may be changed, eliminated, or combined.

Figure 18:
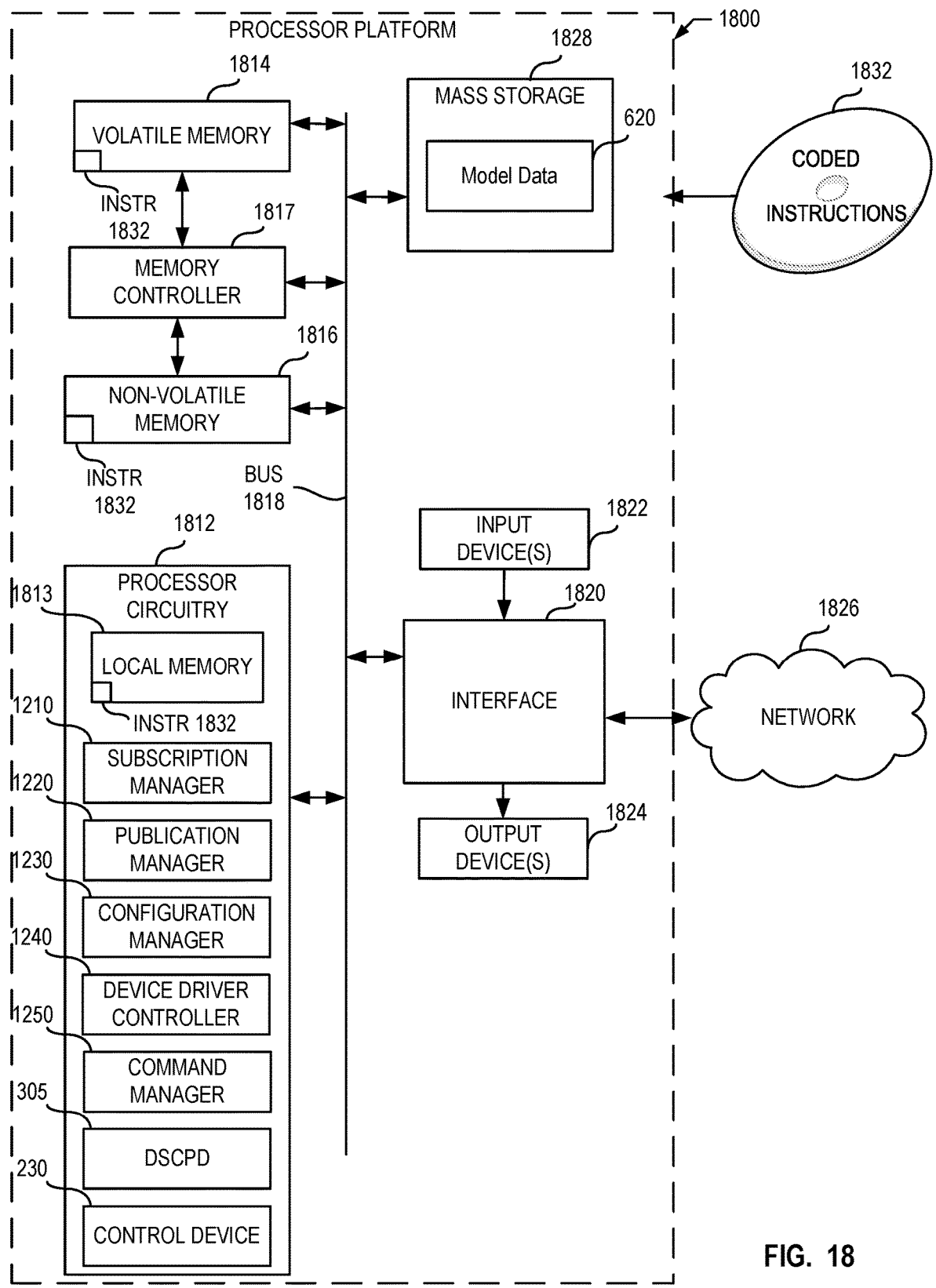
FIG. 18 is a block diagram of an example processing platform including processor circuitry structured to execute the example machine readable instructions and/or the example operations of FIGS. 13-16 to implement the subscription-based input/output server of FIGS. 1, 2A-2C, and 12.

FIG. 18 is a block diagram of an example processor platform 1800 structured to execute and/or instantiate the machine readable instructions and/or the operations of FIGS. 14-17 to implement the subscription-based I/O server 105 of FIGS. 1, 2A-2C, and 3-5, the DSCPD 305 of FIGS. 3-5 and 13, and/or the control device 230 of FIGS. 1, 2B, and 4. The processor platform 1800 can be, for example, a server, a personal computer, a workstation, a self-learning machine (e.g., a neural network), an Internet appliance, or any other type of computing device.

The processor platform 1800 of the illustrated example includes processor circuitry 1812. The processor circuitry 1812 of the illustrated example is hardware. For example, the processor circuitry 1812 can be implemented by one or more integrated circuits, logic circuits, FPGAs, microprocessors, CPUs, GPUs, DSPs, and/or microcontrollers from any desired family or manufacturer. The processor circuitry 1812 may be implemented by one or more semiconductor based (e.g., silicon based) devices. In this example, the processor circuitry 1812 implements the control device 230 of FIGS. 2B, and 3-5, further including the subscription-based I/O server 105, the DSCPD 305 of FIG. 3, the process I/O layer 310 of FIG. 3, the CMPE 315 of FIG. 3, the strategy controller 320 of FIG. 3, and the PAT device management circuitry 325 of FIG. 3 the subscription manager 1210 of FIG. 12, the publication manager 1220 of FIG. 12, the configuration manager 1230 of FIG. 12, the device driver controller 1240 of FIG. 12, the command manager 1250 of FIG. 12, the DSCPD 305 of FIGS. 3-5 and 13 further including the command controller 1310 of FIG. 13, the communications manager 1320 of FIG. 13, the configuration controller 1330 of FIG. 13, the instrument driver(s) 1340 of FIG. 13, the measurement manager 1350 of FIG. 13, the publisher manager 1360 of FIG. 13, the communications library 1370 of FIG. 13.

The processor circuitry 1812 of the illustrated example includes a local memory 1813 (e.g., a cache, registers, etc.). The processor circuitry 1812 of the illustrated example is in communication with a main memory including a volatile memory 1814 and a non-volatile memory 1816 by a bus 1818. The volatile memory 1814 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1816 may be implemented by flash memory and/or any other desired type of memory device. Access to the main memory 1814, 1816 of the illustrated example is controlled by a memory controller 1817.

The processor platform 1800 of the illustrated example also includes interface circuitry 1820. The interface circuitry 1820 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1822 are connected to the interface circuitry 1820. The input device(s) 1822 permit(s) a user to enter data and/or commands into the processor circuitry 1812. The input device(s) 1822 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1824 are also connected to the interface circuitry 1820 of the illustrated example. The output device(s) 1824 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1820 of the illustrated example, thus, typically includes a graphics driver card, a graphics driver chip, and/or graphics processor circuitry such as a GPU.

The interface circuitry 1820 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1826. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1800 of the illustrated example also includes one or more mass storage devices 1828 to store software and/or data. Examples of such mass storage devices 1828 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine executable instructions 1832, which may be implemented by the machine readable instructions of FIGS. 13-16, may be stored in the mass storage device 1828, in the volatile memory 1814, in the non-volatile memory 1816, and/or on a removable non-transitory computer readable storage medium such as a CD or DVD.

Figure 19:
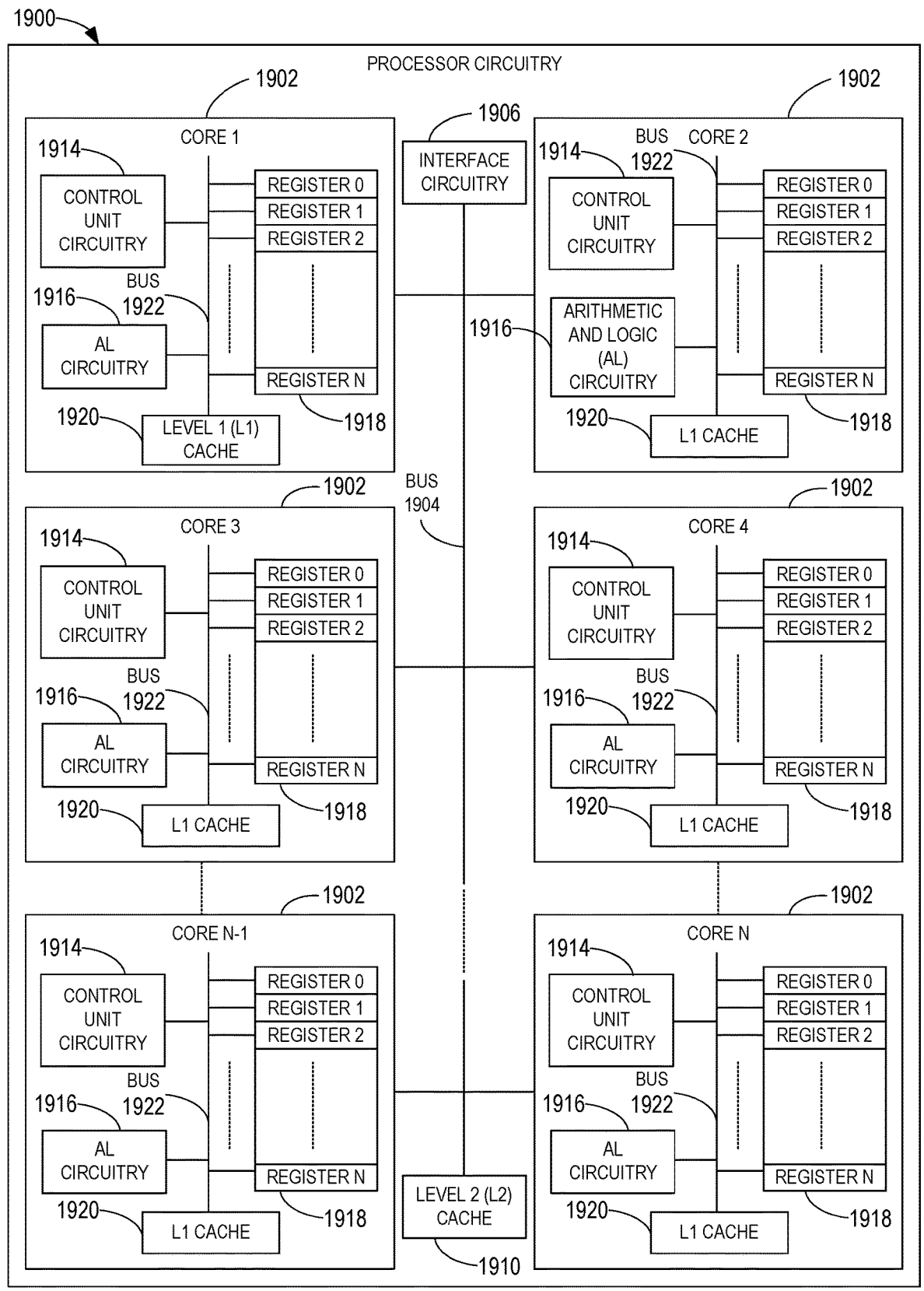
FIG. 19 is a block diagram of an example implementation of the processor circuitry of FIG. 18.

FIG. 19 is a block diagram of an example implementation of the processor circuitry 1812 of FIG. 18. In this example, the processor circuitry 1812 of FIG. 18 is implemented by a general purpose microprocessor 1900. The general purpose microprocessor circuitry 1900 executes some or all of the machine readable instructions of the flowchart of FIGS. 13 and 14 to effectively instantiate the subscription-based I/O server 105 of FIG. 12 as logic circuits to perform the operations corresponding to those machine readable instructions. In some such examples, the circuitry of FIG. 12 is instantiated by the hardware circuits of the microprocessor 1900 in combination with the instructions. For example, the microprocessor 1900 may implement multi-core hardware circuitry such as a CPU, a DSP, a GPU, an XPU, etc. Although it may include any number of example cores 1902 (e.g., 1 core), the microprocessor 1900 of this example is a multi-core semiconductor device including N cores. The cores 1902 of the microprocessor 1900 may operate independently or may cooperate to execute machine readable instructions. For example, machine code corresponding to a firmware program, an embedded software program, or a software program may be executed by one of the cores 1902 or may be executed by multiple ones of the cores 1902 at the same or different times. In some examples, the machine code corresponding to the firmware program, the embedded software program, or the software program is split into threads and executed in parallel by two or more of the cores 1902. The software program may correspond to a portion or all of the machine readable instructions and/or operations represented by the flowchart of FIGS. 13-16.

The cores 1902 may communicate by a first example bus 1904. In some examples, the first bus 1904 may implement a communication bus to effectuate communication associated with one(s) of the cores 1902. For example, the first bus 1904 may implement at least one of an Inter-Integrated Circuit (I2C) bus, a Serial Peripheral Interface (SPI) bus, a PCI bus, or a PCIe bus. Additionally or alternatively, the first bus 1904 may implement any other type of computing or electrical bus. The cores 1902 may obtain data, instructions, and/or signals from one or more external devices by example interface circuitry 1906. The cores 1902 may output data, instructions, and/or signals to the one or more external devices by the interface circuitry 1906. Although the cores 1902 of this example include example local memory 1920 (e.g., Level 1 (L1) cache that may be split into an L1 data cache and an L1 instruction cache), the microprocessor 1900 also includes example shared memory 1910 that may be shared by the cores (e.g., Level 2 (L2_cache)) for high-speed access to data and/or instructions. Data and/or instructions may be transferred (e.g., shared) by writing to and/or reading from the shared memory 1910. The local memory 1920 of each of the cores 1902 and the shared memory 1910 may be part of a hierarchy of storage devices including multiple levels of cache memory and the main memory (e.g., the main memory 1814, 1816 of FIG. 18). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1902 may be referred to as a CPU, DSP, GPU, etc., or any other type of hardware circuitry. Each core 1902 includes control unit circuitry 1914, arithmetic and logic (AL) circuitry (sometimes referred to as an ALU) 1916, a plurality of registers 1918, the L1 cache 1920, and a second example bus 1922. Other structures may be present. For example, each core 1902 may include vector unit circuitry, single instruction multiple data (SIMD) unit circuitry, load/store unit (LSU) circuitry, branch/jump unit circuitry, floating-point unit (FPU) circuitry, etc. The control unit circuitry 1914 includes semiconductor-based circuits structured to control (e.g., coordinate) data movement within the corresponding core 1902. The AL circuitry 1916 includes semiconductor-based circuits structured to perform one or more mathematic and/or logic operations on the data within the corresponding core 1902. The AL circuitry 1916 of some examples performs integer based operations. In other examples, the AL circuitry 1916 also performs floating point operations. In yet other examples, the AL circuitry 1916 may include first AL circuitry that performs integer based operations and second AL circuitry that performs floating point operations. In some examples, the AL circuitry 1916 may be referred to as an Arithmetic Logic Unit (ALU). The registers 1918 are semiconductor-based structures to store data and/or instructions such as results of one or more of the operations performed by the AL circuitry 1916 of the corresponding core 1902. For example, the registers 1918 may include vector register(s), SIMD register(s), general purpose register(s), flag register(s), segment register(s), machine specific register(s), instruction pointer register(s), control register(s), debug register(s), memory management register(s), machine check register(s), etc. The registers 1918 may be arranged in a bank as shown in FIG. 19. Alternatively, the registers 1918 may be organized in any other arrangement, format, or structure including distributed throughout the core 1902 to shorten access time. The second bus 1922 may implement at least one of an I2C bus, a SPI bus, a PCI bus, or a PCIe bus Each core 1902 and/or, more generally, the microprocessor 1900 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1900 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 20:
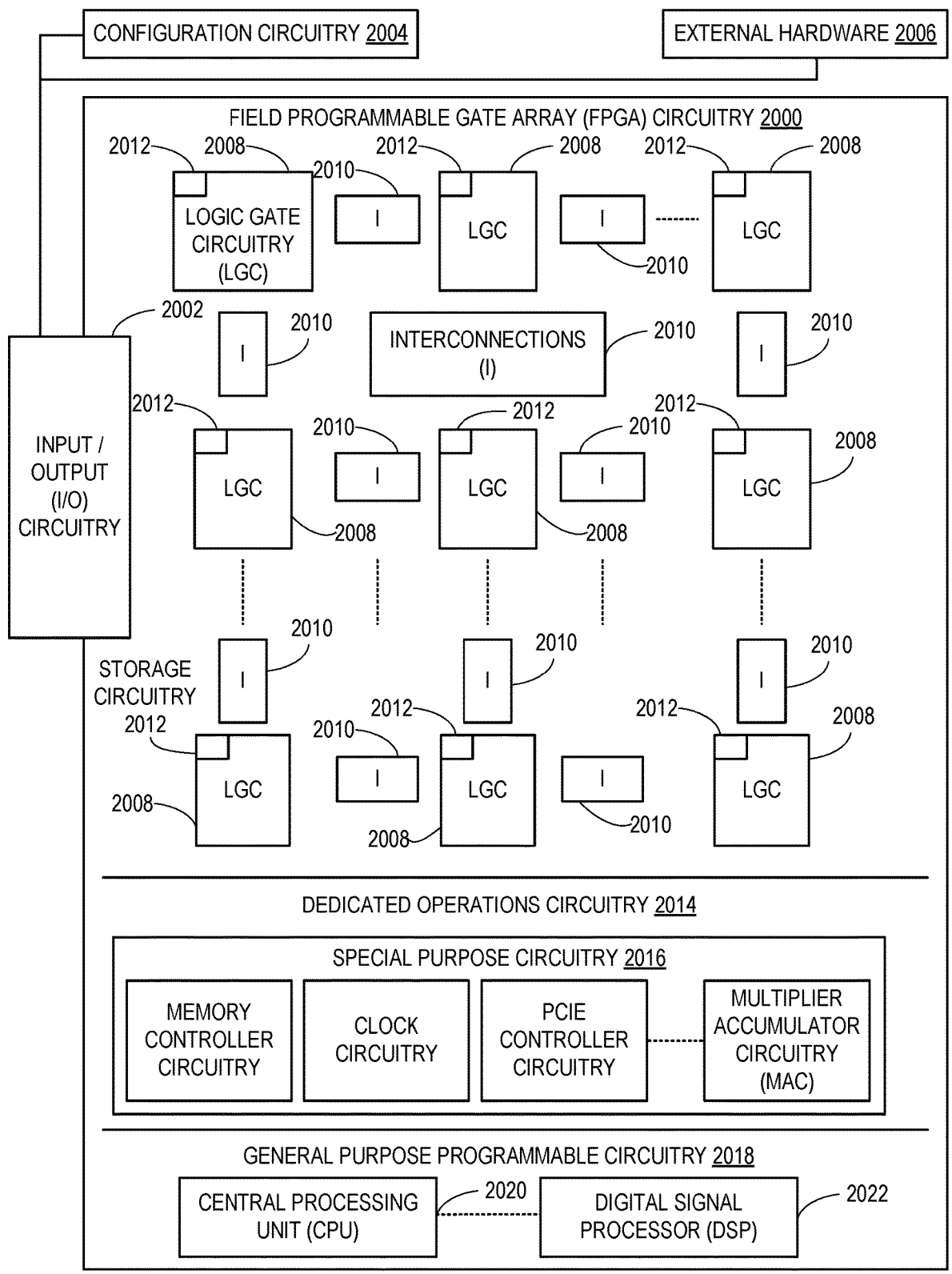
FIG. 20 is a block diagram of another example implementation of the processor circuitry of FIG. 18.

FIG. 20 is a block diagram of another example implementation of the processor circuitry 1812 of FIG. 18. In this example, the processor circuitry 1812 is implemented by FPGA circuitry 2000. The FPGA circuitry 2000 can be used, for example, to perform operations that could otherwise be performed by the example microprocessor 1900 of FIG. 19 executing corresponding machine readable instructions. However, once configured, the FPGA circuitry 2000 instantiates the machine readable instructions in hardware and, thus, can often execute the operations faster than they could be performed by a general purpose microprocessor executing the corresponding software.

More specifically, in contrast to the microprocessor 1900 of FIG. 19 described above (which is a general purpose device that may be programmed to execute some or all of the machine readable instructions represented by the flowchart of FIGS. 13-16 but whose interconnections and logic circuitry are fixed once fabricated), the FPGA circuitry 2000 of the example of FIG. 20 includes interconnections and logic circuitry that may be configured and/or interconnected in different ways after fabrication to instantiate, for example, some or all of the machine readable instructions represented by the flowchart of FIGS. 13-16. In particular, the FPGA 2000 may be thought of as an array of logic gates, interconnections, and switches. The switches can be programmed to change how the logic gates are interconnected by the interconnections, effectively forming one or more dedicated logic circuits (unless and until the FPGA circuitry 2000 is reprogrammed). The configured logic circuits enable the logic gates to cooperate in different ways to perform different operations on data received by input circuitry. Those operations may correspond to some or all of the software represented by the flowchart of FIGS. 13-16. As such, the FPGA circuitry 2000 may be structured to effectively instantiate some or all of the machine readable instructions of the flowchart of FIGS. 13-16 as dedicated logic circuits to perform the operations corresponding to those software instructions in a dedicated manner analogous to an ASIC. Therefore, the FPGA circuitry 2000 may perform the operations corresponding to the some or all of the machine readable instructions of FIGS. 13-16 faster than the general purpose microprocessor can execute the same.

In the example of FIG. 20, the FPGA circuitry 2000 is structured to be programmed (and/or reprogrammed one or more times) by an end user by a hardware description language (HDL) such as Verilog. The FPGA circuitry 2000 of FIG. 20, includes example input/output (I/O) circuitry 2002 to obtain and/or output data to/from example configuration circuitry 2004 and/or external hardware (e.g., external hardware circuitry) 2006. For example, the configuration circuitry 2004 may implement interface circuitry that may obtain machine readable instructions to configure the FPGA circuitry 2000, or portion(s) thereof. In some such examples, the configuration circuitry 2004 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 2006 may implement the microprocessor 1900 of FIG. 19. The FPGA circuitry 2000 also includes an array of example logic gate circuitry 2008, a plurality of example configurable interconnections 2010, and example storage circuitry 2012. The logic gate circuitry 2008 and interconnections 2010 are configurable to instantiate one or more operations that may correspond to at least some of the machine readable instructions of FIGS. 13-16 and/or other desired operations. The logic gate circuitry 2008 shown in FIG. 20 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 2008 to enable configuration of the electrical structures and/or the logic gates to form circuits to perform desired operations. The logic gate circuitry 2008 may include other electrical structures such as look-up tables (LUTs), registers (e.g., flip-flops or latches), multiplexers, etc.

The interconnections 2010 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 2008 to program desired logic circuits.

The storage circuitry 2012 of the illustrated example is structured to store result(s) of the one or more of the operations performed by corresponding logic gates. The storage circuitry 2012 may be implemented by registers or the like. In the illustrated example, the storage circuitry 2012 is distributed amongst the logic gate circuitry 2008 to facilitate access and increase execution speed.

The example FPGA circuitry 2000 of FIG. 20 also includes example Dedicated Operations Circuitry 2014. In this example, the Dedicated Operations Circuitry 2014 includes special purpose circuitry 2016 that may be invoked to implement commonly used functions to avoid the need to program those functions in the field. Examples of such special purpose circuitry 2016 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 2000 may also include example general purpose programmable circuitry 2018 such as an example CPU 2020 and/or an example DSP 2022. Other general purpose programmable circuitry 2018 may additionally or alternatively be present such as a GPU, an XPU, etc., that can be programmed to perform other operations.

Although FIGS. 5 and 6 illustrate two example implementations of the processor circuitry 1812 of FIG. 18, many other approaches are contemplated. For example, as mentioned above, modern FPGA circuitry may include an onboard CPU, such as one or more of the example CPU 2020 of FIG. 20. Therefore, the processor circuitry 1812 of FIG. 18 may additionally be implemented by combining the example microprocessor 1900 of FIG. 19 and the example FPGA circuitry 2000 of FIG. 20. In some such hybrid examples, a first portion of the machine readable instructions represented by the flowchart of FIGS. 13-16 may be executed by one or more of the cores 1902 of FIG. 19, a second portion of the machine readable instructions represented by the flowchart of FIGS. 13-16 may be executed by the FPGA circuitry 2000 of FIG. 20, and/or a third portion of the machine readable instructions represented by the flowchart of FIGS. 13-16 may be executed by an ASIC. It should be understood that some or all of the circuitry of FIG. 2 may, thus, be instantiated at the same or different times. Some or all of the circuitry may be instantiated, for example, in one or more threads executing concurrently and/or in series. Moreover, in some examples, some or all of the circuitry of FIG. 2 may be implemented within one or more virtual machines and/or containers executing on the microprocessor.

In some examples, the processor circuitry 1812 of FIG. 18 may be in one or more packages. For example, the processor circuitry 1900 of FIG. 19 and/or the FPGA circuitry 2000 of FIG. 20 may be in one or more packages. In some examples, an XPU may be implemented by the processor circuitry 1812 of FIG. 18, which may be in one or more packages. For example, the XPU may include a CPU in one package, a DSP in another package, a GPU in yet another package, and an FPGA in still yet another package.

Figure 21:
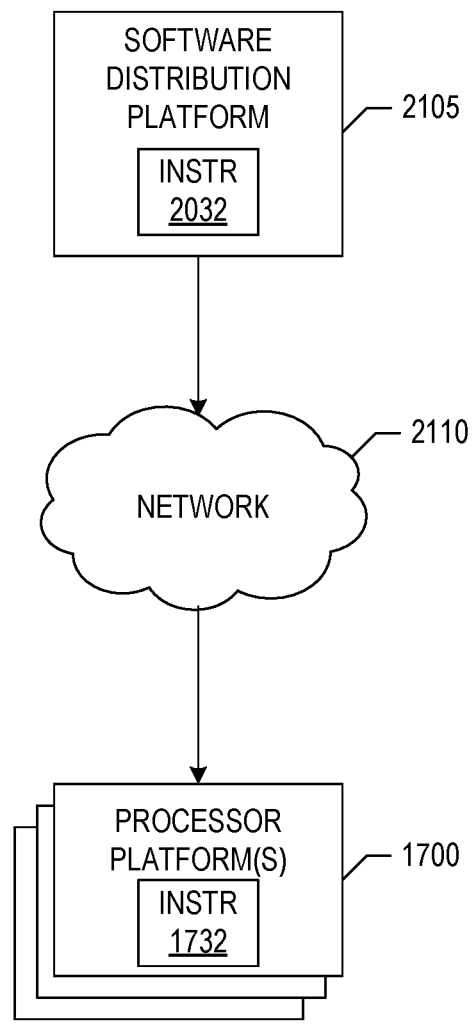
FIG. 21 is a block diagram of an example software distribution platform (e.g., one or more servers) to distribute software (e.g., software corresponding to the example machine readable instructions of FIGS. 13-16) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

FIG. 21 is a block diagram of an example software distribution platform (e.g., one or more servers) to distribute software (e.g., software corresponding to the example machine readable instructions of FIGS. 13-16) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 2105 to distribute software such as the example machine readable instructions 1832 of FIG. 18 to hardware devices owned and/or operated by third parties is illustrated in FIG. 21. The example software distribution platform 2105 may be implemented by any computer server, data facility, cloud service, etc., capable of storing and transmitting software to other computing devices. The third parties may be customers of the entity owning and/or operating the software distribution platform 2105. For example, the entity that owns and/or operates the software distribution platform 2105 may be a developer, a seller, and/or a licensor of software such as the example machine readable instructions 1832 of FIG. 18. The third parties may be consumers, users, retailers, OEMs, etc., who purchase and/or license the software for use and/or re-sale and/or sub-licensing. In the illustrated example, the software distribution platform 2105 includes one or more servers and one or more storage devices. The storage devices store the machine readable instructions 1832, which may correspond to the example machine readable instructions of FIGS. 13-16, as described above. The one or more servers of the example software distribution platform 2105 are in communication with a network 2110, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or by a third-party payment entity. The servers enable purchasers and/or licensors to download the machine readable instructions 1832 from the software distribution platform 2105. For example, the software, which may correspond to the example machine readable instructions 1832 of FIG. 18, may be downloaded to the example processor platform 400, which is to execute the machine readable instructions 1832 to implement the subscription-based I/O server 105 of FIG. 12. In some example, one or more servers of the software distribution platform 2105 periodically offer, transmit, and/or force updates to the software (e.g., the example machine readable instructions 1832 of FIG. 18) to ensure improvements, patches, updates, etc., are distributed and applied to the software at the end user devices.

From the foregoing, it will be appreciated that example systems, methods, apparatus, and articles of manufacture have been disclosed that enable PAT devices to ensure continuous manufacturing in industries which monitor product quality values. Disclosed systems, methods, apparatus, and articles of manufacture improve the efficiency of using a computing device by using a distributed control system to implement continuous manufacturing using PAT devices. Disclosed systems, methods, apparatus, and articles of manufacture are accordingly directed to one or more improvement(s) in the operation of a machine such as a computer or other electronic and/or mechanical device.

Example methods, apparatus, systems, and articles of manufacture to modify an industrial control system are disclosed herein. Further examples and combinations thereof include the following.

Example 1 includes a system to modify an industrial control system, comprising at least one memory, programmable circuitry, and instructions to cause the programmable circuitry to configure a device driver based on a first command, the first command to configure the device driver to initiate a device-specific communication protocol to collect input data from a publisher device coupled to the device driver, access a second command from a subscriber device, the second command to include a device identifier of the publisher device and to specify at least one of a communication mode, a device calibration configuration, or a fault detection configuration, the second command based on a product quality prediction, the product quality prediction generated using a spectral data model and provide the second command to the device driver.

Example 2 includes the system of example 1, wherein the programmable circuitry is to modify a production operation based on the product quality prediction, provide subsequent input data to the subscriber device, the subscriber device to generate a product quality value based on the input data, and verify the modification to the production operation based on the product quality value.

Example 3 includes the system of example 1, wherein the first command is based on a control system configuration from a control system configuration service, the control system configuration service to configure the programmable circuitry to establish a device as at least one of a publisher device type, a subscriber device type, or a primary subscriber device type.

Example 4 includes the system of example 3, wherein the second command is a management command or a calibration command from at least one of the device driver, the control system configuration service, or the device of the primary subscriber device type.

Example 5 includes the system of example 3, wherein the programmable circuitry is to collect the input data from the device driver and provide the input data to devices of the subscriber device type and the primary subscriber device type after receiving the input data from the publisher device.

Example 6 includes the system of example 1, wherein the programmable circuitry is to modify operations of the industrial control system after providing the second command to the device driver, the second command to indicate modifications to the device driver to modify a process of manufacture to correct for the product quality prediction not satisfying a product quality specification.

Example 7 includes the system of example 1, wherein the programmable circuitry is to collect the input data from the device driver, the input data to include sensor data and device-specific metadata, the sensor data including at least one of a spectral value, an absorption value, or a heat value, and the device-specific metadata including at least one of a device status or a device identification value.

Example 8 includes at least one non-transitory computer readable storage medium comprising instructions that, when executed, cause processor circuitry to at least configure a device driver based on a first command, the first command to configure the device driver to initiate a device-specific communication protocol to collect input data from a publisher device coupled to the device driver, access a second command from a subscriber device, the second command to include a device identifier of the publisher device and to specify at least one of a communication mode, a device calibration configuration, or a fault detection configuration, the second command based on a product quality prediction, the product quality prediction generated using a spectral data model, and provide the second command to the device driver.

Example 9 includes the at least one non-transitory computer readable storage medium of example 8, wherein the instructions, when executed, cause the processor circuitry to modify a production operation based on the product quality prediction, provide subsequent input data to the subscriber device, the subscriber device to generate a product quality value based on the input data, and verify the modification to the production operation based on the product quality value.

Example 10 includes the at least one non-transitory computer readable storage medium of example 8, wherein the first command is based on a control system configuration from a control system configuration service, the control system configuration service to configure the processor circuitry to establish a device as at least one of a publisher device type, a subscriber device type, or a primary subscriber device type.

Example 11 includes the at least one non-transitory computer readable storage medium of example 10, the second command is a management command or a calibration command from at least one of the device driver, the control system configuration service, or the device of the primary subscriber device type.

Example 12 includes the at least one non-transitory computer readable storage medium of example 10, wherein the instructions, when executed, cause the processor circuitry to collect the input data from the device driver, and provide the input data to devices of the subscriber device type and the primary subscriber device type after receiving the input data from the publisher device.

Example 13 includes the at least one non-transitory computer readable storage medium of example 8, wherein the instructions, when executed, cause the processor circuitry to modify operations of an industrial control system after providing the second command to the device driver, the second command to indicate modifications to the device driver to modify a process of manufacture to correct for the product quality prediction not satisfying a product quality specification.

Example 14 includes the at least one non-transitory computer readable storage medium of example 8, wherein the instructions, when executed, cause the processor circuitry to collect the input data from the device driver, the input data to include sensor data and device-specific metadata, the sensor data including at least one of a spectral value, an absorption value, or a heat value, and the device-specific metadata including at least one of a device status or a device identification value.

Example 15 includes a method of modifying an industrial control system, comprising configuring a device driver based on a first command, the first command to configure the device driver to initiate a device-specific communication protocol to collect input data from a publisher device coupled to the device driver, accessing a second command from a subscriber device, the second command to include a device identifier of the publisher device and to specify at least one of a communication mode, a device calibration configuration, or a fault detection configuration, the second command based on a product quality prediction, the product quality prediction generated using a spectral data model, and providing the second command to the device driver.

Example 16 includes the method of example 15, further comprising modifying a production operation based on the product quality prediction, providing subsequent input data to the subscriber device, the subscriber device to generate a product quality value based on the input data, and verifying the modification to the production operation based on the product quality value.

Example 17 includes the method of example 15, further comprising accessing a control system configuration from a control system configuration service, the control system configuration service to configure the processor circuitry to establish a device as at least one of a publisher device type, a subscriber device type, or a primary subscriber device type.

Example 18 includes the method of example 17, wherein the second command is a management command or a calibration command from at least one of the device driver, the control system configuration service, or the device of the primary subscriber device type.

Example 19 includes the method of example 17, further comprising collecting the input data from the device driver and providing the input data to devices of the subscriber device type and the primary subscriber device type after receiving the input data from the publisher device.

Example 20 includes the method of example 15, further including modifying operations of the industrial control system after providing the second command to the device driver, the second command to indicate modifications to the device driver to modify a process of manufacture to correct for the product quality prediction not satisfying a product quality specification.

Example 21 includes the method of example 15, further comprising collecting the input data from the device driver, the input data to include sensor data and device-specific metadata, the sensor data including at least one of a spectral value, an absorption value, or a heat value, and the device-specific metadata including at least one of a device status or a device identification value.

Example 22 includes an apparatus comprising configuration manager circuitry to configure a device driver based on a first command, the first command to configure the device driver to initiate a device-specific communication protocol to collect input data from a publisher device coupled to the device driver, publication manager circuitry to access a second command from a subscriber device, the second command to include a device identifier of the publisher device and to specify at least one of a communication mode, a device calibration configuration, or a fault detection configuration, the second command based on a product quality prediction, the product quality prediction generated using a spectral data model, and command manager circuitry to provide the second command to the device driver.

Example 23 includes the apparatus of example 22, further including controller circuitry to modify a production operation based on the product quality prediction, provide subsequent input data to the subscriber device, the subscriber device to generate a product quality value based on the input data, and verify the modification to the production operation based on the product quality value.

Example 24 includes the apparatus of example 22, wherein the first command is based on a control system configuration from a control system configuration service, the control system configuration service to configure a subscription manager to establish a device as at least one of a publisher device type, a subscriber device type, or a primary subscriber device type.

Example 25 includes the apparatus of example 24, wherein the second command is a management command or a calibration command from at least one of the device driver, the control system configuration service, or the device of the primary subscriber device type.

Example 26 includes the apparatus of example 24, further includes device driver controller circuitry to collect the input data from the device driver and provide the input data to devices of the subscriber device type and the primary subscriber device type after receiving the input data from the publisher device.

Example 27 includes the apparatus of example 22, wherein the command manager circuitry is to modify operations of an industrial control system after providing the second command to the device driver, the second command to indicate modifications to the device driver to modify a process of manufacture to correct for the product quality prediction not satisfying a product quality specification.

Example 28 includes the apparatus of example 22, further includes device driver controller circuitry to collect the input data from the device driver, the input data to include sensor data and device-specific metadata, the sensor data including at least one of a spectral value, an absorption value, or a heat value, and the device-specific metadata including at least one of a device status or a device identification value.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. A system to modify an industrial control system, comprising:
    at least one memory;
    programmable circuitry; and
    instructions to cause the programmable circuitry to:
        configure a device driver based on a first command, the first command to configure the device driver to initiate a device-specific communication protocol to collect input data from a publisher device coupled to the device driver;
        access a second command from a subscriber device, the second command to include a device identifier of the publisher device and to specify at least one of a communication mode, a device calibration configuration, or a fault detection configuration, the second command based on a product quality prediction, the product quality prediction generated using a spectral data model; and
        provide the second command to the device driver.

2. The system of claim 1, wherein the programmable circuitry is to:
    modify a production operation based on the product quality prediction;
    provide subsequent input data to the subscriber device, the subscriber device to generate a product quality value based on the input data; and
    verify the modification to the production operation based on the product quality value.

3. The system of claim 1, wherein the first command is based on a control system configuration from a control system configuration service, the control system configuration service to configure the programmable circuitry to establish a device as at least one of a publisher device type, a subscriber device type, or a primary subscriber device type.

4. The system of claim 3, wherein the second command is a management command or a calibration command from at least one of the device driver, the control system configuration service, or the device of the primary subscriber device type.

5. The system of claim 3, wherein the programmable circuitry is to:
    collect the input data from the device driver; and
    provide the input data to devices of the subscriber device type and the primary subscriber device type after receiving the input data from the publisher device.

6. The system of claim 1, wherein the programmable circuitry is to modify operations of the industrial control system after providing the second command to the device driver, the second command to indicate modifications to the device driver to modify a process of manufacture to correct for the product quality prediction not satisfying a product quality specification.

7. The system of claim 1, wherein the programmable circuitry is to collect the input data from the device driver, the input data to include sensor data and device-specific metadata, the sensor data including at least one of a spectral value, an absorption value, or a heat value, and the device-specific metadata including at least one of a device status or a device identification value.

8. At least one non-transitory computer readable storage medium comprising instructions that, when executed, cause processor circuitry to at least:

configure a device driver based on a first command, the first command to configure the device driver to initiate a device-specific communication protocol to collect input data from a publisher device coupled to the device driver;

access a second command from a subscriber device, the second command to include a device identifier of the publisher device and to specify at least one of a communication mode, a device calibration configuration, or a fault detection configuration, the second command based on a product quality prediction, the product quality prediction generated using a spectral data model; and provide the second command to the device driver.

9. The at least one non-transitory computer readable storage medium of claim 8, wherein the instructions, when executed, cause the processor circuitry to:

modify a production operation based on the product quality prediction;

provide subsequent input data to the subscriber device, the subscriber device to generate a product quality value based on the input data; and verify the modification to the production operation based on the product quality value.

10. The at least one non-transitory computer readable storage medium of claim 8, wherein the first command is based on a control system configuration from a control system configuration service, the control system configuration service to configure the processor circuitry to establish a device as at least one of a publisher device type, a subscriber device type, or a primary subscriber device type.

11. The at least one non-transitory computer readable storage medium of claim 10, wherein the second command is a management command or a calibration command from at least one of the device driver, the control system configuration service, or the device of the primary subscriber device type.

12. The at least one non-transitory computer readable storage medium of claim 10, wherein the instructions, when executed, cause the processor circuitry to:

collect the input data from the device driver; and provide the input data to devices of the subscriber device type and the primary subscriber device type after receiving the input data from the publisher device.

13. The at least one non-transitory computer readable storage medium of claim 8, wherein the instructions, when executed, cause the processor circuitry to modify operations of an industrial control system after providing the second command to the device driver, the second command to indicate modifications to the device driver to modify a process of manufacture to correct for the product quality prediction not satisfying a product quality specification.

14. The at least one non-transitory computer readable storage medium of claim 8, wherein the instructions, when executed, cause the processor circuitry to collect the input data from the device driver, the input data to include sensor data and device-specific metadata, the sensor data including at least one of a spectral value, an absorption value, or a heat value, and the device-specific metadata including at least one of a device status or a device identification value.

15. An apparatus comprising:

configuration manager circuitry to configure a device driver based on a first command, the first command to configure the device driver to initiate a device-specific communication protocol to collect input data from a publisher device coupled to the device driver;

publication manager circuitry to access a second command from a subscriber device, the second command to include a device identifier of the publisher device and to specify at least one of a communication mode, a device calibration configuration, or a fault detection configuration, the second command based on a product quality prediction, the product quality prediction generated using a spectral data model; and command manager circuitry to provide the second command to the device driver.

16. The apparatus of claim 15, further including controller circuitry to:

modify a production operation based on the product quality prediction;

provide subsequent input data to the subscriber device, the subscriber device to generate a product quality value based on the input data; and verify the modification to the production operation based on the product quality value.

17. The apparatus of claim 15, wherein the first command is based on a control system configuration from a control system configuration service, the control system configuration service to configure a subscription manager to establish a device as at least one of a publisher device type, a subscriber device type, or a primary subscriber device type.

18. The apparatus of claim 17, wherein the second command is a management command or a calibration command from at least one of the device driver, the control system configuration service, or the device of the primary subscriber device type.

19. The apparatus of claim 17, further including device driver controller circuitry to:

collect the input data from the device driver; and provide the input data to devices of the subscriber device type and the primary subscriber device type after receiving the input data from the publisher device.

20. The apparatus of claim 15, wherein the command manager circuitry is to modify operations of an industrial control system after providing the second command to the device driver, the second command to indicate modifications to the device driver to modify a process of manufacture to correct for the product quality prediction not satisfying a product quality specification.

* * * * *